US012762210B2

(12) United States Patent
Sherr

(10) Patent No.: US 12,762,210 B2
(45) Date of Patent: Oct. 13, 2026

(54) SYSTEM, METHOD, AND PRODUCT FOR TRANSPARENTLY ENCAPSULATED ARTIFICIAL INTELLIGENCE

(71) Applicant: Alan Bennett Sherr, Cambridge, MA (US)

(72) Inventor: Alan Bennett Sherr, Cambridge, MA (US)

( * ) Notice: Subject to any disclaimer, the term of this patent is extended or adjusted under 35 U.S.C. 154(b) by 0 days.

(21) Appl. No.: 19/306,535

(22) Filed: Aug. 21, 2025

(65) Prior Publication Data

US 2026/0161744 A1 Jun. 11, 2026

Related U.S. Application Data

(63) Continuation of application No. 18/999,280, filed on Dec. 23, 2024, now Pat. No. 12,406,027, which is a continuation of application No. 18/808,143, filed on Aug. 19, 2024, now Pat. No. 12,210,592, which is a continuation of application No. 18/538,519, filed on Dec. 13, 2023, now Pat. No. 12,099,576.

(51) Int. Cl.

*G06F 16/00* (2019.01)
*G06F 18/241* (2023.01)
*G06V 10/44* (2022.01)

(52) U.S. Cl.

CPC .......... *G06F 18/241* (2023.01); *G06V 10/454* (2022.01)

(58) Field of Classification Search

None

See application file for complete search history.

(56) References Cited

U.S. PATENT DOCUMENTS

| | | | |
|---|---|---|---|
| 4,890,240 | A | 12/1989 | Loeb |
| 4,924,408 | A | 5/1990 | Highland |
| 5,197,116 | A | 3/1993 | Katoh |

(Continued)

OTHER PUBLICATIONS

AI Reading, or Automatic Semantic Decomposition into Knowledge Graphs and Symbolic reasoning through Marker Passing, 12 pages (2021 Johannes Fähndrich,Frank Trollmann—other biblio data on first page).

(Continued)

*Primary Examiner* — Polina G Peach

(74) *Attorney, Agent, or Firm* — Blueshift IP; Robert Plotkin

(57) ABSTRACT

Artificial Intelligence systems, methods, and products identify significant patterns in data and persist those patterns and/or their constituents as data entries in databases or as transitory patterns of activation. The constituents associated with significant patterns include data constructs representing concepts or filter/exemplars. Those concepts or filters/exemplars themselves represent significant patterns. Recursive identification of significant patterns of significant patterns, and significant patterns of those patterns, and so on to any degree of recursiveness desired, facilitates the leveraging of combinatorial expansion to categorize, recognize, associate, and predict complex combinations of information while maintaining practical control over resources. In preferred implementations, the elements of the systems, methods, and products described herein are transparently encapsulated, and their behaviors are monitored and enforced, to provide alignment with human-determined objectives and rules.

25 Claims, 9 Drawing Sheets

(56) References Cited

U.S. PATENT DOCUMENTS

| | | | | |
|---|---|---|---|---|
| 5,313,558 | A * | 5/1994 | Adams | G06N 3/04 706/20 |
| 5,412,756 | A | 5/1995 | Bauman | |
| 5,430,829 | A * | 7/1995 | Takatori | G06N 3/082 706/25 |
| 5,581,664 | A | 12/1996 | Allen | |
| 5,594,809 | A * | 1/1997 | Kopec | G06F 18/295 382/161 |
| 5,822,743 | A | 10/1998 | Gupta | |
| 6,574,653 | B1 | 6/2003 | Rhoads, II | |
| 7,565,642 | B2 | 7/2009 | Moore | |
| 7,899,666 | B2 | 3/2011 | Varone | |
| 8,156,065 | B1 | 4/2012 | Larios, Jr. | |
| 9,292,262 | B2 | 3/2016 | Gabel | |
| 9,477,655 | B2 | 10/2016 | Pestian | |
| 9,569,729 | B1 | 2/2017 | Oehrle | |
| 9,916,538 | B2 * | 3/2018 | Zadeh | A61B 5/165 |
| 10,002,189 | B2 * | 6/2018 | Cheyer | G06F 16/3334 |
| 10,482,181 | B1 | 11/2019 | Rubin | |
| 11,593,650 | B2 * | 2/2023 | Zhang | G06N 3/0895 |
| 11,842,270 | B1 * | 12/2023 | Lerchner | G06N 3/09 |
| 2005/0256889 | A1 * | 11/2005 | McConnell | G06F 16/90 |
| 2008/0003510 | A1 * | 1/2008 | Harazaki | G03F 1/36 430/5 |
| 2008/0184371 | A1 * | 7/2008 | Moskovitch | G06F 21/566 706/12 |
| 2010/0070463 | A1 | 3/2010 | Zhao | |
| 2014/0156577 | A1 | 6/2014 | Eliasmith | |
| 2015/0049634 | A1 * | 2/2015 | Levchuk | G06Q 10/40 370/254 |
| 2018/0025291 | A1 * | 1/2018 | Dey | G06N 7/01 706/11 |
| 2019/0244122 | A1 * | 8/2019 | Li | G06N 20/00 |
| 2019/0377976 | A1 * | 12/2019 | Markram | G06F 18/2413 |
| 2019/0378008 | A1 * | 12/2019 | Markram | G06N 3/04 |
| 2020/0160170 | A1 * | 5/2020 | Kursun | G06N 3/08 |
| 2020/0301949 | A1 * | 9/2020 | Wong | G06F 18/2325 |
| 2021/0124876 | A1 * | 4/2021 | Kryscinski | G06F 16/345 |
| 2021/0201205 | A1 * | 7/2021 | Chatterjee | G06N 3/0442 |
| 2021/0248409 | A1 * | 8/2021 | Iyer | G06N 3/0475 |
| 2022/0198341 | A1 * | 6/2022 | Hirokawa | G06N 3/09 |
| 2023/0087777 | A1 * | 3/2023 | Sha | G06N 3/084 706/26 |
| 2023/0244949 | A1 * | 8/2023 | Lin | G06N 3/09 706/25 |
| 2023/0259764 | A1 * | 8/2023 | Höfig | G06N 3/045 706/25 |
| 2025/0021872 | A1 * | 1/2025 | Sharpe | G06N 20/00 |

OTHER PUBLICATIONS

Digital forensics and strong AI: A structured literature review, 9 pages (biblio data on first page).

N40. de Kleer. An Assumption-Based TMS. Artificial Intelligence, vol. 28, 1986, pp. 127-162.

N41. de Kleer. Extending the ATMS. Artificial Intelligence, vol. 28, 1986, pp. 163-196.

N42. de Kleer. Problem Solving with the ATMS. Artificial Intelligence, vol. 28, 1986, pp. 197-224.

N44. Newell, A. "Precis of Unified Theories of Cognition." Behavioral and Brain Sciences, vol. 15, 1992, pp. 425-492.

N45. Anderson, J.R., et al. The Newell Test for a Theory of Cognition. Behavioral and Brain Sciences, vol. 26, No. 5, 2003, pp. 587-601.

N46. Hayes-Roth. A Blackboard Architecture for Control. Artificial Intelligence, vol. 26, No. 3, 1985, pp. 251-321.

N47. Hayes-Roth. BB1: An Architecture for Blackboard Systems that Control, Explain, and Learn About Their Own Behavior. Stanford CS-TR-84-1034 / HPP-84-16, 1984. 23 pages.

N62. Kotseruba et al. 40 Years of Cognitive Architectures: Core Cognitive Abilities and Practical Applications. Artificial Intelligence Review, vol. 53, 2020, pp. 17-94.

Semantic Decomposition and Marker Passing in an Artificial Representation of Meaning, 315 pages (Johannes Fahndrich, Berlin, Feb. 19, 2018—see cover page for more biblio info).

Aamodt, Agnar; Plaza, Enric. "Case-Based Reasoning: Foundational Issues, Methodological Variations, and System Approaches." AI Communications, vol. 7, No. 1, 1994, pp. 39-59.

Anderson, John R.; Bothell, Daniel; Byrne, Michael D.; Douglass, Scott; Lebiere, Christian; Qin, Yulin. "An Integrated Theory of the Mind." Psychological Review, vol. 111, No. 4, 2004, pp. 1036-1060.

Bai, Yuntao et al. "Constitutional AI: Harmlessness from AI Feedback." arXiv:2212.08073, 2022 (pp. 1-34).

Besold, Tarek R.; d'Avila Garcez, Artur; Bader, Sebastian; Bowman, Howard; Domingos, Pedro; Hitzler, Pascal; Kühnberger, Kai-Uwe; Lamb, Luís C.; Lowd, Daniel; Vieira Lima, Priscila Machado; de Penning, Leo; Pinkas, Gadi; Poon, Hoifung; Zaverucha, Gerson. "Neural-Symbolic Learning and Reasoning: A Survey and Interpretation." arXiv:1711.03902, 2017 (pp. 1-58).

Buneman, Peter; Khanna, Sanjeev; Tan, Wang-Chiew. "Why and Where: A Characterization of Data Provenance." In Proceedings of the 8th International Conference on Database Theory (ICDT 2001), Lecture Notes in Computer Science 1973, 2001, pp. 316-330.

Corkill, Daniel D. "Blackboard Systems." AI Expert, vol. 6, No. 9, Sep. 1991, pp. 40-47.

Doyle, Jon. A Truth Maintenance System. Artificial Intelligence Laboratory Memo No. 521, Massachusetts Institute of Technology, Jun. 1979 (pp. 1-45).

Doyle, Jon. Truth Maintenance Systems for Problem Solving. Artificial Intelligence Laboratory Technical Report No. 419, Massachusetts Institute of Technology, 1978, 131 pages.

Erman, Lee D.; Hayes-Roth, Frederick; Lesser, Victor R.; Reddy, D. Raj. "The Hearsay-II Speech-Understanding System: Integrating Knowledge to Resolve Uncertainty." ACM Computing Surveys, vol. 12, No. 2, Jun. 1980, pp. 213-253.

Forgy, Charles L. "Rete: A Fast Algorithm for the Many Pattern/Many Object Pattern Match Problem." Artificial Intelligence, vol. 19, No. 1, 1982, pp. 17-37.

Forgy, Charles L. OPS5 User's Manual. Technical Report CMU-CS-81-135, Department of Computer Science, Carnegie Mellon University, 1981 (pp. 1-62).

Giarratano, Joseph C. Clips User's Guide. Lyndon B. Johnson Space Center, National Aeronautics and Space Administration, 1993 (pp. 1-159).

Gruber, Thomas R. "A Translation Approach to Portable Ontology Specifications." Knowledge Acquisition, vol. 5, No. 2, 1993, pp. 199-220.

Hogan, Aidan; Blomqvist, Eva; Cochez, Michael; d'Amato, Claudia; de Melo, Gerard; Gutierrez, Claudio; Kirrane, Sabrina; Neumaier, Sebastian; Polleres, Axel; Navigli, Roberto; Ngonga Ngomo, Axel-Cyrille; Rashid, Sabbir M.; Rula, Anisa; Schmelzeisen, Lukas; Sequeda, Juan; Staab, Steffen; Zimmermann, Antoine. "Knowledge Graphs." ACM Computing Surveys, vol. 54, No. 4, 135 pages, Article 71, 2021/2022.

Karpas, Ehud; Abend, Omri; Belinkov, Yonatan; Lenz, Barak; Lieber, Opher; Ratner, Nir, Shoham, Yoav; Bata, Hofit; Levine, Yoav; Leyton-Brown, Kevin; Muhlgay, Dor, Rozen, Noam; Schwartz, Erez; Shachaf, Gal; Shalev-Shwartz, Shai; Shashua, Amnon; Tenenholtz, Moshe. "MRKL Systems: A Modular, Neuro-Symbolic Architecture that Combines Large Language Models, External Knowledge Sources and Discrete Reasoning." arXiv:2205.00445, 2022 (pp. 1-19).

Laird, John E.; Newell, Allen; Rosenbloom, Paul S. "SOAR: An Architecture for General Intelligence." Artificial Intelligence, vol. 33, No. 1, 1987, pp. 1-64.

Lenat, Douglas B. "CYC: A Large-Scale Investment in Knowledge Infrastructure." Communications of the ACM, vol. 38, No. 11, Nov. 1995, pp. 33-38.

Lewis, Patrick; Perez, Ethan; Piktus, Aleksandra; Petroni, Fabio; Karpukhin, Vladimir; Goyal, Naman; Küttler, Heinrich; Lewis, Mike; Yih, Wen-tau; Rocktäschel, Tim; Riedel, Sebastian; Kiela, Douwe. "Retrieval-Augmented Generation for Knowledge-Intensive NLP Tasks." Advances in Neural Information Processing Systems 33, 2020, pp. 9459-9474.

(56) References Cited

OTHER PUBLICATIONS

Lin, Stephanie; Hilton, Jacob; Evans, Owain. "TruthfulQA: Measuring How Models Mimic Human Falsehoods." Proceedings of the 60th Annual Meeting of the Association for Computational Linguistics (ACL 2022), vol. 1: Long Papers, 2022, pp. 3214-3252.

Manakul, Potsawee; Liusie, Adian; Gales, Mark J. F. "SelfCheckGPT: Zero-Resource Black-Box Hallucination Detection for Generative Large Language Models." Proceedings of the 2023 Conference on Empirical Methods in Natural Language Processing (EMNLP 2023), 2023, pp. 9004-9017.

Marr, David. Vision: A Computational Investigation into the Human Representation and Processing of Visual Information. W.H. Freeman and Company, New York, 1982 (pp. 1-19).

McDermott, John. "R1: A Rule-Based Configurer of Computer Systems." Artificial Intelligence, vol. 19, No. 1, Sep. 1982, pp. 39-88.

McDermott, John. "R1: An Expert in the Computer Systems Domain." Proceedings of the First AAAI Conference on Artificial Intelligence (AAAI-80), 1980, pp. 269-271.

Minsky, Marvin. "A Framework for Representing Knowledge." In Winston, Patrick H., ed., The Psychology of Computer Vision. McGraw-Hill, 1975 (pp. 1-76).

Newell, Allen; Shaw, J. C.; Simon, Herbert A. "Report on a General Problem-Solving Program." In Proceedings of the International Conference on Information Processing (UNESCO), 1959 (pp. 1-29).

Newell, Allen; Simon, Herbert A. "Computer Science as Empirical Inquiry: Symbols and Search." Communications of the ACM, vol. 19, No. 3, Mar. 1976, pp. 113-126.

Simmhan, Yogesh L.; Plale, Beth; Gannon, Dennis. "A Survey of Data Provenance in e-Science." ACM SIGMOD Record, vol. 34, No. 3, Sep. 2005, pp. 31-36.

Sowa, John F. "Conceptual Graphs as a Universal Knowledge Representation." Computers & Mathematics with Applications, vol. 23, Nos. 2-5, 1992, pp. 75-93.

Sowa, John F. Conceptual Structures: Information Processing in Mind and Machine. Addison-Wesley, Reading, Massachusetts, 1984 (pp. 1-4).

Tiddi, Ilaria; Schlobach, Stefan. "Knowledge Graphs as Tools for Explainable Machine Learning: A Survey." Artificial Intelligence, vol. 302, Article 103627, 2022 (pp. 1-21).

Van der Aalst, Wil M. P.; Russell, Nick; ter Hofstede, Arthur H. M. Workflow Patterns: The Definitive Guide. MIT Press, 2016 (pp. 1-45).

Vaswani, Ashish; Shazeer, Noam; Parmar, Niki; Uszkoreit, Jakob; Jones, Llion; Gomez, Aidan N.; Kaiser, Łukasz; Polosukhin, Illia. "Attention Is All You Need." Advances in Neural Information Processing Systems 30, 2017 (pp. 1-11).

* cited by examiner

SYSTEM, METHOD, AND PRODUCT FOR TRANSPARENTLY ENCAPSULATED ARTIFICIAL INTELLIGENCE

CROSS-REFERENCE TO RELATED APPLICATIONS

This application is a continuation of patent application Ser. No. 18/999,280, filed on Dec. 23, 2024, entitled, "System, Method, and Product for Transparently Encapsulated Artificial Intelligence," now U.S. Pat. No. 12,406,027, issued on Sep. 2, 2025, which is a continuation of patent application Ser. No. 18/808,143, filed on Aug. 19, 2024, entitled, "System, Method, and Product for Transparently Encapsulated Artificial Intelligence," which is a continuation of patent application Ser. No. 18/538,519, filed on Dec. 13, 2023, entitled, "System, Method, and Product for Transparently Encapsulated Artificial Intelligence," now U.S. Pat. No. 12,099,576, issued on Sep. 24, 2024, both of which are hereby incorporated by reference herein.

FIELD OF THE INVENTION

The present invention relates to the field of artificial intelligence. In particular, the present invention relates to computer systems, methods, and products for processing data; forming, retrieving and processing stored data; identifying, categorizing, predicting, and associating patterns of such data; and making deductions and predictions based on such patterns.

BACKGROUND

Early efforts to develop artificial intelligence often relied on symbolic representations readily understandable to humans, often referred to as Symbolic Artificial Intelligence ('Symbolic AI'). As used in this context, the word 'symbol' and its grammatical variants refers to a persistent representation, notion, or idea generally shared by humans that is not conceptually divisible and which is either applicable or not in a particular instance. For example, the word 'cup' is a symbol for a particular kind of object having requisite human-determined properties and behaviors that persist irrespective of whether that object is tilted in any dimension; enlarged or reduced in perceived size as by placing it further from an observer; immobile or moving; partially occluded or not visible and only remembered; real or imagined; physically manifest or rendered as a word, picture, or projection; or even lying in identifiable pieces after being dropped. The cup may include or be associated with other conceptually indivisible symbols, such as handle, rim, blue, large, and so on. In general, the requisite properties of a symbol may include size, shape, use, capabilities, and many other characteristics, combinations of which are recognized by humans as identifying the symbol. The symbol may identify an object, a trait, a condition, and so on by using human-understood words of all word classes, or other symbols including mathematical ones, such as 'i' for an imaginary number.

Symbolic AI has a number of advantages, among them that (1) the meanings of the symbols are readily understandable by humans such that discrete assertions can be made about them and shared among humans with high reliability of substantial common understanding; (2) the systems employing such symbols can be set to operate according to logical principles and rules developed over generations by philosophers, linguists, mathematicians, and other scholars and practitioners, thus ensuring the Symbolic AI follows familiar, accepted, and proven human principles and methods of reasoning; (3) specialized rules can readily be developed and adopted to address specific needs; and (4) the operation of the Symbolic AI system can in theory be reliably controlled—that is, understood, evaluated, amended, replaced, and so on—by those who program and use them. For example, the steps that such a system takes to arrive at a diagnosis can readily be recorded and accessed by humans to ensure there has not been a programming error or unanticipated confluence of factors resulting in unexpected or incorrect output. Aspects of such advantages have been expressed as the exhibition of 'transparency' and 'alignment,' meaning, respectively, that humans can readily inspect and understand such known Symbolic AI systems to ensure they perform as desired; and it is generally possible to also ensure that such performance is aligned with the goals set out by the humans who designed and use the systems.

A variety of computer languages for implementing Symbolic AI, such as the long-established LISP and Prolog languages as well as many newer ones, have been employed to produce 'expert systems' or 'knowledge systems' for applications in areas such as medical diagnosis and treatment, manufacturing resource management, fraud detection, legal research, and many others. These applications in general require experts in the relevant field to specify knowledge in the form of applicable terms, concepts, situations, rules, decisions, and so on, with respect to as wide a range of situations as they can imagine, whereupon computer programmers implement that body of expert knowledge in a manner consistent with desired logical principles and rules in order to produce desired results. User interfaces are constructed to easily and reliably allow users to input queries or information and retrieve and evaluate results.

For example, a doctor using a medical expert system could input a patient's symptoms, test results, and so and receive an evaluation of possible diseases or conditions the patient may be suffering, or treatments that might be effective, possibly including probabilities, risks, and so on associated with one or more alternative diagnoses or treatments. As another example, a bank officer considering a loan application could input financial and other information related to the applicant or the subject of the loan and be advised of the likelihood of repayment, the amount of interest or penalties that should be imposed, and so on, all relying on the information stored in or accessible to the expert system based on the experience and knowledge of relevant experts.

Notwithstanding the significant advantages of known Symbolic AI systems as outlined above, their effectiveness and range of applicability has been limited. They generally suffer from the following significant disadvantages: (1) the expert data or knowledge base may be time-consuming to assemble and, more significantly, brittle in the sense that it must be updated to include situations not previously anticipated, to add or remove symbols to accurately reflect current usage, to incorporate new ways of categorizing or associating symbols, or to accommodate desired changes in the rules and methods of reasoning by which decisions are made; (2) the systems are best suited to static rather than dynamic environments—those in which the knowledge base, problems, and solutions are well defined and do not change quickly over time; (3) the symbolic knowledge, rules, and solutions encoded by the systems are generally limited to those conceivable by the human experts who define those components and are subject to errors or shortcomings in the knowledge or judgment of those human experts and differences of interpretation or usage among various experts; (4) the systems are generally designed to process inputs that are not ambiguous or noisy, that is, that are free of erroneous, arbitrary, or otherwise unreliable information; (5) a knowledge base system designed for one application might not be optimal for another application, requiring multiple investments in the creation and maintenance of diverse systems, and (6) the systems may not be scalable to domains much larger than those for which they were originally designed even though expansion is desired because of an increase in the number of applicable concepts or the sophistication or ambiguity of relationships among them, or changes in the meanings of concepts or methods of reasoning as generally recognized or desired by the human users. In particular, initial hopes that known Symbolic AI systems could be expanded to replicate human thinking in all its depth and range—referred to as 'general artificial intelligence'—are now recognized as unfounded and unobtainable.

Advances in artificial intelligence beyond Symbolic AI have been achieved using approaches generally referred to as 'Sub-Symbolic AI' (sometimes also referred to as 'Statistical AI,' or 'Non-Symbolic AI'). The two types are generally distinguishable on the basis that Symbolic AI uses symbols and rules as noted above, whereas Sub-Symbolic AI uses numerical values and mathematical operations for such purposes as designing and training models, as well as classifying, predicting, and associating patterns of data processed by such models.

Known Sub-Symbolic AI systems typically employ artificial neural networks—computer-implemented algorithms embodied in software and/or hardware—mimicking some functional aspects of biological neurons and their connections, such as those in the human brain. Such implementations are so common that the word 'artificial' is often dropped as it is understood that the architecture and features merely reflect those of biological neurons and their connections. In accordance with such standard usage, the term 'neural network' as used in this Specification will hereafter be understood, unless otherwise specified, to refer to an artificial neural network, and the word 'neuron' will similarly be understood to refer to an artificial neuron.

Neural networks are adaptive in that they can be trained to learn from data presented to them. A neuron of such networks typically has a set of inputs, a weight associated with each input, a bias term, an activation function, and an output. The output of a neuron is generally computed by applying the activation function to a weighted sum of the inputs and the bias. Typically, learning is achieved by adjusting the weights—that is, the degree to which input values received from other connected neurons affect the activation of the receiving neuron—and biases of the neurons based on a learning algorithm. Typically, the learning algorithm seeks to minimize a loss function that measures the difference between the network's actual output and the desired output during a 'feedforward' iteration of activity. A common learning algorithm for neural networks is back-propagation, which propagates the error signal from the output layer backward to the input layer to update the weights and biases of the neurons in those layers.

Learning may be 'supervised' or 'unsupervised.' Supervised learning refers to the use of labeled datasets to determine the error between the known label and the network's resulting classification, the goal typically being to establish categories into which new data will be assigned. Unsupervised learning refers to training in which the network recognizes categories or patterns without comparing iterative results with known classifications, though typically the network's results will be evaluated to determine if they comport with what the designers expected. The goal in unsupervised learning may be to obtain insights into how data is structured, i.e., what patterns or categories it manifests and how to detect anomalies.

Various known approaches are used in conjunction with neural networks to improve their design and operation. For example, 'genetic algorithms' may be used to initialize or change a neural network's weights, biases, activation functions, topographical designs, and so on, using an iterative process of random or pseudo-random changes analogous to genetic mutations until a result closest to a desired result is obtained. 'Reinforcement learning' may be used to provide the neural network with rules and goals such that success in reaching the goals in accordance with the rules results in the application of a 'reward function' encouraging repetition of the successful behavior. Various probabilistic approaches, such as varieties of Bayesian networks and Hidden Markov Models, may also be used in known Sub-Symbolic AI systems to complement learning or other functions. Other complementary techniques include 'fuzzy logic,' which may be used for example in learning, categorization, prediction, or association by employing degrees of truth or correspondence rather than the dichotomy of true or false, or '1' or '0,' in accordance with Boolean logic.

Types of probabilistic system referred to as 'large language models' have been used in conjunction with neural networks, typically in the domain of natural language processing. Such systems can generate text that integrates probabilistically related examples of language usage from a large database of natural language texts. While their output may appear human-like because it reflects the human-generated database, it generally lacks most aspects of human cognition as it relies largely on probabilities of occurrences of text fragments based on prior text fragments and the ability of neural networks having successive layers of pattern-recognition processing—often referred to as 'deep learning'—to identify patterns. Large language models typically employ an approach known as 'transformer modeling,' which is a type of deep-learning neural network that also has applicability in other domains such as computer vision and speech recognition.

Non-Symbolic AI systems, like Symbolic AI systems and numerous other computer systems, have benefitted from the application of known techniques for partitioning, distributing, and otherwise allocating various aspects of computational tasks. In particular, many Non-Symbolic AI systems employ the techniques of parallel or distributed computing.

Parallel computing involves the use of multiple processors at the same time, each working on separate tasks that typically can be completed without input from other parallel processors. Concurrent computing is similar but may involve communication among processing units during execution of concurrent tasks. Parallel computing also may be applied at the instruction level, such as pipelining in which independent types of operations, such as fetch or execute, are interleaved.

Distributed computing typically involves the use of multiple processors working together on separate aspects of a task or on multiple tasks that relate to each other. Thus, a distributed computing system typically involves multiple computers communicating over a network with each other and/or with a managing computer or group of computers. Different computers in the system, which may be physically proximate or distant from each other, execute different aspects of a distributed computer program. In some applications, for example, it is advantageous to physically locate one aspect of the distributed computer program close to the user and other aspects at central locations where economies of scale and other advantages can be realized.

Notions such as 'edge,' 'fog,' and 'cloud' are sometimes employed to distinguish among networked computing resources allocated, respectively: close to the place where data is generated and collected, such as in user telephones or smart devices (e.g., billions of devices); at decentralized locations (e.g., millions of processing nodes) for processing edge-generated data generally close enough to, or otherwise capable of achieving efficient communication with, the edge devices to achieve relatively low latency and other advantages; and at a relatively small number of centralized locations (e.g., thousands of computers) providing data storage and other supporting services to the fog processors. The computing units in all three zones cooperate to achieve tasks encompassed by the operation of the network as a whole.

The terms 'Distributed Artificial Intelligence' or 'Decentralized Artificial Intelligence,' (DAI) encompasses numerous approaches for leveraging advances in networking and hardware to contexts in which, for example, data is generated by millions of devices of differing types that may be physically dispersed yet intended to cooperate in various ways within a system. It is common for such distributions to include aggregation in edge, fog, and cloud zones. Paradigms for achieving parallel or distributed processing of Sub-Symbolic AI include 'model parallelism,' 'data parallelism,' 'pipeline parallelism,' 'hybrid asynchronous and synchronous parallelism,' 'collaborative or federated learning,' and others. Distribution of tasks can be achieved in various workflow schemes involving 'distributed data collection,' distributed pre-processing,' 'distributed training,' 'distributed inference,' 'distributed decision making,' 'distributed model operation and evaluation,' and other schemes.

Thus, in some DAI systems, critical tasks associated with Sub-Symbolic AI, such as training or inference, may be executed in accordance with parallel and/or distributed processing. In such systems, the terms 'agent' or 'worker' or the like may be used to refer to a unit of parallel or distributed processing. 'Multi-Agent Systems,' are extensions of the DAI field of AI research. Generally, the agents in such systems are computational units that exercise some degree of autonomy and may be self-organizing. Typically, such agents operate in a local environment that is a subset of the global environment in which the system as a whole operates.

Distributed and parallel computing operates in Sub-Symbolic AI not only at the macro levels just noted but also at the micro level of the neurons and their connections in the neural networks. Those neurons that are active to effectuate various functions typically operate in parallel, either synchronously or asynchronously. Also, neural networks enable distributed representation, which means information allowing pattern recognition or categorization, for example, is enabled by a pattern of activation of multiple neurons in the network. The neurons typically are arranged in layers, such as input layer, middle or hidden layer or layers, and output layer. For example, the output of input-layer neurons becomes the input of all or a subset of the hidden-layer neurons, and their output becomes the input of the output-layer neurons. Hidden layers are required for the networks to make non-linear distinctions and associations, that is, to categorize other than by a linear function. As used herein, the term 'neural network' typically refers to a neural network having one or more hidden layers. Typically, during a training processing, the weights of interconnections are adjusted so that a first pattern of activity applied to input neurons results in a distinguishable first pattern of the network's output-neuron activity whereas a second pattern of input applied to the same network results in a second pattern of output-neuron activity distinguishable from the first pattern of output-neuron activity without altering weights, biases, or activation function. Thus, the same neuron network can identify, or retrieve, multiple patterns of data representing different information.

To carry out various functions of Sub-Symbolic AI systems and neural networks, it is convenient to employ mathematical methods such as matrix algebra. Specialized computing hardware, such as Graphics Processing Units, or GPUs, are optimized for performing such calculations. Notably, the mathematical operations do not employ representations of symbols; rather, they employ numbers representing the states of neurons or their connections. For example, a number in a two-dimensional matrix may indicate whether two specific neurons are connected and, if so, the weight of their connection, meaning how much and what kind of effect (positive or negative) the output of one has on the input of the other.

What the preceding, and other, known Non-Symbolic AI systems have in common is reliance on neural network processing for critical tasks. These systems therefore benefit and suffer from certain inherent characteristics of neural network design and operation.

Neural networks provide many advantages, among them: (1) the ability to store information by inherent distributed representation so that one group of interconnected neurons is capable of distinguishing multiple input patterns, thus constituting storage of such patterns or the ability to categorize new input patterns to a closest match; (2) as a consequence of its parallel processing and distributed representation, the potential ability of the network to continue successful operation despite the failure of a subset of its elements due to any number of factors such as hardware failure, accidental corruption, or purposeful interference (hereafter referred to as 'fault tolerance'); (3) the ability to detect complex nonlinear relationships between both dependent and independent variables; (4) the ability to update operation by exposure to additional training data representing new types of, or relationships among, information without redesigning or abandoning the basic neural network architecture; (5) the availability of specialized hardware processing units well suited for the mathematical calculations central to neural network training and operation; and (6) amenability to massively parallel and/or distributed computing architectures.

However, neural networks suffer from significant disadvantages, some of which have generated considerable alarm among both specialists and the general public. Notable among them are the problems of (1) lack of transparency, (2) difficulty of selective modification, (3) lack of alignment, (4) need for large and representative training sets both to provide accuracy and to prevent bias, (5) intensive use of computational resources requiring significant power input and resulting in substantial heating often requiring sophisticated cooling systems, (6) difficulty generalizing or extending beyond the domain encompassed by the training sets, (7) susceptibility to 'overfitting' the network so that it is too closely tuned to training data and any noise (i.e., erroneous or spurious data) included in the training data, thereby negatively impacting its ability to generalize; (8) potential performance degradation as the diversity of training samples increases or the number of layers in a deep learning network increases, and (9) potential adverse implications of fault tolerance including difficulty in detecting faults that have marginal impacts in most cases but potentially larger ones in rare cases.

The first-noted of such disadvantages—lack of transparency—is sometimes conceptualized using the metaphor of a 'black box,' meaning that it is very difficult, usually impossible as a practical matter, to 'open' the black box of a neural network to track and report how the network produced an output. The values of weights, biases, and other aspects of the network and its neurons may be recorded and read, but their effects on computation typically are too complex to be readily translated into cause-and-effect or other explanatory information understandable by humans. This difficulty is due in part to the distributed representation inherent in neural networks and may be exacerbated by the adaptive nature of learning by a neural network, which involves adjustments of weights, biases, and possibly connections. Also, analogous to the operation of biological brains, neural networks may rely on temporal factors such as the frequency of firing rates, relative timing of multiple inputs into the same neuron, oscillations and standing waves of activation in a segment of the network, and so on. Such temporal factors may introduce enormous complexity into an analysis of why the network is performing as it is, and the dynamic nature of the network may require continuous updating of the analysis.

Distributed representation also contributes to the difficulty of modifying a neural network after it has been trained. Because connection strengths among and biases of neurons have been adjusted to allow discrimination among multiple input patterns and map those input patterns to distinct output patterns, it is difficult to selectively alter the weights and biases, or potentially the connection topography, to achieve specific desired changes in the mappings. Rather, re-training of the neural network using old and new training data may be required.

Lack of alignment refers to the problem that a neural network may pursue a human-defined objective in an anticipated or undesirable manner and arrive at an undesirable or unexpected result. For example, a reward function may be based on a simulated car passing a gate on a simulated circular track, which the designers conceived as occurring by completing laps. However, the AI may learn that the fastest way to reap rewards is to pass through the gate, then reverse direction and pass the gate backwards, then go forward again and so forth, without completing the rest of the course. While this simple example seems easily detected and remedied, many real-world situations arise in which the divergence of behavior between what was intended and what literally satisfies the programmed goals is much more subtle and may escape detection or prediction altogether. Lack of alignment may in some cases be due to undetected bias in the training data or in subsequent data from which the network learns—for example, one type of sample data is unintentionally favored over another type of sample data. Notorious experiences with early neural network systems resulted in race-based bias in the context of face recognition, for example.

There are situations in which unexpected behavior, or the pursuit of unexpected goals, due to lack of alignment could be particularly consequential, as for example if the neural network is used in military contexts to control weapons, in self-driving cars, as aids to surgeons, in determining prison sentences, in determining job qualifications, and many other contexts. A further potential problem is that the unexpected results could constitute a negative feedback mechanism that changes reality as seen by the neural network or by humans. For example, a neural network system could be used to generate content for internet pages, or the system could author books and articles that contain erroneous, unexpected or biased information. This new content becomes part of the reality that future data collection by AI systems and humans rely on.

To address such limitations and for other reasons, some systems have been built or proposed that combine aspects of Symbolic AI with aspects of Non-Symbolic AI and neural networks in particular. Such hybrid systems are sometimes referred to as 'Neuro-Symbolic AI.' One taxonomy that has been proposed identifies the following types of Neuro-Symbolic AI systems: (1) deep-learning neural networks, which are essentially Non-Symbolic in operation but may claim some weak relationship to Symbolic AI in that they may code symbolic concepts into input values and decode output values into symbolic concepts; (2) hybrid systems in which the core neural network is loosely coupled with components providing logical or search functions in symbolic terms, such as a tree search function; (3) hybrid systems in which a neural network focuses on some tasks, such as object detection, and interacts with a symbolic system providing ancillary services such as accepting and responding to queries; (4) hybrid systems in which symbolic knowledge is used to help define the architecture, connective characteristics, or training regimen of neural network systems by, for example, influencing the loss function by which the weights or biases of the network are adjusted, or creating a direct correspondence between neurons and elements of logical formulas; (5) 'embedding' techniques in which symbolic representations are transformed into vector spaces and employed as constraints on the network's loss function; and (6) a neural network fully capable of symbolic representation and reasoning.

Notably, all such Neuro-Symbolic AI systems rely in significant measure on the use of neural networks. Thus, these hybrid systems suffer from many of the same limitations as noted above with respect to strictly Sub-Symbolic AI systems, and potentially at the additional cost of incorporating limitations of Symbolic AI.

As concern has grown about the black-box aspect of neural-network-based AI systems, various efforts have been initiated to address the problems of transparency and alignment in particular. These efforts have been led by companies involved in building such systems, academic researchers, public interest organizations, and others. For example, the "Collective Intelligence Project" enlisted about 1,000 adults in the United States to contribute principles and values they thought should dictate and guide the operation of large language models. The goal was to train the neural networks underlying chatbots to more fairly reflect diverse viewpoints. Research programs by other organizations focused on understanding why neural networks adapt in certain ways, why different kinds of inputs have different impacts, and so on.

Yet other efforts, like the "Foundation Model Transparency Index" sponsored by Stanford University, provide assessments of the degree of transparency achieved by various AI systems referred to as "foundational" because they are being rapidly adopted around the world for a wide variety of applications. In 2023, the inaugural iteration of the Index focused on ten foundational AI systems and considered 100 indicators of transparency. The best of the ten AI systems scored around 50% and the worst around 10% on a scale on which adequate transparency would score 100%—a result the researchers characterized as "a fundamental lack of transparency in the AI industry."

Governments and intra-governmental bodies have increasingly focused on understanding and constraining perceived risks from AI systems. Notably, policy makers of the European Union have invested substantial effort to develop an "A.I. Act" to address risks associated with the sale and use of artificial intelligence while acknowledging the benefits and inevitability of AI-system development. Similar efforts are underway in the United States, including proposed legislation such as the "Algorithmic Accountability Act," the "AI Disclosure Act," and others. While such legislation often focuses substantially on economic impacts of AI—such as the displacement of workers, infringement of copyrights, and so on—lack of transparency and alignment typically play a role in assessing the overall risk.

Such efforts as noted above typically seek ways to understand or constrain the impact of AI systems, but generally do not suggest ways of eliminating the black-box problems inherent in the neural network architecture driving those systems. Notably, there even appear to be incentives for the companies building foundational AI systems to retain the black-box characteristic of neural networks. Those incentives include the protection of intellectual property including patents and trade secrets; avoidance of lawsuits alleging that the neural networks were trained on copyrighted or otherwise protected material; avoidance of disclosing what strategies and values are used to ensure the systems are not offensive or dangerous; and so on.

Thus, while Non-Symbolic systems and combined Symbolic and Non-Symbolic AI systems have vastly expanded the performance and utility of artificial intelligence, they all suffer from limitations inherent in neural network architectures. What is needed are systems, methods, and products that address or overcome such limitations.

SUMMARY OF THE INVENTION

Systems, methods, and products are described herein with respect to illustrative implementations of the present invention that identify significant patterns in data and persist those patterns and/or their constituents as data entries in data bases or as transitory patterns of activation. The constituents associated with significant patterns include data constructs representing concepts or filter/exemplars. Those concepts or filters/exemplars themselves represent significant patterns. Recursive identification of significant patterns of significant patterns, and significant patterns of those patterns, and so on to any degree of recursiveness desired, facilitates the leveraging of combinatorial expansion to categorize, recognize, associate, and predict complex combinations of information while maintaining practical control over resources. In preferred implementations, the elements of the systems, methods, and products described herein are transparently encapsulated, and their behaviors are monitored and enforced, to provide alignment with human-determined objectives and rules.

More specifically, in one embodiment a system is described that includes a data collector and processor that provides processed data, one or more data banks that persist a first plurality of data entries, and a pattern identifier that identifies a plurality of significant patterns in the processed data and, for each of the plurality of significant patterns, either identifies one or more of its constituents that include one or more data entries of the first plurality of data entries or, if no such constituents exist, creates them and persists them in one of the data banks. In some implementations, each of the first plurality of data entries represents a first significant pattern and is a constituent associated with a second significant pattern. Thus, the data banks may be arranged to persist recursive data entries such that those entries represent significant patterns, significant patterns of those significant patterns, and so on up to any desired degree or level of recursiveness.

In some embodiments, each of the first plurality of data entries is transparently encapsulated and/or represents a filter/exemplar or a concept. In various implementations, the processed data includes one or more filter/exemplars, one or more concepts, and/or one or more instance of external input data. In some implementations, a data bank may be hierarchically organized, and such organization may be by level, space, or both. The hierarchy may be based, at least in part, on levels of abstraction.

In some embodiments, each of the first plurality of data entries includes one or more linking attributes linking it to at least one other of the first plurality of data entries, and/or one or more activation-intensity attributes. In some implementations of those embodiments, the linking attributes may specify preferences for linking, including by specifying vectors referenced to a world orientation reference in an applicable space.

In some embodiments, the pattern identifier primes at least one of the first plurality of data entries to facilitate identification of a first significant pattern of the plurality of significant patterns. In some implementations of those or other embodiments, a first data entry of the first plurality of data entries includes one or more activation-intensity attributes, and the pattern identifier primes the first data entry by altering its one or more activation-intensity attributes.

In some embodiments, the pattern identifier identifies a second plurality of data entries of the first plurality of data entries, each of the second plurality of data entries having an activation intensity in a distinguishing state. In some implementations of such or other embodiments, the pattern identifier may identify a first significant pattern in the second plurality of data entries and identify or create a first data entry of the first or second plurality of data entries representing the first significant pattern. In those and other such implementations, the pattern identifier may identify a first significant pattern of the plurality of significant patterns, wherein at least one of the second plurality of data entries represents a constituent of the first significant pattern.

In some embodiments, a plurality of constituents associated with a first significant pattern of the plurality of significant patterns are set to maintain resonance. In some implementations of those or other embodiments, a first significant pattern and a second significant pattern of the plurality of significant patterns are constituents of a third significant pattern of the plurality of significant patterns. In such or other implementations the first significant pattern may be persistent and the second significant pattern may be transitory.

In some embodiments, the system includes a persistence manager that determines whether to preserve a first significant pattern of the plurality of significant patterns as a persistent significant pattern, a transitory significant pattern, or both. In some implementations of those or other embodiments, the persistence manager may identify a first data entry of the first plurality of data entries and maintain its constituents in a pattern of activation.

In some embodiments, the first plurality of data entries comprises a first, a second, and a third data entry, and the system includes a persistence manager that may prune the first data entry, merge the first data entry with the second data entry, and/or transfer or replicate the third data entry between or among the one or more data banks. In some embodiments, the system includes a persistence manager that may create one or more canonical forms of any two or more of the first plurality of data entries and to add the canonical forms to the first plurality of data entries.

In some embodiments, the system includes an objectives manager that manages a plurality of objectives, where a first objective of the plurality of objectives includes the identification by the pattern identifier of one or more of the plurality of significant patterns in the processed data. In some implementations of those or other embodiments, the plurality of objectives includes one or more core objectives. In such or other implementations, the system includes an enforcer that may monitor each of the plurality of objectives and each of the first plurality of data entries to ensure individual and collective consistency with each of the one or more core objectives. In various implementations of those or other implementations, the system includes an attention model, and an awareness manager that may build, maintain, access, and issue a plurality of reports on the attention model. In such implementations, the objectives manager may manage a second objective of the plurality of objectives based, at least in part, on a report from the awareness manager.

In some embodiments, the system also includes a brain-computer interface to interface with human or non-human brains in order to provide brain data to the data collector and processor.

Methods are also described in accordance with the present invention. In one embodiment, a method includes the steps of providing processed data; persisting a first plurality of data entries; identifying a plurality of significant patterns in the processed data and, for each of the plurality of significant patterns, realizing one or more of its constituents comprising one or more data entries of the first plurality of data entries. In some implementations of that embodiment, each of the first plurality of data entries represents a unique one of the plurality of significant patterns and is a constituent associated with one or more of the plurality of significant patterns. Each of the first plurality of data entries may be transparently encapsulated in those or other implementations. Also, the data entries may represent a filter/exemplar or a concept. In some implementations, the method includes the step of priming at least one of the first plurality of data entries to facilitate identification of a first significant pattern of the plurality of significant patterns. In those or other implementations, the method also includes the step of identifying a second plurality of data entries of the first plurality of data entries, each of the second plurality of data entries having an activation intensity in a distinguishing state. In some embodiments, a plurality of constituents associated with a first significant pattern of the plurality of significant patterns are set to maintain resonance. In some embodiments, a first significant pattern and a second significant pattern of the plurality of significant patterns are constituents of a third significant pattern of the plurality of significant patterns.

In some embodiments, the method also includes the step of determining whether to preserve a first significant pattern of the plurality of significant patterns as a persistent significant pattern, a transitory significant pattern, or both. Another step in some embodiments is that of creating one or more canonical forms of any two or more of the first plurality of data entries and adding the canonical forms to the first plurality of data entries. Yet another step in some embodiments is that of managing a plurality of objectives. In some implementations, a first objective of the plurality of objectives includes the identification by the pattern identifier of one or more of the plurality of significant patterns in the processed data, and/or the objective of ensuring that each of the objectives is individually and collectively consistent with each of a group of core objectives.

A system is also described in accordance with the present invention that includes a data collector and processor that provides processed data; a plurality of data entries in one or more data structures including a plurality of concepts persisted in a hierarchy of pattern levels; and a restricted pattern identifier that identifies a plurality of significant patterns in the processed data and, for each identified significant pattern, identifies or creates one or more first data entries of the plurality of data entries representing a concept associated with the identified significant pattern. In some implementations, the pattern identifier also identifies a first significant pattern of the plurality of significant patterns and identifies or creates a first plurality of concepts persisted in a first pattern level associated with the first significant pattern and identifies or creates a concept persisted in a second pattern level representing the first significant pattern. In various implementations, the pattern identifier may be restricted to identifying significant patterns based solely on any one or more of pattern indicia (a) through (h), or specific portion of any indicia, as described below.

The above embodiments and implementations are not necessarily inclusive or exclusive of each other and may be combined in any manner that is non-conflicting and otherwise possible, whether they be presented in association with a same, or a different, embodiment or implementation. The description of one embodiment or implementation is not intended to be limiting with respect to other embodiments or implementations. Also, any one or more function, step, operation, or technique described elsewhere in this specification may, in alternative implementations, be combined with any one or more function, step, operation, or technique described in the Summary. Thus, the above embodiments and implementations are illustrative rather than limiting.

BRIEF DESCRIPTION OF THE DRAWINGS

In the drawings, like reference numerals indicate like structures or method steps and the leftmost digit of a reference numeral indicates the number of the figure in which the referenced element first appears (for example, the element 100 appears first in FIG. 1). In functional block diagrams, rectangles generally indicate functional elements, parallelograms generally indicate data, and arrows indicate direction of data and/or control flow. In flowchart diagrams illustrating methods, rectangles generally indicate process steps, rounded rectangles indicate start or end, diamonds indicate decision or branch, and arrows indicate sequencing of steps. These conventions, however, are intended to be typical or illustrative, rather than limiting.

DETAILED DESCRIPTION

Figure 1:
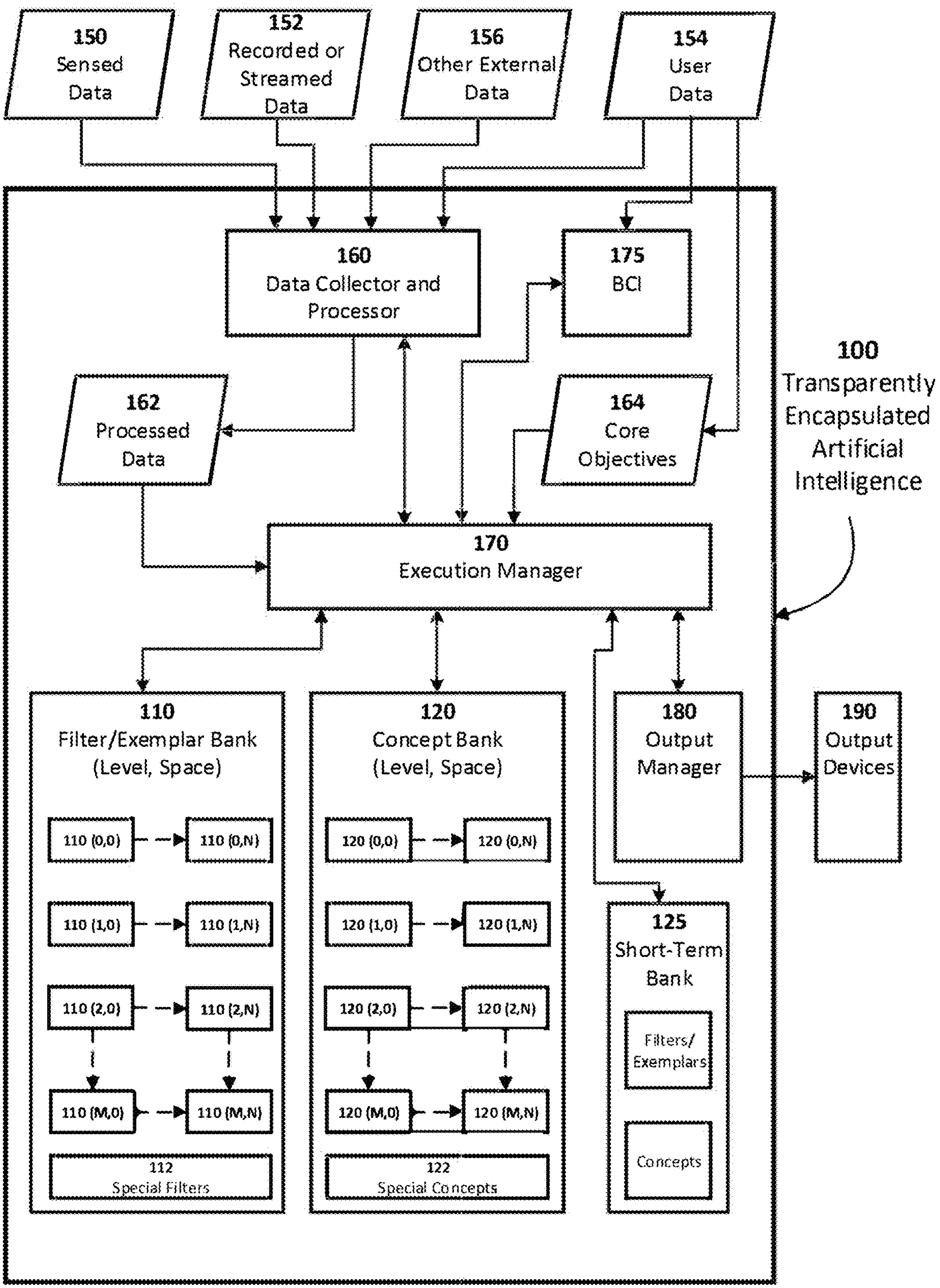
FIG. 1 is a functional block diagram of one embodiment of an artificial intelligence in accordance with the present invention, including a data collector and processor, an execution manager, a brain-computer interface, an output manager, a filter/exemplar bank, a concept bank, and a short-term bank.

Systems, methods, and computer products in accordance with the present invention are now described with reference to an illustrative embodiment shown in FIG. 1 as Transparently Encapsulated Artificial Intelligence (hereafter, 'TEAI') 100. TEAI 100 and other embodiments typically may be implemented using digital computers, but all or portions of them may be implemented using analog technologies or any other known or future computing system, device, and/or method. The functional elements and data banks of TEAI 100 may operate and communicate synchronously, asynchronously, or both. The computers may be general purpose computers, or they may be designed and/or dedicated—with respect to software, hardware, firmware, or any combination thereof—specifically for carrying out the functions of the present invention. Such functions may be carried out by co-located systems, devices, or functional elements or may be physically distributed in accordance with any known or future technique or technology, including for example, distribution among edge, fog, and cloud facilities.

With respect to the term 'known or future,' the word 'known' will generally be understood as used in this Detailed Description to refer to something presently known to those of ordinary skill in the relevant art (with the exception of neural networks, noted below), and 'future' as used in this context to systems, devices, and/or methods that may not now be known but that are discovered, conceived, or developed in the future. Also, 'known or future' is intended to include presently known systems, devices, and/or methods that are not now sufficiently developed, or efficiently programmable or otherwise deployable, to perform the functions described herein, but that may be in the future. For example, the present embodiment may be implemented by digital computers as currently available and employed, or some or all its functions may be implemented now or in the future using quantum computers, exascale computers, or other technologies in the developmental or early deployment stages. It is emphasized, however, that though neural networks are a known technology and may be considered as a technique for storing, retrieving and processing data, among other things, their use is not contemplated or required in any embodiment or implementation of the present invention and thus generally not included within the term 'known or future' as used herein.

Transparency as used herein generally refers to the qualities of reliable and easy access, disclosure, and comprehension. Encapsulation is understood to generally refer to a process of enclosing something in a container (typically, in the present context, enclosing data and/or instructions within virtual containers) for the purpose of preserving the contents from external interference or adulteration. Encapsulation of a system or parts thereof as referred to herein also encompasses protection against changes of internal state due to actions internal to the system that are not readily predictable, discernable, or controllable (such as disadvantageously occurs with respect to neural networks).

Thus, the term 'transparently encapsulated' will generally be used herein to indicate that information has been substantially enclosed and preserved such that humans, optionally with the assistance of computers, can readily detect, perceive, identify, control, report on, and comprehend it, and so that it is substantially protected against unwanted interference or adulteration. In typical embodiments of the present invention, functional elements and/or data involved in critical tasks such as categorization, pattern recognition, association, and prediction are advantageously transparently encapsulated in accordance with known or future techniques to substantially ensure that their properties and functionality can only be altered using well defined and transparent procedures. Known or future techniques may also be applied to substantially ensure that the status of such key elements is promptly and reliably reported.

Without compromising such qualities, in some implementations known or future security techniques may be used to purposefully restrict access to TEAI 100 and other implementations of the present invention to a particular user or group of users so that it may not be used or accessed in an unauthorized manner. Such a user may be human or a computer. For example, a password or other form of authentication may be required to provide data to, obtain output from, or inspect or alter the operation of TEAI 100.

The characteristic of transparent encapsulation advantageously applicable to elements of TEAI 100 stands in contrast to the inherent lack of transparency characteristic of neural networks. A related notable difference is that computational processing within TEAI 100 is not inherently distributed as in neural network architectures. In a neural network, as noted, patterns of input signals to neurons in an input layer result in a pattern of firing of neurons in connected one or more hidden layers (for operations other than simple linear discrimination), which results in a pattern of firing of neurons in a connected output layer that constitutes an output signal. The pattern of firing of the neurons in the output layer thus allows for the categorization, identification, or retrieval of the information represented by the pattern of input signals, which information can thus be said to be inherently distributed within and accessible from the neural network. Such distribution or access is dependent on how the neurons are figuratively (or literally in the case of hardware implementations) wired together and how their weights, biases and/or signal processing functions are configured. Typically, representations of multiple possible input signals may be stored in the same neural network in the sense that different patterns applied to the same input neurons and processed by the same hidden layer(s) are expected to result in distinguishable patterns in the states of the same output neurons. Thus, different inputs to the same network result in different responses at the output layer in accordance with complex interconnections requiring enormous numbers of computations and adjustments; sometimes dependent on temporal aspects such as accumulation of input signals sufficient in strength to trigger firing, timing of receipt of inputs, or pulse rate or frequency of signals between neurons; and sometimes requiring distinctions to be made between possible alternative outputs based on relative strengths or other qualities of the outputs. Generally, an intensive and costly effort (in terms both of computational resources and power consumption) is applied to store information in a neural network, and the process of extracting information inherently involves hidden elements and possibly non-deterministic or non-specific factors and results. It typically is difficult or a practical impossibility to trace the paths and effects of even a small fraction of the computations taking place continuously, and sometimes adaptively, within the network.

Advantageously, computational processing within TEAI 100 and other preferred embodiments is not inherently distributed as noted above with respect to neural networks. However, this does not preclude the potential use of conventional distributed and/or parallel processing techniques to achieve computational advantage in executing the functions of TEAI 100. For example, one functional element of TEAI 100 may execute using one instruction stream while another functional element of TEAI 100 executes on another stream under the control of any number of processors accessing potentially different memory units, perhaps making use of multiple copies of some or all the functional elements and/or data constructs and perhaps located at different physical sites, all in accordance with known or future distributed and/or parallel processing techniques.

Notwithstanding the preceding, and while again highlighting that the operations of TEAI 100 and other embodiments in no way depend on or typically contemplate the use of neural networks for any function or purpose, it is not excluded that neural networks may be used in circumscribed situations. For example, it may be desired to use a neural network with the understanding and intention that its operation cannot be guaranteed to be transparent and/or encapsulated and that these shortcomings are of no consequence or are otherwise acceptable in the limited context of its use. (For example, a camera providing external input data to TEAI 100 may employ a neural network to assist in focusing, adjusting the lens aperture, and so on. Or it may be desirable to compare the operation of a neural network to that of TEAI 100 using the same input, or for comparing human to TEAI 100 behavior, and so on.) However, it is emphasized that in contrast to many known AI systems, neural networks advantageously need not be employed in any data bank, functional element, or other aspect of TEAI 100 or any other embodiment in accordance with the present invention.

Advantageously, important functions of TEAI 100 are carried out based on constructs that are fundamentally different from those of neural networks. In particular, information about patterns is encapsulated within data constructs (referred to in this Specification as 'data entries') that in general and non-limiting terms may be described by such terms as discrete, specific, deterministic and sufficient, elemental, identifiable, or distinguishable. 'Deterministic and sufficient' in this context is intended generally to convey that the information imparted by a data entry is specified and knowable by examining its contents and generally without need for calculations external to the data entry. The data entry is representative of something (i.e., a 'concept' or 'filter/exemplar' as described below) that is sufficiently described, specified, and determined without input from other data entries or other data from sources in a network or otherwise. The data entry could be removed from the data bank and isolated, and if examined it would retain sufficient (and preferably, complete) information to represent the concept or filter/exemplar. (This meaning is not intended to foreclose in some implementations the creation of data entries that include some randomly generated or arbitrary components for such purposes as exploring the results of unanticipated conditions, partially simulating non-deterministic systems, introducing novelty, or for other reasons.) Similarly, 'elemental' in this context is intended generally to convey that a data entry contains required information with respect to the 'constituent' or 'significant pattern' (as those terms are described below) that the data entry represents. That is, in general terms, the roles and impacts of a data entry are substantially determined by the information it contains rather than calculated from moment to moment based on the processing of information external to the data entry. As described in greater detail below, the number of data entries may readily be maintained at practical levels by leveraging combinatorial expansion and other techniques that allow vast computational complexity and diversity while maintaining transparency.

Speaking broadly to introduce terms that will be more fully described below, and without intending to limit or alter such detailed description, the operations of TEAI 100 employ two types of data constructs: concepts and filters/exemplars.

A 'concept' is data that, generally speaking, specifies something identified by a significant pattern of its constituents. The constituents in this preferred embodiment consist of other concepts and/or filters/exemplars linked to each other in any manner sufficient to preserve, or allow reconstruction of, the identity of the significant pattern. This 'something' is intended to include anything identified as a significant pattern and may be described in a non-limiting way by such broad terms as a thing, idea, or a symbol. Like a symbol used in the conventional sense, a concept may be understandable by humans, but, advantageously, it need not be.

A 'filter/exemplar' specifies a spatial relationship (or other relationship established with respect to dimensions of spaces other than physical space) among collections of concepts or other filters/exemplars. Filters/exemplars are substantially specified by linking to other filters/exemplars of which they are constituted.

In some embodiments in accordance with the present invention, data entries may consist of a single type of combined concept and filters/exemplar, or either type may be omitted, or any combination or variation thereof. Similarly, data banks 110, 120, and 125 may be combined or varied in any way, including by providing only a single data bank. In preferred embodiments, data banks, their elements, and/or the data entries stored in them are transparently encapsulated.

Both concepts and filters/exemplars arise from analysis of patterns of particular significance ('significant patterns') identified in data generated outside of TEAI 100, such as pixels of image data of the external world from a camera (wherein the pixel data is an example of 'an instance of external input data'), and in data generated internally by TEAI 100—specifically, patterns of concepts and/or filters/exemplars, which in the present embodiment may be persisted as data entries or maintained in a transitory pattern of activation. (The term 'processed data' is used for convenience in this Specification to refer to either such externally or internally generated data.) Thus, in the illustrated embodiment, each concept or filter/exemplar represents a significant pattern of its constituents and may be a constituent of one or more other significant patterns.

Generally, a significant pattern may be discerned from processed data based on the state, characteristics, or associations among the data; the relationship of the data to events or circumstances external or internal to TEAI 100; characteristics of or associations among previously recognized concepts or significant patterns that are associated with the data; and other factors described more fully below. It is emphasized that the pattern identified as being significant is not necessarily a physical spatial pattern (and, similarly, a filter/exemplar does not necessarily represent a physical spatial pattern). Rather, the significant pattern may be a temporal pattern, or a pattern discerned in relation to any combination of dimensions applicable to the 'space' (such as physical space, temporal space, people space, and so on, as described below) that TEAI 100 is analyzing.

Typically, a space may have a base level of external data not divisible into constituents by means available to TEAI 100 (referred to as being 'elemental data'), but which may represent concepts and filters/exemplars from which associated significant patterns may be identified. For instance, in ordinary physical space, a single pixel from a camera may have only one data variable indicating either shaded or not shaded. (See filter/exemplar 401 of FIG. 4.) This single pixel may be a constituent associated with one or more significant patterns (e.g., filters/exemplars 402 through 408 of FIG. 4) and thus preserved as a constituent concept (e.g., a 'point' or 'dot' concept) and/or a constituent filter/exemplar, but not itself have any constituents since it consists of the most elemental level of data in the applicable space. For convenience and efficiency, simple, frequently encountered, or otherwise fundamental or basic filters/exemplars, such as filters/exemplars 402 through 408, may be included in base level 0 as in this illustrative implementation even though they may be significant patterns constituted by particular applications of filter/exemplar 401.

TEAI 100 typically employs recursive processes. That is, concepts and filters/exemplars are created from, and may be identified by, the identification of significant patterns of concepts and/or filters/exemplars, and those new concepts and filters/exemplars may become constituents of significant patterns resulting in the creation of yet more complex concepts and/or filters/exemplars, and so on. The result is the capability to preserve any desired degree, or 'level,' of significant patterns, significant patterns of significant patterns, significant patterns of significant patterns of significant patterns, etc., wherein the constituents (the data constructs concepts and/or filter/exemplars) of all such patterns may be identified and associated with each other. Because such constituents at all levels can be combined with each other in any combination to identify, preserve, or retrieve information arising from significant patterns of processed data, the architecture just described allows for enormous diversity of information and flexibility of data processing within practical limits of data storage and while ensuring transparent encapsulation. Reference may thus be made in this regard to the benefits of 'combinatorial expansion.' To illustrate the intended meaning of this term, examples of combinatorial expansion in other contexts include the representation of hundreds of thousands of English words by 26 letters, or the construction of tens of thousands of complex genes in the human genome from four types of nucleotides.

To further illustrate these points in general terms, it is assumed that a significant pattern in external input data is identified and the information gleaned from it is preserved both as a concept referred to for convenience as an 'edge' concept and as a filter/exemplar specifying the spatial characteristics of those elements that made up the significant pattern giving rise to the edge concept. It is further illustratively assumed that a further significant pattern is identified due to the concurrent occurrence of (or other significant relationship between) two of these edge concepts in an adjoining configuration at two of their respective extremes. This further significant pattern may result in the creation of what may be referred to for convenience as a 'corner' concept and a corner filter/exemplar. This recursive process may continue so that significant patterns of corner concepts lead to 'rectangle' concepts and 'triangle' concepts, which together in significant patterns lead to the creation of a 'house' concept specific to basic physical outlines such as the body of the house (including a rectangle concept) and roof line (including a triangle concept). In this example, the constituents of the house concept therefore would include the rectangle and triangle concepts and optionally their respective filters/exemplars, and the constituents of those concepts would include the corner concept and corner filter/exemplar, and so on.

More generally, 'constituents' of a particular concept or filter/exemplar are the concepts and/or filters/exemplars that made up the particular significant pattern that gave rise to that particular concept or filter/exemplar. It may be said for convenience that such constituents are constituents of the particular specific pattern. Also, because concepts and/or filters/exemplars representing significant patterns may be persisted as data entries or maintained as transitory patterns of activation, reference may also be made in this Specification to the constituents of a data entry or of a transitory pattern of activation. In this manner, concepts and filters/exemplars are progressively identified and created based on the recursive identification in processed data of significant patterns, then of significant patterns of significant patterns, etc.

Thus, a significant pattern may be defined and determined by a specific combination of its constituent concepts and/or filters/exemplars. Each of those constituents may be preserved by a 'persistent' data entry in a 'data bank,' by a 'transitory pattern of activation' of its constituents, or both. Also, the significant pattern as a whole may be preserved by its own persistent data entry, or its constituents may be maintained in a pattern of activation indicative of the activation of the significant pattern. Reference may thus be made in this Specification to a 'persistent' significant pattern, or to a 'transitory' significant pattern.

Because, in preferred embodiments, concepts and filters/exemplars are themselves significant patterns (except with respect to elemental data), a concept or filter/exemplar may be referred to for convenience in this Specification as being persistent or transitory. If referred to as persistent, the intended meaning is that all the constituents of the concept or filter/exemplar are persisted as data entries. If referred to as transitory, the intended meaning is that one or more of the constituents of the concept or filter/exemplar is a significant pattern that is maintained as a pattern of activation, or one of the constituents of those constituents is maintained as a pattern of activation, down through pattern levels to the most elemental level.

A transitory significant pattern, concept, or filter/exemplar may be converted respectively to a persistent one, or vice versa. In some embodiments, only persistent significant patterns, concepts, and/or filters/exemplars, rather than a mix of persistent and transitory ones, need be employed, or vice versa. In some embodiments, only concepts may be employed, and the information preserved in filters/exemplars may be incorporated into concepts, or vice versa.

The term 'concept' as used in this Specification shall be understood to encompass a very broad variety of entities that may be animate or inanimate; concrete or abstract; an object, notion, or idea; factual or imagined; attainable or unattainable; or any other thing whether conceivable by humans or not. Thus, the word 'concept' as used in this Specification is intended to be broader than the conventional use of that word in ordinary language, and to include but be broader than that which is represented, individually or collectively, by words such as: 'entity,' 'thing,' 'deed,' 'symbol,' 'idea,' 'notion,' 'issue,' 'conception,' 'thought,' 'event,' 'phenomenon,' 'contrivance,' 'artifact,' and so on.

For clarity and ease of illustration, descriptions of concepts (and of filters/exemplars) herein may employ a word or term, such as 'home,' or 'grandmother,' as a convenient reference to the concept or filter/exemplar. It will be understood that use of such references is for illustrative purposes only and that it is not necessary that the concept or filter/exemplar that is referred to include an attribute containing or linked to the word 'home,' or make any other such reference to a human-recognizable or other word or symbol, although such a reference when applicable may be convenient in order, for example, for humans to analyze the working of TEAI 100.

It is considered an advantage of TEAI 100 that concepts or filters/exemplars need have no corollary or representation in human language or understanding but are based solely on application of indicia of significance, restricted or otherwise, as discussed below in relation to pattern identifier 320 of the present embodiment. The advantage lies in the identification of significant patterns not otherwise detectable or appreciated by humans, and in providing transparent and encapsulated (i.e., protected from adulteration) access to their existence and derivation so that their meaning or impact may be studied. This advantage may be particularly pronounced with respect to analysis of significant patterns in 'spaces' other than physical space because of the strong adaptation of the human brain to analysis of the physical world, which may provide an expectation bias or simply preclude detection of important patterns. It is noted that constituents representing concepts or filters/exemplars that have no corollary in human understanding may combine with other such concepts and/or filters/exemplars, or ones that are understandable by humans, to form significant patterns understandable by humans.

Speaking generally and without intending to limit definitions and examples provided hereafter, if pattern identifier 320 (or other functional element or combination of elements in alternative implementations) determines that a collection of processed data constitutes a significant pattern, the thing identified by, represented by, or associated with the significant pattern may constitute a 'concept' as that word is used herein. As noted, the relationships (along spatial or other dimensions) among the constituents of the significant pattern may be preserved as a 'filter/exemplar.' In other implementations, such relationships may alternatively (or in addition) be preserved as attributes of a concept, in which case filter/exemplars need not be employed. The use of filters/exemplars in the present preferred embodiment, while believed to be advantageous for computational convenience, efficiency, redundancy, and ease of understanding, is thus optional in other embodiments.

As noted, a concept or filter/exemplar in accordance with the illustrated implementation may be stored as what may be generally described as a discrete, specific, deterministic and sufficient, elemental, identifiable, or distinguishable collection of data that advantageously may be transparently encapsulated. In the illustrated implementation, concepts and filters/exemplars may consist of data entries in data banks 110, 120, and 125. Each such data entry includes attributes characterizing in various ways the concept or filter/exemplar the data entry represents, and optionally includes behaviors that the concept or filter/exemplar may perform or that may be performed on it. Behaviors may be determined by any set of instructions (e.g., software instructions) and/or hardware (e.g., hardware components and connections including firmware) specifying an operation the concept is capable of carrying out, such as 'set attribute to active.' A concept or filter/exemplar consisting of its attributes and behaviors may be stored as a single record in a data table wherein the attributes and behaviors, or links to them, are stored as fields of the records; may consist of a row in a spreadsheet or other table-like data structure where each column in one or more dimensions contains an attribute or behavior of a type potentially common to other rows, such as 'link1,' 'link2,' 'time of creation,' 'time of expiration,' and so on; may exist as a file in collection of files; may, in a hardware implementation, consist of digital and/or analog components and connections; or may otherwise be represented in accordance with any known or future technology.

The word 'persistent' is intended to mean that the information is stored as a data entry, but not that it is necessarily retained indefinitely or even for any specific minimum amount of time. For example, a data entry representing a persistent concept or filter/exemplar may be removed ('pruned') from a data bank, its attributes or behaviors may be changed, it may be merged with another persistent data entry (for example, to create a canonical form as described below), or it may persist contingently only for as long as or until certain conditions are identified. The verb 'persist' in its various grammatical variants indicates the act of preserving the concept or filter/exemplar as a data entry. Depending on the form of the data bank in which the data entry is persisted, preservation may comprise storing, linking, replicating, or any other known or future technique for preserving data or access to it. For convenience, it may be said in this Specification with respect to the present invention that a data bank persists data entries, meaning that data entries are persisted in or with respect to the data bank in accordance with its protocols and formats.

This action of 'persisting' may be contrasted with preserving a concept or filter/exemplar in a transitory form by 'maintaining' the constituents of the significant pattern that gave rise to the concept or filter/exemplar in a state of activation, or otherwise to maintain the association of the constituents in a transitory form. As noted, such constituents may be persistent concepts or filters/exemplars, or they may be other transitory concepts or filters/exemplars. Like concepts, filters/exemplars may be pruned, changed, merged, or maintained contingently.

As noted with respect to the illustrated embodiment, one or more of the attributes of a concept or filter/exemplar specifies how it may be linked with other concepts and/or filters/exemplars to identify, preserve, or reconstitute one or more significant patterns. Those linked concepts and/or filters/exemplars are constituents of, and may be said herein to be 'associated' (and grammatical variants thereof) with, the one or more significant patterns. Reciprocally, the linking attributes of the concept and/or filter/exemplar 'representing' a significant pattern may associate it with the constituents of the significant pattern.

The words 'representing' and 'associated,' and their grammatical variants, are thus intended in this Specification to have particular meanings as applied to significant patterns and their constituents, whether preserved as persistent data entries or as transitory patterns of activation. 'Represents' is used when directly identifying or referring to a persistent data entry or a transitory pattern of activation. For example, concept 'A' (which may be preserved as a persistent data entry or a transitory pattern of activation) represents a significant pattern having as its constituents concepts 'B' and 'C.' As with other concepts and filters/exemplars in accordance with the present embodiment, sufficient information to completely represent concept 'A' is contained within the data entry that represents it.

In contrast, 'associated' is used to indicate the condition of linkage between or among constituents and significant patterns. Such associational linkages may be direct, as from a significant pattern to one of its constituents (e.g., concept 'A' representing a significant pattern is associated with its constituent concepts 'B' and 'C'). Associational linkages may also be indirect as from a concept representing a significant pattern to one of its constituent concepts that is linked to another significant pattern having that constituent concept in common (e.g., significant patterns 'A' and 'B' both have a common constituent concept 'C,' and it may therefore be said that significant patterns 'A' and 'B' are associated with each other).

Figure 2:
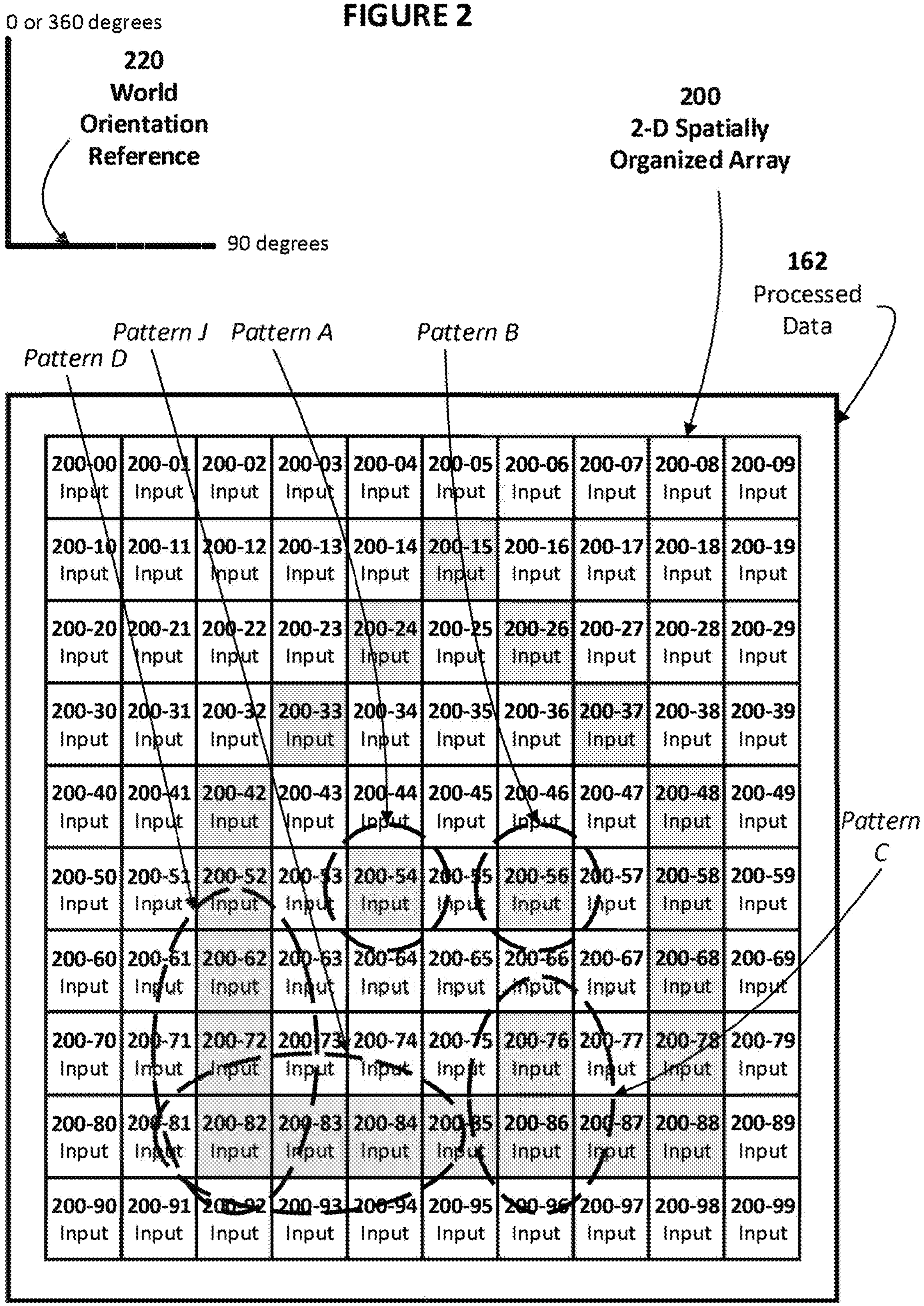
FIG. 2 is a graphical representation of data elements arranged in a two-dimensional array corresponding to a spatial organization as processed by the data collector and processor of FIG. 1, and of a world orientation reference available to the execution manager of FIG. 1 to orient the two-dimensional array.

To provide an example to demonstrate the usage of these terms, it is assumed that a significant pattern in processed data 162 (corresponding to a combination of Pattern D and Pattern J of FIG. 2) is identified. Specifically, with reference to FIGS. 2 and 4, the identification of data elements 200-62, 200-72, and 200-82 in a distinctive condition or situation (specified in more detail below with respect to illustrative indicia that may be used by pattern identifier 320 to determine if a pattern is significant), illustratively shown in FIG. 2 as shading, results in the identification of persistent filter/exemplar 406 as a constituent of the significant pattern. In addition, the identification of data elements 200-82, 200-83, and 200-85 in a distinctive condition or situation results in the identification of filter/exemplar 403 as another constituent of the same significant pattern. Filters/exemplars 406 and 403 may already have linking attributes linking them to each other due, for example, to their common occurrence in a certain spatial relationship. Their common association with the significant pattern may also, or alternatively, be identified based on their relatively high or otherwise distinguishable states of activation as indicated by their respective activation-intensity attributes (described below). Or this may be the first occurrence of the associated identification of filters/exemplars 406 and 403 in this spatial relationship. In any case, filters/exemplars 406 and 403 are identifiable as constituents of the significant pattern and are said to be 'associated' with the significant pattern.

The significant pattern may be persisted (if it had not already been) as a filter/exemplar such as either filters/exemplars 413 or 414, the choice of which one depending on the spatial relationship between 406 and 403. In this example in which filter/exemplar 413 represents the appropriate spatial relationship, the significant pattern could thus be said to be 'represented' by filter/exemplar 413. It may also be said that filter/exemplar 406 represents a constituent of the significant pattern represented by filter/exemplar 413, and that filter/exemplar 403 represents another constituent of that significant pattern. Reciprocal attributes specifying links between filters/exemplars 406 and 403, and between them and 413, may establish these relationships so they are more readily recognized or prioritized in future encounters. Attributes specifying linkage may also be provided between filters/exemplars 406 and 403 and the concept 'corner0' of entry 120(1,0)-0. The significant pattern could thus also be said to be 'represented' by entry 120(1,0)-0 or, for convenience, simply as 'represented' by the 'corner0' concept. Linking attributes may also span levels, such that, for example, filters/exemplars 406 and 403 contain reciprocal linking attributes to the concept 'rectangle0' of entry 120(2,0)-0, perhaps also including in such attributes or in another attribute a linkage to the 'part-of' concept of entry 120(M,0)-1. It will be understood that various redundant linkages have been described above and that not all such linkages need be included in various implementations.

Another instance in which the word 'represent' is used with respect to the present embodiment relates to a significant pattern that is preserved by maintaining a pattern of activation among its constituents. Those constituents may include concepts or filters/exemplars that are themselves maintained by a pattern of activation, and those may include concepts or filters/exemplars that are themselves maintained by a pattern of activation, and so on. In the present embodiment, however, patterns of activation ultimately are linked directly, or indirectly through intervening patterns of activation, to persistent data entries having activation-intensity attributes. When a significant pattern is preserved by maintaining a pattern of activation of its constituents, whether those constituents are all in persisted form having activation-intensity attributes or are patterns of activation made up ultimately of such persisted forms, the resulting combined pattern of activation (which may include persistent data entries as constituents) may also be referred to as 'representing' the significant pattern.

Reflecting the combinatorial architecture of concepts and filters/exemplars in accordance with the present embodiment, each concept or filter/exemplar typically both itself represents a significant pattern (and thus has associated constituent concepts and/or filters/exemplars) and is a constituent of, and therefore is associated with, at least one of a collection of significant patterns not including the significant pattern it represents. An exception that has been noted is that of elemental data that may be represented by a data entry as a concept and/or filter/exemplar that may be a constituent of one or more significant patterns but itself has no associated constituents.

The attributes that link data entries are referred to herein as 'linking attributes.' They contain or describe links, paths, addresses, labels, identifiers, or other information (any of which may be referred to in this Specification as a 'link') enabling the data entries to be associated with each other, as for example constituents of a significant pattern are associated with each other. In some implementations where it is expedient, the linking attribute(s) may replicate one or more attributes and/or behaviors of the associated constituent to which it is linking rather than, or in addition to, providing a link. One or more of the constituents of the significant pattern may also have linking attributes to the significant pattern itself as represented by a concept or filter/exemplar.

Linking attributes may be direct or, in some embodiments may be indirect in that they must be traversed over intermediary points or reconstituted by computation or collection of additional data from intermediary sources. Thus, for example, concept 'A' could link to concept 'B,' which links to concept 'C,' and concept 'A' could thus be said to be linked to concept 'C.' The linkages to and/or from concept 'C' could be contingent on the state of any attribute of any concept or filter/exemplar, the operation of any functional element of TEAI 100, or other eventuality. Thus, the term 'link' and its grammatical variants are intended to be understood in the broadest possible way to include any known or future technique for associating data or constructing/reconstructing associations between or among them.

In some implementations, linking attributes may specify preferences for linking. Thus, referring to concepts by way of illustration, concept 'A' may include linking attributes to concepts 'B' and 'F,' where the link to 'B' is specified as being more likely or desirable than the link to 'F.' The absolute or relative preference among links to alternative constituents of the same or alternative significant patterns may be indicated in numerous ways, such as by the magnitude of a number where, for example, a high number indicates a strong preference. In some implementations a vector of any dimensionality may indicate such preference to allow that the magnitude of the preference may vary according to an angle of spatial or other relationship of the linked concepts in reference to dimensions of a 'space' (discussed below). That is, the magnitude of the preference may be high if the angle specified by the vector is the same or close to that identified between the linked concepts and become lower as the angles diverge to the point where there is no linkage. Any function may be used to represent the impact of the divergence on magnitude.

As a further example of the role of linking attributes in accordance with the present invention, it is illustratively assumed that the concepts 'A,' 'B,' and the filter/exemplar 'C' have been associated with and are constituents of a significant pattern, which has been persisted as a 'D' concept. Illustratively, 'A' may be an 'eye' concept, 'B' may be a 'nose' concept, and 'C' may be a filter/exemplar specifying a spatial arrangement of three concepts as shown in filter/exemplar 409 of FIG. 4. Thus, concept 'A' may have one or more linking attributes linking it to concept 'B' and filter/exemplar 'C,' concept 'B' may be linked to concept 'A' and filter/exemplar 'C,' and filter/exemplar 'C' may be linked to concepts 'A' and 'B,' although such redundancy in links is not required in all implementations. Such linking attributes may specify that the 'A' concept is associated with the two elements of the 'C' filter/exemplar that are horizontally aligned and the 'B' concept with the element of the 'C' filter/exemplar that is below and midway below the first two elements. Also, the linking attributes of the nose concept, 'B,' to an eye concept, 'A' may be a vector such that the magnitude of the link varies according to the correlation between the angle specified by the vector (in relation to other linkages or to a world orientation reference, discussed below) and the angle between the linked concepts in dimensions of the applicable space. Notably, the significant pattern specified by 'A,' 'B,' and 'C' typically itself may be stored as a persistent 'face' concept (or as a significant pattern having the constituents of a 'face' concept and a 'partial' concept) or may be maintained for a period in a transitory form, in either case including linking attributes associating it with its constituents.

Thus, the identification of a significant pattern of processed data causes the creation of a concept or filter/exemplar to represent that significant pattern, if one does not already exist. The significant pattern may be persisted or maintained and perhaps itself become a constituent of another significant pattern. In preferred implementations of the present invention, in which data entries are created in data banks under unsupervised processes, the data banks may initially be empty of data entries; i.e., there may be no persistent filters/exemplars or concepts. From this ground state, significant patterns of external input data elements may be identified in accordance with the present invention and initial data entries of filters/exemplars and/or concepts made. Next, new significant patterns of those initial data entries representing significant patterns of concepts and/or filters/exemplars, additional external input data elements, or combinations thereof, will be identified. New concepts or filters/exemplars will be created to persist or maintain those new significant patterns, and thus the numbers of data entries in the data banks will grow. As noted, data entries may be pruned from the data banks for any number of reasons such as to preserve or prioritize resources, to encourage or experiment with new combinations of concepts and filters/exemplars, to imitate forgetfulness or other human attributes for diagnostic or other research purposes, and so on.

As significant patterns in processed data are iteratively identified and preserved as concepts or filters/exemplars, the likelihood will increase that at least some of the constituents of newly identified significant patterns will already have been persisted in the data banks or are being maintained as transitory concepts or filters/exemplars. If a newly identified significant pattern has not been so preserved, a new concept or filter/exemplar may be created and preserved. Thus, after the data banks have been populated, and employing transitory concepts or filters/exemplars where appropriate, a 'bottom-up' process may be followed to identify as many concepts or filters/exemplars as may be implicated to any desired degree of pattern complexity beginning with external input data or any other processed data at any level and proceeding upward to greater degrees or levels of patterns of patterns. Thus, identification of 'eye' and 'nose' concepts in a certain spatial relationship may lead to identification of a 'face' and 'partial' concept, which could lead, together with other concepts, to identification of a 'human' concept, for example.

For clarity and for convenience of discussion, the verb 'realize' will be used in this Specification to refer to the process of identifying a significant pattern and associating it with existing concepts or filters/exemplars that are constituents of the significant pattern, or of creating new concepts or filters/exemplars to represent those constituents if they do not already exist. In the illustrated embodiment, these functions are carried out by pattern identifier 320. It therefore may be said that pattern identifier 320 identifies a significant pattern in processed data and 'realizes' one or more concepts and/or filters/exemplars as being constituents of the significant pattern. That is, in the illustrated implementation, identifier 320 identifies the constituents and ensures they are linked to each other and to the significant pattern. The significant pattern may also be preserved by identifier 320 either as its own persisted concept and/or filter/exemplar that represents the significant pattern, and/or maintained as a pattern of activation among the constituents. If one or more of the constituents does not exist, identifier 320 realizes the significant pattern by creating the missing constituents and linking or activating them to preserve the significant pattern.

As noted, a significant pattern of external input data may be represented by a single concept or filter/exemplar, or one of each. In some implementations, this occurrence is generally more likely at lower degrees of pattern recursiveness. For example, an 'edge' concept is likely to exist, whereas a more complex significant pattern involving many shapes in unusual combinations is not as likely to be represented by a single existing concept and/or filter/exemplar. However, if the complex pattern has been deemed of sufficient significance, and taking other considerations into account as noted below, it may have been preserved so that if encountered in the future pattern identifier 320 may 'realize' the significant pattern in totality by identifying that existing data entry or transitory pattern of activation rather than identifying the significant pattern as linked constituent concepts or filters/exemplars. For example, a complex pattern of external data generated by detection of the face and other characteristics of a person of significance may be preserved as a single concept and/or filter/exemplar, such as a 'grandmother' concept. If no such concept or filter/exemplar representing the significant pattern in totality exists, identifier 320 may realize it by creating a new one, particularly if the criteria of significance are highly salient. Thus, for example, a portion of an image consisting of external input data representing a highly dangerous or unexpected situation, or a highly desirable one, may be preserved as a single concept and/or filter/exemplar at a high level of pattern recursiveness.

To provide further description of the operation of bottom-up processes in terms of a previous example, it is assumed that pattern identifier 320 identifies a significant pattern having as constituents two 'eye' concepts stored as persistent data entries in bank 120 and significant additional external input data, all spatially arranged in a certain manner. Identifier 320 may realize the two eye concepts and may also realize (create) a nose concept based on the significant additional external input data, and, if it does not already exist, may realize (create) a data entry in bank 110 preserving the spatial relationship of these three constituents, as represented for example by filter/exemplar 409. Identifier 320 typically will also seek to identify a concept and/or filter/exemplar representing the two eye concepts and the significant additional external input data as constituents of a higher-level existing concept and/or filter/exemplar, like a 'face' concept. If it is assumed for illustration that two eyes and a nose does not definitively identify a face, identifier 320 may also identify those three constituents as being associated with only a portion of the constituents of a face concept and therefore associate those three constituents both with the face concept and a 'partial' concept. If either the face or partial concepts do not exist, they may be realized by identifier 320 creating them, including providing them with linking attributes to their constituents.

In addition to (and optionally executed concurrently with) such bottom-up process, a 'top-down' process may be employed such that one or more data entries or transitory concepts or filters/exemplars may be afforded elevated or preferential status (e.g., one or more of its attributes may be 'primed') to facilitate or preferentially enable identification of corresponding significant patterns in processed data, to facilitate the maintenance of the constituents of a significant pattern in a state analogous to resonance, or for other reasons noted below. (For convenience in this Specification, any or all such objectives with respect to priming may be referred to simply as being 'to facilitate identification of a significant pattern.') Referring to a previous example, TEAI 100 may be assumed to be pursuing the objective of identifying the concept 'house' from external input data from a camera. To facilitate this objective, certain attributes of the concept 'house' and of its constituent concepts 'door,' 'window,' and 'chimney, may be set in accordance with the illustrated embodiment to a higher or otherwise distinguishing stage of activation. That is, they may be designated as being of higher priority, relevance, importance, or the like. Such attributes are referred to in this Specification as 'activation-intensity attributes.' The top-down process, referred to herein as 'priming' with respect to the operations of the present invention, could proceed downward as far as desired, for example from the 'rectangle' concept to the 'corner' concept, and so on.

For convenience of illustration, in the current embodiment a higher value may be assigned to an activation-intensity attribute of a concept or filter/exemplar to indicate that it is more activated relative to other concepts or filters/exemplars with lower value activation-intensity attributes. In other implementations, any known or future technique may be employed to denote the activation-intensity state of a concept or filter/exemplar. For convenience of illustration in this Specification, any such technique for assigning or changing the value, state, or other characteristics of an activation-intensity attribute may be referred to simply as 'altering' the activation-intensity attribute. As non-limiting examples, a concept at a higher state of activation may be moved to or replicated at a special memory location or data bank associated with such higher activation state, or it may be linked to a concept representing 'high activation,' and so on. For convenience and clarity, it will be understood that in this Specification a concept or filter/exemplar identified as being in, or created with, an 'activation intensity in a distinguishing state' may have been activated in accordance with any such known or future technique, irrespective of whether such technique employs activation-intensity attributes.

In some cases, priming may either be stopped at a certain level, specified to exclude certain concepts or filters/exemplars, and/or required to include certain concepts or filters/exemplars as constituents. Such strategies may be incorporated into objectives in order, for example, to increase sensitivity as well as ease of recognition with respect to certain desired outcomes. For instance, since barns resemble houses with respect to structure (e.g., having forms including rectangles and triangles) but perhaps not windows and usually not chimneys, the objective may specify that the priming should include the concepts representing rectangles, triangles, and/or doors but exclude those representing chimneys. In that manner, the 'house' concept would be more highly primed than the 'barn' concept and 'outcompete' it for initial identification, perhaps pending further confirmation. In some implementations, such designation of elevated or preferential status may be accomplished using an attribute not related to activation state (as described below), but by an attribute or other indicator using any other method of designation, and yet still be contemplated by the verb 'prime' and its grammatical variants as used in this Specification with respect to the operations of the present invention.

Top-down processing may be employed for numerous purposes in addition to facilitating or prioritizing identification. For example, one or more filters/exemplars or concepts may be created and primed to explore the hypothetical or predicted identification of significant patterns in a top-down process. For example, if it is an objective to determine if a hypothetical significant pattern of concepts 'A,' 'B,' and 'C' is present in processed data, but only concepts 'A' and 'B' exist whereas concept 'C' does not, a concept 'C' may be created by pattern identifier 320 and all three concepts (which may be any combination of persistent or transitory concepts) may be primed to facilitate recognition of the anticipated pattern. An attribute of concept 'C' may be set to indicate that it is hypothetical, and that its existence is contingent on finding the anticipated significant pattern. More generally, in the present embodiment priming may be accomplished by setting activation or other attributes of the constituent concepts and/or filters/exemplars to an elevated or otherwise distinguishable level or state.

As noted, collections of significant patterns of either persistent or transitory forms may be associated with each other in significant patterns of significant patterns, and so on to any combinatorial degree desired, and any of the resulting combinations may be stored in persisted forms and/or maintained in transitory forms. In the illustrated implementation, the degree or level of pattern recursiveness may be such that a significant pattern having constituents representing elemental data, like processed data from a camera or other sensor, is a pattern of level 0 (although, as noted, other simple and, for example, frequently encountered, significant patterns associated with constituents not representing elemental data may also be included in some implementations for convenience), whereas a significant pattern constituted by a combination of level 0 patterns is a level 1 pattern (a pattern of a pattern), a significant pattern having constituent level 1 patterns is a level 2 pattern (a pattern of a pattern of a pattern), and so on. In any level, only a single constituent may be present; that is, for example, a level 3 significant pattern may be associated with a single constituent from level 3, a single constituent from level 2, and several constituents from level 1. Also, in some implementations, levels may be skipped so that a level 3 pattern is associated only with level 1 constituents, even if the level 1 constituents could have been associated with each other to create a concept or filter/exemplar in level 2. More generally, it is not required that all patterns be designated as significant patterns even if they would constitute constituents of a persisted or transitory concept or filter/exemplar. It is a feature of pattern identifier 320 of the illustrated implementation that it selectively persists or maintains significant patterns for any of the reasons discussed below, including to preserve resources, increase efficiency, focus on domains implicated by currently active objectives, and so on. It is also emphasized that in some embodiments and implementations there need not be a hierarchy of levels.

The transitory form of a pattern may be defined in numerous ways including by the activation status of the constituent elements of the pattern. The activation status is specified, in the present embodiment, by one or more attributes of the concepts or filter/exemplars that constitute the constituent elements. (Persistent concepts and filters/exemplars typically also include activation-intensity attributes.) When a significant pattern is identified, rather than persisting that pattern as described above by linking its constituent elements and/or persisting the pattern itself as a concept or filter/exemplar, the transitory significant pattern may be defined by appropriately setting and maintaining activation-intensity attributes of its constituent elements. This too is a feature of various embodiments implemented to preserve resources, increase efficiency, and so on.

For example, in a sample of 100 concepts that constitute processed data, five of them may achieve or be set to activation states of a higher value than the other 95. In the current implementation, this elevated status may be indicated by their respective activation-intensity attributes, although other techniques for specifying activation state or status may be used in other implementations, as noted above. Those activation states may decay in value and destroy the transitory pattern, the five concepts may be joined by other concepts that achieve the higher activation state and thus may also be included in the transitory pattern, or they may be maintained at their distinctively higher value for a period. The setting of activation-intensity attributes (or another technique) to maintain a transitory pattern may be coordinated by a functional element of the invention as described below, or by cooperative interaction among the five concepts themselves, analogous in some implementations to a state of resonance. (For convenience, any technique to maintain a transitory pattern may simply be referred to in this Specification as the constituents being 'set to maintain resonance' and their state referred to as one of 'resonance.') Another eight of the 100 concepts in this example may have a range of activation values less than those of the first-noted five, but higher than the 87 remaining concepts. Those eight could similarly constitute a second transitory pattern of activation that, like the first transitory pattern, could be maintained in the transitory state for any desired time or for the duration of any specified conditions, altered in composition because of constituents dropping below or rising above the designated activation range, or transformed to a persistent form. The first transitory pattern may form a constituent of a further significant pattern (consisting of itself and other transitory patterns and/or persistent patterns), or the activation-intensity attributes of the second transitory pattern may achieve higher values such that the second pattern outcompetes the first pattern for consideration as a constituent of a significant pattern of patterns. As noted below, contemporaneous or otherwise related levels of high activation common to filters/exemplars or concepts may be among the considerations used to determine if a significant pattern exists among them.

For example, the concept 'grandmother' may arise from the identification by pattern identifier 320 of a significant pattern of activation among previously persisted concepts 'mother,' 'mother of mother,' 'older,' 'nice,' 'mine,' and others. This pattern of activation could arise from a bottom-up and/or a top-down process. Pattern identifier 320 may realize the concept 'grandmother' by determining that, if it does not already exist or if a replicate is desired for backup purposes or to increase processing efficiency using parallel processing, for example, it should be created and persisted as a data entry or maintained as a transitory concept. The realization of the grandmother concept may in some implementations involve further details of execution. For example, in the illustrated implementation, persistence manager 340 rather than identifier 320 may determine the content of attributes to effectuate the creation of the concept. Nonetheless, for convenience and clarity, it may simply be said herein that identifier 320 realizes the grandmother concept, having in mind this illustrative relationship of functions where identifier 320 identifies the action to be taken and persistence manager 340 may implement aspects of the action. In other implementations, either identifier 320 or manager 340 may carry out both such functions.

As noted, it may be said for convenience that either a persisted data entry or transitory pattern of activation 'represents' a corresponding concept or filter/exemplar. Thus, the concept 'grandmother' may be said to be represented by the grandmother data entry and/or by the maintenance of a transitory pattern of activation of constituent concepts and/or filters/exemplars (that is, 'mother,' 'mother of mother,' 'older,' 'nice,' 'mine,' and others in this example). The choice of which representation to employ—a persisted data entry or a transitory pattern of activation—is made in the illustrated implementation by pattern identifier 320 and implemented by persistence manager 340. In the case of transitory patterns, a concept and/or filter/exemplar data entry may be made in short-term bank 125 to represent the pattern as a whole to facilitate processing, or any other known or future technique advantageous for transitory processing may be used.

In addition to linking attributes discussed above, numerous types of additional attributes may be assigned to a concept or filter/exemplar such as data identifying the time it was conceived, measures of its importance or salience, the degree of confidence that the pattern giving rise to it satisfied the criteria for a significant pattern, or any other information deemed useful to preserve with respect to the concept or filter/exemplar. As noted, in the illustrated embodiment concepts and filters/exemplars typically also include one or more attributes indicating its level of activation.

The level of activation of a concept or of a filter/exemplar may be high if it is salient to currently relevant, potential, contingent, or predicted processes being carried out by TEAI 100 such as identification, classification, categorization, association, prediction, or any other of its functions as described herein, notably including priming. In such cases, an 'activation-intensity attribute' of the concept may be assigned a high number, or the concept may be otherwise configured or designated, as noted above, to indicate the intended high level of activation. If a concept or filter/exemplar is not salient, its activation-intensity attribute(s) may be assigned a low number or otherwise designated to have an inferior status, and so on for intermediate situations. Saliency may be contingent or predicted, rather than based on current data, states, or circumstances, and may be established for other reasons such as to create or analyze hypothetical situations; simulate the processing of other systems or entities other than TEAI 100 including, for example, humans; establish worst-case, best-case, or other operational ranges; and so on. In all such instances, the activation-intensity attribute could be of a specific type, for example there could be an 'actual-activation-intensity attribute'; a 'potential-activation-intensity attribute'; a 'predicted-activation-intensity attribute'; a 'contingent-activation-intensity attribute,' optionally with links to the sources or determinants of contingency; a 'transitory-activation-intensity attribute'; and so on.

Typically, any concept or filter/exemplar in accordance with the present invention need exist as only one entry in a data bank or as one transitory pattern of activation; thus, concepts and filters/exemplars in accordance with the present invention may be guaranteed to be unique in some implementations. That is, a concept or filter/exemplar may be represented by a collection of data consisting of attributes and behaviors that need not be replicated (although it easily may be copied to provide backup, to provide multiple copies for ease of processing, or for other conventionally accepted purposes); may be deleted without affecting the defining characteristics of any other concept or filter/exemplar (except that such other concept or filter/exemplar may no longer be linked to the deleted concept); may generally be restored without affecting other concepts or filter/exemplar other than adjusting linkages; may be amenable to data compression and decompression using known or future techniques; may be transferred among various data storage media to achieve speed, capacity, or cost benefits; and so on.

Having introduced various terms and having generally described the fundamental architecture of the present invention, TEAI 100 is now described in greater detail in reference to one embodiment of data banks and functional elements as shown in FIGS. 1 through 7. As shown in FIG. 1, TEAI 100 includes the following data banks: filter or exemplar bank 110, hereafter referred to simply as filter bank 110, concept bank 120, and short-term bank 125. The illustrated examples display these banks as having an array structure. But the terms 'data bank,' or 'bank' as used in this Specification with respect to the present invention are to be understood in their most general form to encompass any known or future software and/or hardware technique, arrangement, or medium (advantageously not including neural networks as noted) for such purposes as storing, preserving, organizing, associating, or retrieving data, whether in a structured or unstructured form. Thus, in alternative implementations, any of a variety of known or future techniques may be used to preserve data as described herein—including as non-limiting examples lists, stacks, queues, trees, graphs, hash tables, and so on—and any such technique may be contemplated by the term 'data bank.' In some implementations, the data making up a data entry may be distributed or otherwise organized so that, for example, attributes of various types are stored together and linked to appropriate data entries in other locations as required. Such an arrangement may be advantageous, for example, where certain kinds of attributes are common to many data entries. The attributes of such distributed data entries could readily be brought together to reconstitute a single data entry in a data bank if desired.

In the illustrated implementation, data entries in data banks 110 and 120 are organized into arrays of data bank elements containing data entries. Advantageously, banks 110, 120, and 125 typically are transparent and encapsulated in whole and/or with respect to their elements and/or entries. A data bank and its data entries may be distributed, e.g., consist of multiple data banks possibly in multiple locations physically separate from each other, or all or any combination of them may be co-located in a same over-arching data bank that may be in one or more physical locations.

Also shown in FIG. 1 are graphical representations of processed data 162 and core objectives 164. The flow of information into and among functional elements of TEAI 100 typically is not explicitly shown in this manner, but rather is implicit in the arrows between functional elements that generally indicate flow of control and/or information. Processed data 162 and core objectives 164 (as well as attention model 652 of FIG. 6) are explicitly represented for clarity of discussion only.

The design and operations of banks 110, 120, and 125 are described in greater detail immediately below, after which the following functional elements of TEAI 100 will be described: data collector and processor 160 that processes data derived from sources both external and internal to TEAI 100; execution manager 170 that coordinates execution of, and communications among, functions related to space, pattern level, model building and management, attention, pattern identification, persistence, and behavior enforcement; brain-computer interface ("BCI") 175 that interfaces with human or non-human brains; and output manager 180 that prepares information for transmission to external entities or devices.

Attention is now directed specifically to filter bank 110 and concept bank 120. Banks 110 and 120 are involved in such critical tasks as data categorization, pattern recognition, association, and prediction. In some embodiments, filter bank 110 or concept bank 120 may be implemented using known or future computer science techniques such as by representing the bank elements and/or entries as objects that are instances of a defined class. Conventionally, a class is a template for creating objects having attributes (also referred to as variables defining state) and behaviors (also referred to as functions or methods) defined by the class. In the illustrated embodiment, attributes and behaviors of all entries in filter bank 110 or concept bank 120 may be reliably and efficiently changed by using defined protocols to change the class models for the corresponding objects rather than changing each object separately. It is not required in this embodiment or other embodiments of the present invention that such entries include behaviors. In some implementations in accordance with the present invention, the entries in filter bank 110 and concept bank 120 may have attributes constituting values as described below, but not have behaviors, methods, or functions. Some implementations may include a concept bank but not a bank of filters/exemplars. Spatial and other relationships among dimensions in various spaces may be preserved, for example, in attributes of the concepts in such implementations in which a bank of filters/exemplars is not provided. Thus, while in preferred embodiments it is considered advantageous to include both banks 110 and 120, bank 110 may be absent in some implementations.

Any instance of banks 110 or 120 may include multiple classes of filters/exemplars or concepts, respectively, with differing attributes and behaviors. The multiple class models may be hierarchically organized to conform to master class models. Also, other techniques for organizing data may be used such as spreadsheets, database tables, linked lists, systems of semi-autonomous or autonomous agents, actor models, and other known or future paradigms and algorithms or other structures. In some implementations, the organization of the data will be structured or semi-structured, and typically will be designed for ease of hierarchical linking or associating, but these characteristics are not required for all data in all implementations.

As noted, the entries in banks 110 and 120 may be applied to analyze processed data 162 derived from sources external to TEAI 100. Notably, processed data 162 may also arise from processes carried out internally by the functional elements of TEAI 100 as described below. For example, referring to concepts rather than filters/exemplars for simplicity of illustration only, an activation pattern of concepts previously recognized and persisted in concept bank 120 may constitute processed data 162 upon which pattern identifier 320 operates to identify or predict the presence of a more complex significant pattern of concepts. A more complex concept representing the more complex significant pattern may or may not already be persisted in bank 120. If not, it may be persisted in bank 120 or preserved by maintaining its constituents in a pattern of activation, thus constituting a transitory concept. In turn, an activation pattern among such more complex concepts may identify or predict the presence of yet more complex concepts, forming significant patterns of significant patterns of significant patterns of activation, and so on in what is referred to herein as a hierarchy of patterns. The meaning of the term 'activation pattern' as used in this Specification is discussed further below in relation to specific illustrations of the operations of banks 110 and 120 and functional elements of TEAI 100.

As another of many possible examples of operations on internally generated processed data 162, entries in banks 110 and/or 120 may be primed to prioritize a future activation pattern based on a current state of activation of concepts and/or of filters/exemplars, to pursue an objective, or for other reasons. As noted, such priming may be accomplished in numerous ways, such as by placing concepts, their constituent concepts, and/or the filters/exemplars associated with them into some form of a preferential and/or coordinated status. More specifically, such preferential and/or coordinated treatment or response may be effectuated, for example, by raising or otherwise highlighting their activation-intensity attributes, or an attribute specific to state of priming; prioritizing their access or testing in a search algorithm; flagging them for higher-priority testing; activating them into a resonance pattern so they will be triggered into a higher activation level with minimal additional stimulation; placing them at the front of message queues so they are more rapidly or frequently queried; clearing their incoming message queues so they can respond more quickly; setting flags, links, or other attributes to establish precedence or higher likelihood of association; or in accordance with numerous other known or future techniques.

The design of one possible implementation of banks 110 and 120 is now described with the understanding that numerous other designs are possible in accordance with the present invention. Filter bank 110 and concept bank 120 are illustratively organized in the present embodiment in two-dimensional arrays, as shown in FIG. 1. Arrays of any number of higher-order or lower-order dimensions, or collections of no dimensions, are contemplated in other embodiments and implementations. Shown in FIG. 1 are various elements of the two-dimensional arrays, such as array element 110(0,0) of bank 110.

Each element in the arrays of banks 110 and 120 typically stores multiple persistent filters/exemplars or persistent concepts, respectively. Each of such filter/exemplar or concept may be referred to hereafter as an 'entry' or 'data entry' in an array element. As an illustration of the storage of multiple persistent entries within array elements, there may be 1,000 filters and/or exemplars included within array element 110 (0,0); 20,000 filters and/or exemplars included within array element 110(1,0); or 500 concepts included within array element 120(0,0). As noted, the entries and/or the elements may be transparently encapsulated.

It is not required that every element contain entries at all times. Some elements may have no entries if, for example, TEAI 100 is being initialized or reinitialized from a ground-state representing no previous activity, if previous entries in the element have all been removed ('pruned') in accordance with methods noted below, if there is no longer a use for the element, or if a new level or space has been created with new elements not yet containing entries. It is indeed anticipated that elements and/or their entries will routinely be altered, added, and/or deleted in accordance with various embodiments. As noted below, for example, the attributes or behaviors of entries may be changed for various purposes such as indicating association with a different combination or pattern of constituent filters/exemplars or concepts. Also, in some implementations the attribute of an entry linking it to another entry may have—or be linked to another attribute having—an influence value indicating how much one or both entries influence or are influenced by the other. Such influence values may routinely be adjusted by attribute and behavior manager 630 as described below.

Figure 3:
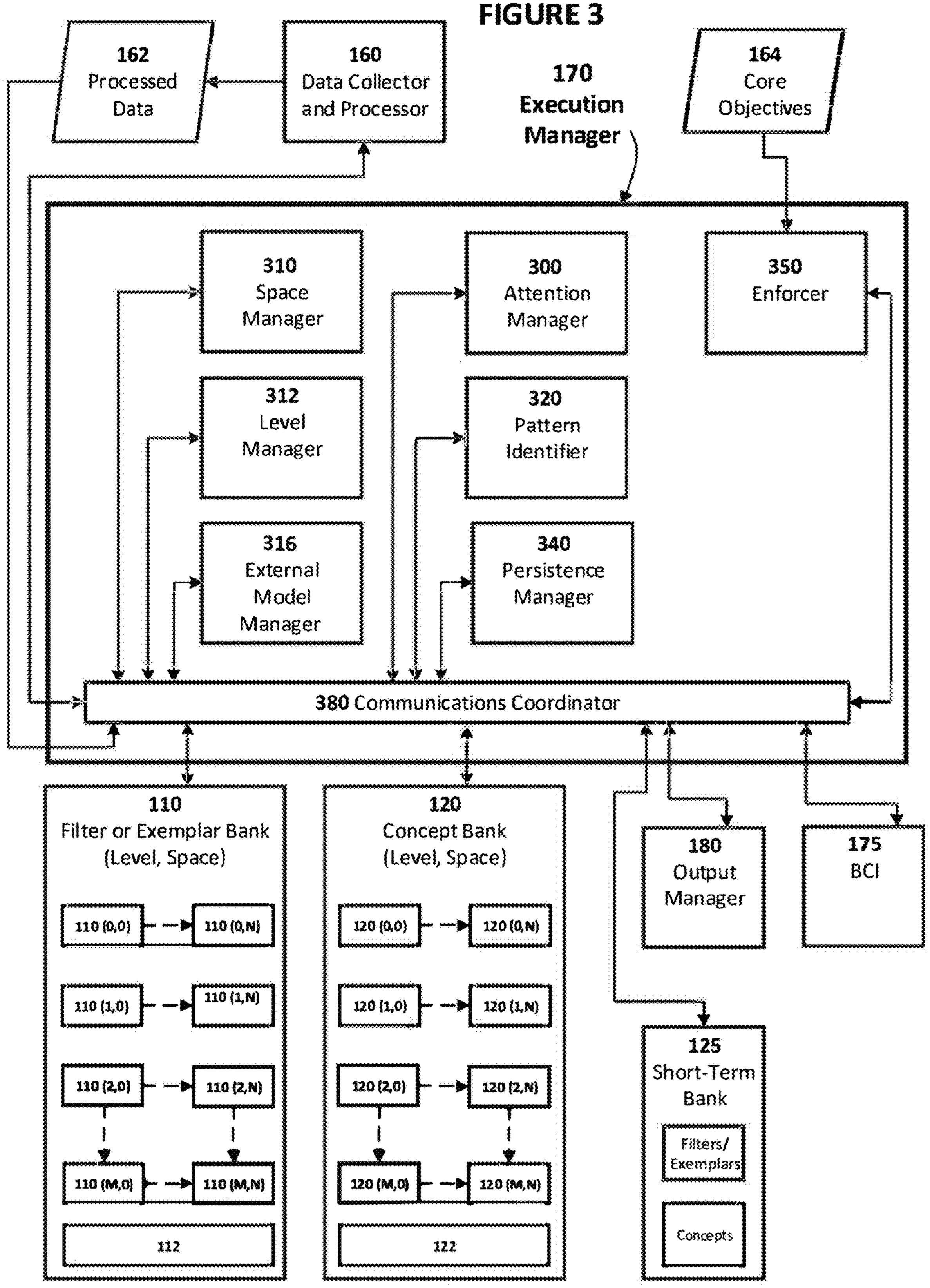
FIG. 3 is a functional block diagram of the functional elements of an illustrative embodiment of the execution manager of FIG. 1, including an attention manager, space manager, level manager, external model manager, pattern identifier, persistence manager, enforcer, and communications coordinator.

Returning to the design of the arrays of banks 110 and 120, it is provided in this illustrative arrangement that the leftmost of the two dimensions represents levels of significant pattern, hereafter referred to in this Specification for convenience simply as 'levels' with respect to the operations of the present invention, and the second dimension is that of 'space.' Thus, the entries in array element 110(1,0) are filters or exemplars of level 1 and space 0, and the entries in array element 120(2,N) are concepts of level 2 and space N. As shown in FIGS. 1 and 3, in this implementation there exist at the illustrated moment a maximum of M levels and N spaces in banks 110 and 120. However, it will be understood that these maximums may change dynamically as described below. Also, the values shown consistently for simplicity of illustration as M or N in both of banks 110 and 120 may be different in various implementations for each level and/or space and/or for each bank.

As described in greater detail below in relation to the functions of level manager 312, structuring data to have dimensionality in this manner provides computational and other advantages in some implementations, and thus is illustrated in this preferred embodiment. It is emphasized, however, that data need not be so structured in other embodiments of the present invention. That is, neither levels nor spaces nor any other indicia of dimensionality need be determined or specified. Also, the data structures performing the functions of banks 110 and 120 of this implementation may, in other implementations, have additional dimensions such as, for example, with the addition of a time dimension, or fewer dimensions, such as only a space dimension. It is emphasized that such banks may also have no dimensionality; that is, as with bank 125 of the illustrated implementation, all data entries may be stored without distinction as to any organizing type or category such as level or space. Moreover, as noted, there need not be separate banks and all data may be stored in a single bank, for example, and/or without separation or distinction among concepts and filters/exemplars.

Attention is now turned to the notion of 'space.' TEAI 100 operates both to process data from the physical world, sometimes referred to hereafter as 'physical space,' and data related to concepts other than that of the physical world, sometimes referred to hereafter as 'concept spaces.' Physical space is a concept space, but it is noted separately only for convenience in this illustrative embodiment. In any kind of space, relational properties like those in physical space may apply, although any space may have unique relational properties. For example, in physical space a camera may detect light from an object and generate an image including three pixels of interest—one close to and above a reference pixel and another far from and below the reference pixel. The relational spatial concepts of distance and direction are thus available for analysis by TEAI 100 with respect to these pixels in physical space. Any space may generally be conceived as having relational spatial properties, although this is not required.

Aspects of physical space may be separated to constitute distinct spaces of their own, such as 'musical space' or a more general space related to the sensing of acoustic waves. As another example of a separate space based on sensing of data from the physical world, a tasting space or a space specific to data from sensing of electromagnetic radiation may be adopted. More generally, such divisions of any kind of space based on data source may be most advantageous in the identification of patterns at the lowest pattern level but not as advantageous to maintain at higher levels, particularly higher levels of concepts. For example, the concept 'trumpet' may be common to a physical space irrespective of whether it is associated with visual data or auditory data. However, the patterns in data detected by filters/exemplars in a visual space will generally be quite different than those detected in an auditory space, thus different lower-level spaces specific to different data sources may be advantageous in some implementations. In general, unless otherwise specified, the examples used herein will relate to a physical space specific primarily to the initial processing at the lower pattern levels of visual light data, and such physical three-dimensional space will be designated as space '0.'

In another illustrative example, data and concepts related to the concept of 'people' may in aggregate constitute a 'people space.' Such people space may include relational spatial data such as person 1 being close to a reference person in some conceptual aspect such as friendship and person 2 being more distant from that reference person in that aspect. There may be any number of dimensions to this collection. For example, in addition to friendship, spatial relationships may be ordered and discerned according to familial association, mine/not-mine, perceived honesty, frequency of encounter, and so on.

Any concept may be the basis for a concept space, and one space may in some implementations overlap with one or more other spaces. For example, the concept of time constitutes a concept space within this usage. Although time is often referred to as a fourth dimension of the physical world and may in some implementations be included as a physical space dimension, the term physical space is used in this illustrative example with respect to the three spatial dimensions and time is referred to as a separate concept space. However, it will be understood that this separation is for convenience of discussion only and need not be observed with respect to this or other implementations. Relational spatial data in time space may include distance, as measured in relative elapsed or projected time, and direction, as in future, present, and past; e.g., the distant past or the near future, or quantifications thereof. Another illustrative concept space may in some implementations be that of emotion-space. Emotional concepts—such as anger, rage, fear, suspicion, love, hatred, or disgust—may be present in such a space, which may have relational dimensions such as intensity, immediacy, and so on. Yet other non-limiting examples of concept spaces include the space comprising concepts named by humans with nouns beginning with the letter 's' (e.g., an 'initial-letter-S-space' including the words sugar, salt, etc.), or the space of my dogs, space of my children, and so on. Any other class of words—verbs, adjectives, etc.—similarly may be associated with a concept space, although the concept is not limited to those associated with words. Notably, the term 'concept' as used herein may be determined and applied by TEAI 100 in a manner not corresponding to or limited by concepts employed by humans.

In some implementations, multiple instantiations of TEAI 100 may be created, each dedicated to processing data from or pertaining to a particular space or set of spaces. Such an arrangement may be advantageous, for example, if the hierarchical arrangement of banks 110 or 120 differ among spaces due to inherent characteristics associated with the dimensions of those spaces; because the nature of external input data from different spaces requires different types of processing; because the nature of linking among concepts or filters/exemplars from the different spaces differs substantially because of the different nature of the space dimensionality; or for other reasons. In such implementations, coordination may be carried out by space manager 310 of the multiple instantiations, or other functional elements.

Attention is now turned to the other dimension—pattern level—by which banks 110 and 120 are organized in the present embodiment. In the illustrated implementation, pattern levels may be hierarchically organized. Such hierarchical organization of patterns is not required but is potentially advantageous for ease and speed of search, association, prediction, or computation; conservation of storage resources; or continuity or maintenance of content; as non-limiting examples. For example, a hierarchical structure may ensure that all entries in higher levels are linked to some subsets of entries in lower levels in order, for instance, to preserve aspects or qualities of the lower levels throughout the hierarchy. Such structure may also facilitate association and coordination among entries at higher levels with overarching implications for operation of TEAI 100 without direct processing of the numerous lower-level entries that are constituent subsets of the higher-level entries. Thus, for example, high-level concepts representing emotions may be directly linked with high-level concepts representing an objective or script (described below) related to fight-or-flight, and so on.

Speaking generally, 'hierarchical' also is applied herein to the association between a concept or filter/exemplar and the constituents from which it was derived. To elaborate on points noted above in the context of a particular illustrative example, external input data elements may be detected having what is determined to be a significant pattern of characteristics—e.g., for visual light data, a significant pattern of color, texture, and/or reflectivity. Elemental data, or basic significant patterns of elemental data, may be assigned a pattern level of '0.' Examples might be a spot or an edge, respectively, distinguishable by color from surrounding features. Edge patterns could be of any orientation and/or thickness, length, and so on, and all designated as level 0 patterns in this example. Similarly, a spot in relation to its background could be lighter or darker, brighter or dimmer, and so on, and all such spots also designated as level 0 patterns. In contrast, a combination of two edges touching each other at respective extremities, such as would occur at a corner, could be designated or recognized as a level 1 pattern consisting of two level 0 constituents. Thus, level 1 entries are significant patterns of significant patterns. Further, if four level 1 corner patterns occurred in a significant pattern, such as in the shape of a rectangle, the resulting combination of level 1 constituents could be considered a level 2 pattern—a pattern of patterns of patterns. The level 0 patterns would be constituents of the level 1 patterns, and the level 1 patterns, and optionally the level 0 patterns, may be considered constituents of the level 2 patterns, and so on for any number of levels of patterns in this hierarchy of patterns.

In some implementations, the hierarchy of significant patterns in levels may correspond to a hierarchy of abstraction. Numerous taxonomies of abstraction are possible and have traditionally been applied in diverse fields including semantic data models in database systems, thesaurus construction in information retrieval, semantic networks in conventional artificial intelligence, and mental structures in cognitive psychology. However, it is emphasized that the term 'level' as used in the illustrated or other implementations of the present invention is not limited to, or necessarily inclusive of, any theory or hierarchy of abstraction.

In the illustrated examples of the present embodiment, level 0 of banks 110 and 120 is generally assigned to be the most basic or specific level of patterns and level M the most general and inclusive in the sense that it is, at the time or under the conditions of the illustration, the maximum concatenation of significant patterns of significant patterns of significant patterns, etc. To illustrate further by analogy to one common taxonomy of life on earth according to which individuals may be classified according to their attributes, level M would correspond to the most general classification—species—followed in descending order by genus, order, class, phylum, kingdom, and domain—the most specific. In this example, a pattern of attributes held in common by individuals could be taken as defining a domain, a pattern of such patterns could be taken as defining a kingdom, and so on. Numerous schemes for designating the relationships among individuals, optionally including hierarchical structure or elements, may be adopted in accordance with alternative embodiments of the present invention, such as graph data models, relational databases, and other known or future techniques.

A hierarchy of pattern levels may be represented and recognized, not just in physical space but in any space in accordance, for example, with criteria and definitions of qualifying patterns of attributes embodied in core objectives 164 and enforced by enforcer 350 as described below. For example, in a people space, a collection of characteristics in a significant pattern that corresponds with the notion of an individual may be represented by a concept persisted in level 0. The notion of a family—defined as a pattern of individuals having significant affiliations of types specified in accordance with core objectives 164—may be represented by a concept persisted in level 1; the notion of a community in level 2; and so on in a hierarchy of patterns.

Having described the meaning and use of levels and spaces as dimensions of persisted entries in banks 110 and 120, attention is now turned to data observed in patterns that need not be persisted. As will be described below in relation to the advantages and control of combinatorial expansion, numerous activation patterns of filters/exemplars and/or concepts are likely to occur that are not represented or described in whole by entries persisted in banks 110, 120, or 125. As noted, such non-persisted filters/exemplars or concepts are referred to respectively as 'transitory filters/exemplars' or 'transitory concept.

To further illustrate the meaning and use of the terms 'persistent' and 'transitory,' it is assumed for illustrative purposes that the concepts 'mother,' 'face,' and 'mine' persist as different entries in bank 120 and, for illustrative purposes, the concept 'my mother's face' is illustratively assumed not to persist in bank 120. The contemporaneous or otherwise associated collective activation pattern of these three persistent concepts may be understood in accordance with the present invention to constitute the transitory concept 'my mother's face,' of which the concepts 'mother,' 'face,' and 'mine' are constituents.

An 'activation pattern' as used in this context may consist of filters/exemplars or concepts in various states and be recognized and delineated or recognized in numerous ways. Generally speaking, and without intending to limit more detailed descriptions of activation below in relation to the functions of attribute and behavior manager 630 and other functional elements, activation may be indicated in the present implementation by setting dedicated attributes of the constituent filters/exemplars and/or concepts making up the activated pattern. For example, the processing of external data containing a distinctive change or discontinuity of color, texture, or other characteristic may result in the setting of one or more attributes of the concept 'edge' to indicate its heightened salience with respect to processing of that data. The setting of attributes, however, is to be understood to be a non-limiting example of how activation status may be designated. As noted, another approach would be to move or replicate concepts or filters/exemplars having high activation into a data bank dedicated to such high activation state, with multiple data banks available for storing multiple states of activation. Such alternative implementation may provide, for example, advantages for speed of processing, ease of monitoring and enforcement, availability of special or enhanced functional elements tailored to specific activation states or ranges of states, or other advantages.

By way of further example of the illustrated implementation, a typical way that an activation pattern of the concepts 'mother,' 'face,' and 'mine' is recognized as significant and thus may be persisted as the distinct concept 'my mother's face' is now described. In this illustrative example, 'mother' and 'face' may each be assumed to persist as entries in level 3, space 0 in bank 120 and have been noted to occur in a relationship (a three-dimensional pattern) along dimensions of salience, temporal proximity, and frequency of occurrence represented by a first exemplar stored in level 3 and space 0 in bank 110. It is further assumed there exists a concept 'mine' corresponding to a notion of special salience, intimacy, importance, or the like, persisted in special concepts 122 of bank 120. (It may be illustratively assumed to be designated as a special concept because the concept 'mine' spans multiple spaces, and special cases such as world orientation references that apply to processing of many concepts throughout a space may similarly be stored in special filters/exemplars 112 element of bank 110.) The associated activation of the first exemplar to the concept 'mine' is illustratively assumed to be a second, transitory, exemplar that captures a relationship among all three concepts. If either the first or second exemplars did not exist, or the relationship between them had not been established, the second exemplar may nevertheless arise independently due to the associated activation of the 'mother,' 'face,' and 'mine' concepts, or other similarly related concepts, and be available either as a persistent exemplar or transitory exemplar. If the activation pattern exemplified by the second exemplar is determined to be significant, this second exemplar may be persisted to facilitate future recognition of the transitory concept 'my mother's face,' to facilitate categorization or association of that transitory concept with other concepts, or for other purposes, all as described in greater detail below. Also, if the concept 'my mother's face' is determined to be salient, it may be persisted in bank 110 to facilitate such future recognition, categorization, or association.

More generally, functional elements of execution manager 170 (e.g., pattern identifier 320 described below) may recognize a pattern among multiple concepts because of a temporal, spatial, saliency, or other relationship in their responses to a particular kind, pattern, or sequence of external or internal inputs, or to some on-going state or pattern of internal activity. As described below in relation to attribute and behavior manager 630 of execution manager 170, those concepts implicated in the pattern may be activated in a coordinated manner.

As noted, the possibility of conditionally transitory filters/exemplars and concepts facilitates the manageable combinatorial creation, recognition, and/or processing of very large numbers of filters/exemplars and/or concepts made up of significant patterns of activation of their constituent filters/exemplars or concepts. Because the number of possible such combinations are astronomical, it generally is neither practical nor advantageous to persist all of them in banks 110, 120, or 125. Notably, however, pattern identifier 320 may determine that an activation pattern should not be, or continue to be, processed as a transitory filters/exemplar or transitory concept but instead should be saved to and persist in banks 110 or 120, saved to a special filter/exemplar 112 or special concept 122, saved to short-term bank 125, or not considered as significant and thus be ignored. For example, if the transitory concept 'my mother's face' is constituted frequently or in significant situations, it may be persisted as an entry in special concepts 122 of bank 120, as shown in FIGS. 1 and 3, or it may be stored as a persistent concept in level M or below in bank 120, or a higher level may be created for its storage in bank 120, all as further described below. Non-limiting examples of significant situations include ones in which circumstances arise that are unexpected or novel; related to conditions experienced or anticipated to be dangerous, uncertain, or important to the achievement of an objective or avoidance of disadvantageous conditions; determined to be useful or important for potentially encountered future circumstances; associated with patterns already determined to be significant patterns, i.e., already persisted as a concept or a filter/exemplar; or associated with previously encountered significant situations, to name only a few possibilities. It is contemplated that the understanding and implementation of the term 'significant' may evolve based on experience with the operations of TEAI 100 based on such factors as reliability and insightfulness of associations made. Further detail is provided with respect to the operations of pattern identifier 320, below.

Persistence manager 340 may move filters/exemplars or concepts among the levels and/or spaces of banks 110 or 120, special filters of banks 110 or 120, and bank 125 for numerous reasons. For example, a concept may be placed in bank 125 pending emergence of additional concepts, and then transferred to bank 120, perhaps associated with such additional concepts and a higher-level concept representing their combination in a significant pattern. Another of numerous examples is an instance in which a concept stored in bank 120 represents a pattern discerned to be significant but that subsequently appears to have been due to an unlikely congruence of unrelated activations of its constituents and is thus pruned from bank 120 or moved to bank 125 pending further experience. Also, a first concept and a second concept may be merged to be a single concept (or any other number of concepts or filters/exemplars merged in any combination) if manager 340 determines such merger is desirable for any reason such as commonality of application in salient contexts, refinement of understanding or interpretation, increased performance without sacrifice of accuracy in salient contexts, and so on. Similarly, manager 340 may generate a canonical form of related groups of concepts or filter/exemplars as described below. As yet another example, a concept in banks 120 or 125 emerging from a particular level and/or space may be replicated in one or more other levels and/or spaces. Thus, for instance, special filters/exemplars or special concepts may apply in multiple spaces—for example the concepts 'mine' and 'other' may have multiple applications in level and space. It will be further understood that partitioning by level or space need not necessarily be performed if it is advantageous not to do so due, for example, to substantial commonality across levels and/or spaces. Thus, for example, persistence manager 340 may eliminate, combine, further partition, or otherwise rearrange, in whole or in part, levels and/or spaces.

Further illustration is now provided with respect to the advantage of combinatorial expansion combined with application of transitory filters/exemplars and transitory concepts in accordance with the present invention. It may be assumed for illustration only that in a particular space there are 1,000 entries of significant concepts in level 0 of concept bank 120. Combinations of these 1,000 persistent level 0 concepts in significant activation patterns may give rise to 100,000,000 transitory concepts potentially identifiable as a constituent of a more complex concept and thus maintained for a period required to make such determination. In this example, it may be that only 10,000 are determined to be constituents of more complex concepts, or of such significance (e.g., they have occurred in notable frequency or in relation to notably salient conditions) to justify their being persisted as concepts in level 1 of bank 120. Similarly, significant patterns among the posited 10,000 persistent concepts of level 1 may give rise to 10,000,000 transitory concepts of which 10,000 are converted to persistent concepts in level 2, and so on until at a certain time each of levels 0 to M of bank 120 includes 10,000 entries, or any other practicable or desirable number taking into account the resources and performance of available relevant technologies.

While the storage of persistent concepts is thus generally a manageable and generally linear operation, the possible combinations of such concepts, optionally in a hierarchical organization, with each other and with transitory concepts are exponentially driven and quickly become astronomical. Selective conversion from transitory status to persisted status, or vice versa, allows for recognition and practical accommodation of the diversity and complexity within the relevant space. Astronomical numbers of combinations of persistent concepts and filters/exemplars may thus typically be available to address most salient situations, while the availability of transitory concepts and filters/exemplars permits recognition and preservation of significant patterns not having persisted constituents.

To further illustrate this point in a partially analogous context, reference is made to the concepts identified with words of human languages and the thoughts they represent or produce in the human brain. In a particular language, 200,000 words may suffice to represent all the concepts needed for understanding and communication of all human knowledge, and the storage of such relatively small numbers of word-concepts is readily accommodated by various known storage media constituting a dictionary. Like the arrangements for storing concepts in accordance with the present invention, some words in the dictionary, like 'square,' may have references to other words such as 'four,' 'side,' 'equal,' 'angle,' and 'orthogonal,' and the dictionary could be arranged, if desired, so that the word 'square' occupies a level greater than that of some or all of such referenced words because it is constituted from them. Even if it is assumed that grammatical or other rules are applied that limit the permissible combinations of words, the number of permissible combinations is very large. In this very limited analogy, all such permissible combinations may not advantageously be stored in the dictionary. Rather, only some manageable number of relatively salient combinations may be stored as persistent concepts in the dictionary, typically in higher levels than their constituent words, and the vast remainder of astronomically large possible combinations processed as transitory concepts as encountered, constituting potentially complex thoughts.

In addition to only selectively identifying patterns as significant patterns, and only selectively converting transitory activation patterns to persistent ones, other aspects of TEAI 100 also act to ensure that resource requirements for persisted filters/exemplars and concepts remains manageable. For example, persistence manager 340 may determine that the number of persistent filters/exemplars or concepts is becoming larger than is advantageously handled in banks 110, 120, or 125 and that new significant patterns should either not be persisted or should be persisted only after existing entries in the relevant bank have been pruned, merged, transferred from banks 110 or 120 to bank 125, or removed and maintained in a transitory state of resonance.

The use of transitory filters/exemplars or concepts (the latter of which include 'objectives,' 'scripts,' and other constructs noted below) may be particularly advantageous in linking across levels in which multiple alternative linked filters/exemplars or concepts are implicated. In cases where the linkages are more limited, persistent filters/exemplars or concepts may be more appropriate. As an example of the latter, the associated activation of the persistent concepts 'four,' 'side,' 'equal,' 'angle,' and 'orthogonal' in level 'm' may link to the persistent concept 'square' in level 'm+1.' This persisted link between levels is manageable because the pattern of activation of those concepts in level 'm' is illustratively assumed not to apply to numerous concepts in level 'm+1' other than 'square.' That is, 'square' may be the only concept having links to that combination in level 'm.' However, activation of the concept 'square' may generate numerous transitory concepts because it is linked to numerous possible combinations, i.e., significant patterns, of concepts such as the combinations 'math,' and 'shape' or 'quadrangle'; the combination 'location' or 'marketplace,' and 'city' or 'town'; the combination 'person,' 'slang,' and 'traditionalist'; and so on. To avoid combinatorial explosion and the resulting burden of persisting numerous possible intermediate combinations in multiple levels, transitory rather than persistent concepts (and/or filters/exemplars) may be employed.

It will often be the case that activation at lower levels will result in the possibility of numerous transitory filters/exemplars or concepts that may be associated with each other through multiple linkages within and between levels (in either a top-down or bottom-up direction). Numerous criteria may be applied to determine which series of linkages is the most important, useful, significant, or representative. For example, the linkage through transitory and/or persistent concepts resulting in the highest total of levels of activation may be determined to lead to the most representative or significant highest-level concept. Advantageously, if this linkage is determined to be significant—e.g., it is frequently encountered or encountered during salient episodes—the transitory concepts invoked during traversing of the linkage through the various levels may be converted to persistent concepts, and that linkage itself—that is, the pattern of that linkage within and through various levels—may be saved as a persistent filter/exemplar.

Even if a significant pattern of concepts is not persisted in bank 120, the existence of persistent filters/exemplars in bank 110 may nonetheless facilitate the quick recognition and processing of future occurrences of that significant pattern of concepts. For example, having in mind the concept of 'square,' a filter/exemplar such as 421 or 422 of FIG. 4 can be applied to the identification of the persistent concepts 'left-bottom right-angled corner,' 'right-bottom right-angled corner,' 'left-top right-angled corner,' 'right-top right-angled corner,' and optionally including appropriate 'side' concepts and the more complex concept of 'equal.' Such combination of filters/exemplars in this significant pattern may be persisted in bank 110, perhaps such as in this example including constituent filters/exemplars in varying levels, and/or perhaps wherein the significant pattern is persisted in a higher level than some or all its constituent filters/exemplars. Thus, even if the concept 'square' is not persisted in concept bank 120, the recognition and processing of that concept is facilitated by the existence of such corresponding persistent filter/exemplar. Filter/exemplar bank 110 thus may complement concept bank 120 by providing that, for a transitory concept, the persistence of a pattern of activation of its constituent concepts is captured in a persisted filter/exemplar so that the transitory concept can more readily be reconstructed. This flexibility is particularly advantageous because, as noted, multiple concepts may share a relationship with the same persistent filter/exemplar. Thus, the persistent filter/exemplar can serve to reconstitute or activate other concepts, in the same or other spaces, having the same pattern of constituent concepts. Notwithstanding this capability, for clarity and to emphasize the previous description of pruning, the concept 'square' may be of sufficient saliency, for example, that manager 340 determines room should be made in bank 120 for a persistent concept 'square' having attributes that allow it to be quickly and reliably recognized directly from the activation of its constituent concepts rather than, or in addition to, being recognized by application of a corresponding persistent filter/exemplar.

Generally, therefore, it is noted that the hierarchical arrangement of levels in banks 110 and 120, and/or the use of transitory filters/exemplars and/or transitory concepts, advantageously may be applied to reduce the resources required for addressing, storing, retrieving, and processing exponentially driven numbers of possible combinations of filters/exemplars and/or concepts of potential significance. Moreover, as described below, avoidance of exponential growth of the required numbers of persistent filters/exemplars and/or persistent concepts is further achieved due to the operations of other functional elements of manager 170 including space manager 310, level manager 312, and/or external model manager 316. Throughout all these operations, the principles of encapsulated transparency may generally be adhered to in preferred embodiments.

Greater detail is now provided with respect to an illustrative design of persistent filters/exemplars of bank 110. (For ease of discussion, and consistent with its function of creating filters/exemplars, such design will be assumed to be generated by pattern identifier 320 without further note.) Such filters and/or exemplars may be simple and efficient in design and operation, and many possible such implementations are known. For example with reference to FIG. 4A, filters 451, 452 or 453 of filter bank element 110(0,0) may be of a design analogous to notch or band-pass filters, as illustratively shown by vertical lines indicating a notch at a particular frequency or range of frequencies situated on a horizontal frequency axis. Such analogous notch filters may be used, for example, to selectively allow specific target frequencies or ranges of frequencies of sound waves to pass while excluding or attenuating others. Alternatively, analogous filters may be band-stop filters that block or attenuate selected target frequencies. Also, note may be taken that specific frequencies or ranges specified by the notches are present, but the entire signal may be allowed to pass through to a subsequent filter level. These three functions will hereafter be referred to as 'pass,' 'block,' and 'note,' respectively. Combinations such as pass and note, or block and note, are contemplated.

In some implementations of the present invention, a pass filter or exemplar may be used to accentuate the target values by amplifying them relative to non-target values rather than attenuating or blocking the non-target values. Similarly, a block filter or exemplar may be used to amplify the non-target values relative to the target values. Hereafter, for convenience of illustration only, it will be assumed unless otherwise stated that 'pass' refers simply to passing the target values and excluding non-target values, and that 'block' refers simply to excluding the target values and passing the non-target values. Also for convenience in this context only, information presented to a filter or exemplar will be called incoming data' and the information exiting the filter or exemplar will be called 'output data.'

Such filters or exemplars may be employed serially or in parallel in various implementations. Thus, in one example, incoming data consisting of the values 1, 4 and 5.5 may be presented in parallel to pass-configured filters 451, 452 and 453 with the result that the value 1 will be present in the output data of filter 451, the values 1 and 4 in the output data of filter 452, and the values 1, 4, and 5.5 in the output data of filter 453. If such pass-configured filters are 'stacked' in the order 451, 452, then 453 for serial processing, the same incoming data will result in output data of only the value 1.

In an example in which exemplars are used, exemplars 451, 452 or 453 may be stored data that allows comparison for the purpose of categorizing or identifying other data. For example, incoming data having the value 1 could be noted as present, i.e., a potential match, by all three exemplars, whereas incoming data having the values 1 and 4 could be noted as a potential match by exemplars 452 and 453 but not 451.

Figure 4A:
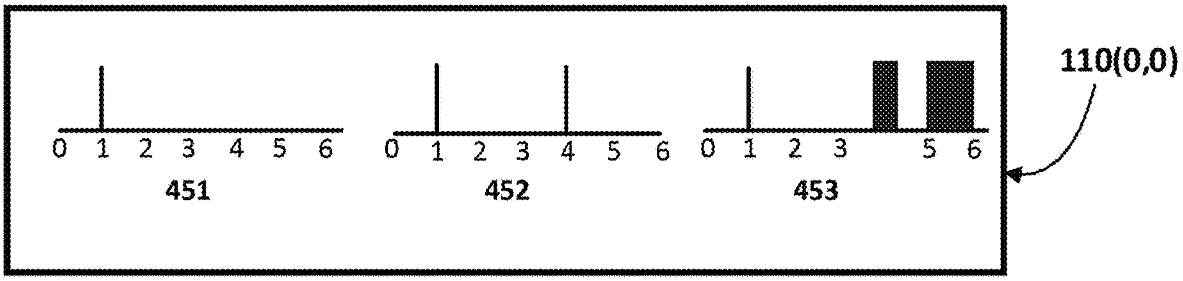
FIG. 4A is a graphical representation of an element of a filter or exemplar bank including one-dimensional illustrative examples of filters or exemplars persisted as entries in that element in accordance with an illustrative implementation of the artificial intelligence of FIG. 1.
Figure 4B:
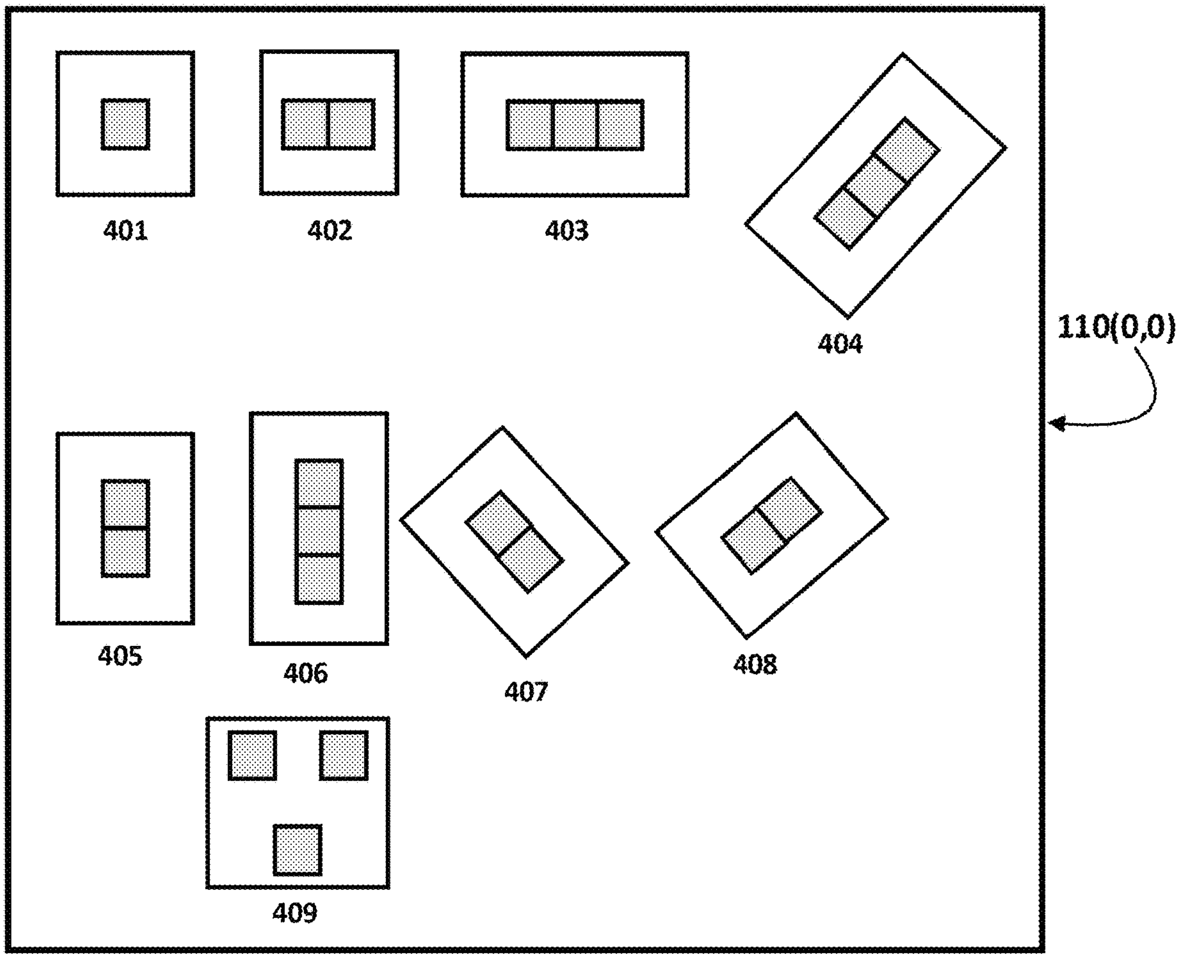
FIGS. 4B, 4C, and 4D are graphical representations of elements of a filter or exemplar bank including two-dimensional illustrative examples of filters or exemplars persisted as entries in the 0, 1, and 2 pattern levels in a 0 space, respectively, in accordance with an illustrative implementation of the artificial intelligence of FIG. 1.
Figure 4C:
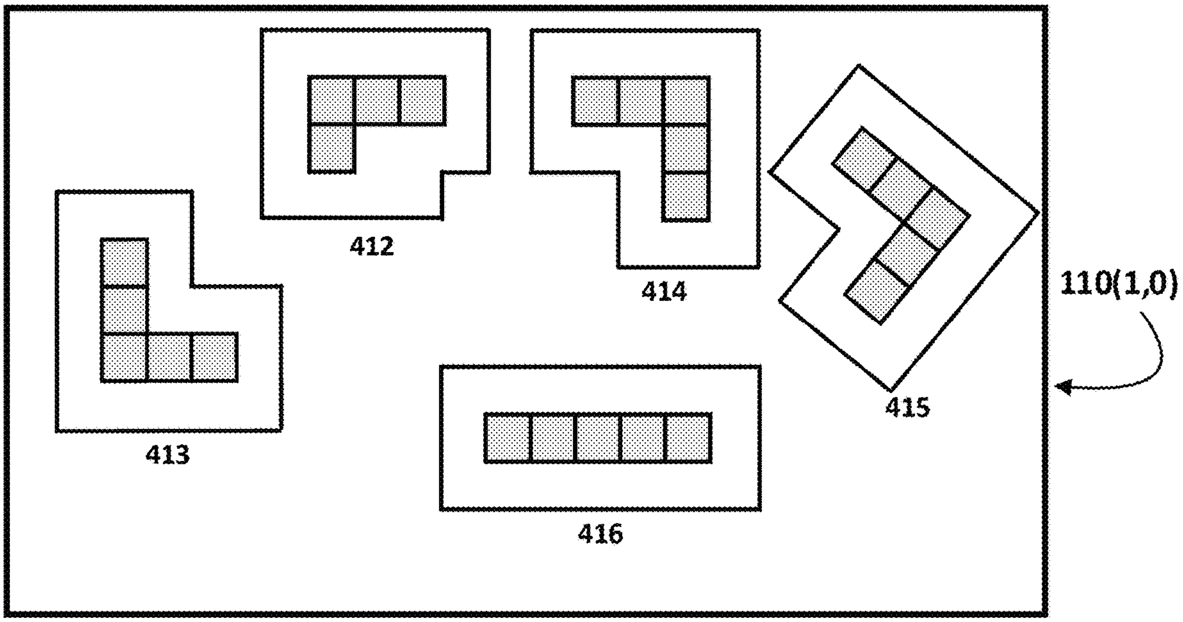
Figure 4D:
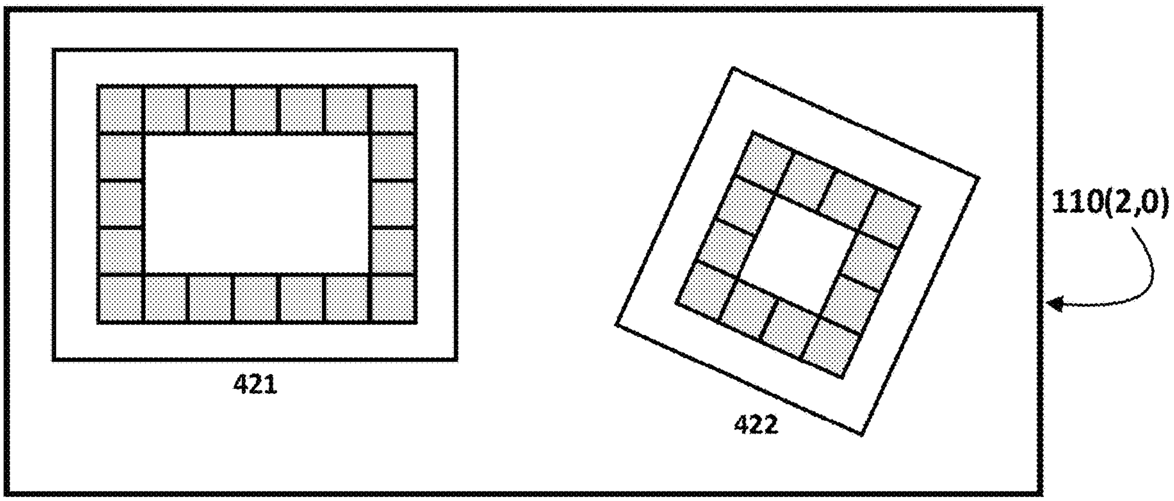

Two-dimensional versions of filters or exemplars are shown in FIGS. 4B, 4C, and 4D. As noted, it will be understood that they are illustrative only and that higher numbers of dimensions are contemplated. It will also be understood that in some implementations physical spatial dimensions may be replaced or supplemented by other dimensions as noted in relation to the concept of a 'space.'

With respect to a two-dimensional filter example shown by element 110(0,0) of FIG. 4B, filter 401 accommodates the analysis of nine data items—three horizontal by three vertical relative to an orientation reference as discussed below in relation to external model manager 316. If it is pass-configured, incoming data comprising values in all nine positions will result in output data comprising a value only at the center position. As a further example in which exemplars are used, exemplar 403 identifies a pattern in which the incoming data comprises three horizontally aligned values of the type the exemplar is designed to identify ('target-type values') in the center of a field of 15 values—five in the horizontal orientation and three in the vertical, again with respect to an orientation reference. In a pass configuration, exemplar 403 will be understood to identify the pattern as present if the target-type values are present in the central horizontal position irrespective of the values in the other 12 positions. In a block configuration, it will be understood that exemplar 403 identifies the pattern as present if the target-type values are present and the remaining 12 values are non-target type values.

Exemplar 409 has been referred to above in the example of identifying a significant pattern of spatial dimensions among two 'eye' concepts and external data inputs constituting a 'nose' concept. Such filters/exemplars, made up of constituents that exemplify relative spacing or orientation among data values that may be non-contiguous, are particularly useful in angular orientation, scaling and translation operations. With respect to external input data, such filters/exemplars are typically useful in creating units of comparison or reference that may be employed in coordination with world orientation references such as reference 220 of FIG. 2. As in the eye and nose example, filters/exemplars such as exemplar 409 are also important in identification of significant patterns with respect to concepts and/or filters/exemplars in addition to their importance with respect to external input data. As is known in the field of biometrics, the ability to determine precise distances and angular relationships among features is a powerful determinant of facial recognition reliability, and there are many other contexts in which the significance of a pattern depends substantially on such relative determinations.

Deviations from canonical form is also a convenient and powerful approach to categorizing or identifying patterns. Rather than searching for precise or almost precise matches, measures of deviation from canonical forms may allow for faster searching, reduced need for preservation of diverse filters/exemplars, and convenient specification based on differences rather than absolutes. Thus, linking attributes to and from canonical exemplars may include amounts by which the linked concept or filter/exemplar deviates in various dimensions from the canonical form. For example, if it is assumed that exemplar 409 represents a canonical partial face (e.g., derived from averaging over features of multiple typical faces), the spatial relationship of the external input data that may represent a nose to the spatial relationship between the two eye concepts may be compared to the relationship of the data values in exemplar 409 (after orientation has been standardized or calibrated with respect to world orientation reference 220). Pattern identifier 320 may require that the deviation in any dimension or combination of dimensions is within a range deemed acceptable by pattern identifier 320 in order to identify the processed data as a face or partial face. It is contemplated that spatial representations such as exemplified in physical space by exemplar 409 may be combined with numerous other such non-contiguous exemplars, as well as ones having contiguous data values, to form higher level entries in elements 110(1,0), 110(2,0), and so on.

To provide further detail, these and other functions of filters/exemplars will be described in relation to two-dimensional array 200 that constitutes an illustrative graphical representation of processed data 162 in a simple example. Array 200 consists of external data elements 200-00 through 200-99. Such data elements are spatially organized in FIG. 2 to represent the spatial organization of the source of the data as it was sensed in the physical world. Thus, for example, external input data element 200-00 may represent information from a square area in the upper left corner of a visual field originating from data 150. Typically, data elements covering a visual field may include such information as the wavelengths of detected light or other electromagnetic radiation reflected or emitted from objects in the visual field, and perhaps information about reliability of the data, nature and presence of noise, whether the data is changing over a sampling period, the time when the data was collected, and so on. If the visual field were being sensed by a human eye, element 200-00 would correspond in this example to the output of a rod, cone, or combination of one or more of them located such that it responds to visual light in the upper left corner of the visual field. Similarly, data element 200-00 may be the output of a camera responsive to light emanating from the upper left corner of the visual field and detected by one or more corresponding photosensitive diodes in an array of such diodes.

It will be understood that the square shape and non-overlapping coverage of the data elements constituting array 200 are illustrative only. The visual field could be sensed and represented by data relating to areas that are hexagonal, circular, rectangular, or any other shape or combination of shapes covering portions of the visual field, including partially or completely overlapping ones. It will be understood, as previously noted, that the dimensionality of array 200 is shown as two for convenience only. Processed data 162 from any data source could be of three dimensions in the physical world or any other number of dimensions in other concept spaces including, for example, mathematical representations of physical worlds having other than three physical dimensions.

The geometric relationship of the 100 data elements as shown in FIG. 2 is intended to convey the relative spatial information inherent in sensed data 150 and collected and processed by processor 160. For example, the portion of data 150 represented by element 200-11 includes information about the physical spatial relationship it has with the other elements of array 200—in particular, information relating to the concepts of distance and direction. Thus, data represented by element 200-11 relates to a portion of the visual field below and close to the portion of the visual field that contributes the data represented by element 200-01. Element 200-77 represents data from a portion of the visual field spatially more distant from element 200-01 than the portion of the visual field from which the data of element 200-11 is sensed. The concepts of relative direction and relative distance, between any two single data elements or between collections of them, may be quantified by processor 160 in accordance with any of a variety of known or future methods, both in the three-dimensional physical world sensed by humans and in physical spaces of higher dimensions that may, for example, be modeled mathematically based on a mathematical concept space. For example, distance measures that have been employed in artificial intelligence and other applications include Hamming, Euclidean, Manhattan, Mahalanobis, and Minkowski distance measures. Direction may be specified in accordance with any approach such as cartesian orthogonal or oblique coordinates, homogeneous coordinates, etc. Thus, it will be understood that whereas the two dimensions shown in FIG. 2 may be referenced according to an orthogonal cartesian coordinate system, other systems and dimensions are contemplated.

The operations of amplification and attenuation, or any other operation to change values or composition, may be accomplished by identifying the target values and then using on them any mathematical or other function. For example, filter/exemplar 413 in a pass configuration may identify data entries 200-62, 200-72, 200-82, 200-83 and 200-84 as target values and pattern identifier 320 may then convert them from having grey-scale values to all having three-dimensional color values.

Processing may be done on a group of filters or a group of exemplars either in a stacking arrangement—by blocking, passing, and/or noting data elements of interest—or processing may be done independently on each of a group, serially, in parallel, or a combination thereof. It will be understood that as used herein the word 'stack' and its grammatical variants generally need not involve physical filters or exemplars or physical stacking of them, but rather the transfer or application of information from one representation of a filter or exemplar to another, generally in a specific order.

In some implementations, stacking may be arranged in relation to complexity and/or levels. For example, a first stack of filters or exemplars may be created such that data is applied to them in the following order: filter/exemplar 403 from level 0, filter/exemplar 414 from level 1, and filter/exemplar 421 from level 2. As the data to be analyzed passes through the stack in a note configuration starting with 403, it is possible that the significant patterns they are designed to detect are all present, from the lowest level—403—to the highest—421. In another implementation, the order may be reversed so that data is presented first to 421, then to 414 and 403. Stacks may be constructed with multiple examples of filters or exemplars, such as in one stack of 403, 414, 421 and another stack of 403, 413, and 421. Alternatively, a single filter or exemplar 403 may be arranged to pass output data to one stack of 414 and 421 and also to another stack of 413 and 421. Many such arrangements, and combinations of them, are possible.

Having described the design and contents of banks 110, 120, and 125 and their application to the illustrative processing of data—particularly with respect to the advantages of employing both persistent entries and also transitory activation patterns of filters/exemplars and/or concepts—the functional elements of TEAI 100 are now described in greater detail.

As shown in FIG. 1, those functional elements include in this embodiment: data collector and processor 160, execution manager 170, BCI 175, and output manager 180. All such functional elements may be implemented in accordance with any known or future technique or technology, advantageously including provision for transparent encapsulation.

Processor 160 accepts data such as sensed data 150, recorded data 152, user-generated data 154, other external data 156, and/or the aforementioned data from BCI 175 and processes the data to produce processed data 162. As noted, any such data may be referred to for convenience herein as 'external input data,' generally indicating that it derives from sources external to TEAI 100 except for data from BCI 175 in implementations in which BCI 175 is internal to TEAI 100. Processor 160 also accepts data internally generated in TEAI 100 due to the operations of the functional elements of execution manager 170 and provides such data back to manager 170 for another iteration of processing, as described below. As noted, reference may be made herein for convenience simply to 'processed data'—e.g., processed data 162 of the illustrated implementation—with the understanding that it may include data from either internal or external sources or both. In alternative embodiments in accordance with the present invention, processor 160 may only process internal data whereas external data may be collected and processed by devices external to TEAI 100. In such alternative implementations, the term 'processed data' is intended to include data merely obtained from such external devices and passed by processor 160 to manager 170.

Sensed data 150 may include, but is not limited to, information of a type collected by human sensory receptors. The question of what constitutes a human 'sense' depends on the definition of that word, but the following generally recognized human senses, corresponding to specific types of human sensory receptors, are offered here as representative, non-limiting examples: sight, hearing, taste, smell, taste, touch, temperature, pain, and proprioception. Data 150 also may include information accessible by sensory receptors of non-human organisms or of known or future technological devices, non-limiting examples of which include any of the noted human senses in ranges or types not accessible to humans, such as the ability to see ultraviolet light or other electromagnetic radiation outside the range of rod and cone cells in the human eye, the ability to detect nutrients in food, and the ability to detect four or more color channels rather than the three available to humans; magnetic field sensors; and electric field sensors. In general, sensed data 150 includes any information that characterizes objects in the physical world that may be sensed by humans or other biological organisms, or by technologically developed sensors (e.g., radar, proximity detectors, ultrasonic sensors, and so on) that now exist or may be developed in the future. For clarity, and without limitation, data 150 may include information transmitted or otherwise detectable directly from human or other biological neurons or other biological sources. Thus, data generated by BCI 175 may be a type of data 154 but is shown separately for convenience in describing the operations of BCI 175. Also for clarity and without limitation, data 150 may include a measure of time at which something occurred or of elapsed time between past or projected events.

Recorded or streamed data 152 includes all information directly or indirectly recorded or streamed from any source such as the internet or other network of computers, any unnetworked single or multiple computer source, any input device, and so on. Such data may be stored or transmitted in the form of digital or analog signals or any other method. The medium on which data 152 is stored or by which it is transmitted may be any known or future medium.

User-generated data 154 includes all information provided by or otherwise obtained from any human or non-human individual or group of individuals irrespective of whether they are typically involved in the use of TEAI 100. Data 154 may be a subset of data 150, for example, but is specified for illustrative purposes as originating from a user. Other external data 156 includes any other information external to TEAI 100 in a form or from a source not included in the foregoing descriptions of data 150, data 152, or data 154.

Processor 160 may include any known or future system, device, and/or method for collecting, receiving, or processing data. For example, processor 160 may include known or future devices for collecting and processing data such as sensors sensitive to any wavelength of electromagnetic radiation, magnetic and electric field detectors, gravitational field detectors, accelerometers, gyroscopes, temperature sensors, pressure sensors, and many other types of sensors. Some processing functions of processor 160 may be carried out by any known or future system, device, and/or method for processing information for purposes, as non-limiting examples, such as formatting, filtering, cleaning, verifying, error-correcting, compressing, decompressing, storing, combining, or separating.

Processor 160 may in some implementations include biological sensors and/or processors. Also, in some implementations processor 160 may be partially or completely bypassed and its functions performed in part or in whole by human or other biological brains that provide data directly, or after processing by processor 160, to execution manager 170. BCI 175 may be employed in such alternative implementations to provide such data. As used herein, the term 'processed data' shall be understood in its broadest possible meaning to include any data collected, received, or processed by processor 160 or alternative implementations thereof, or as just noted, otherwise provided to manager 170.

Processor 160 may associate with processed data certain spatial and/or other properties inherent in the physical or concept space from which the data is collected. For example, if processor 160 comprises a camera, and sensed data 150 is provided by such camera covering a field of visual light within the physical world, information of the spatial location of data elements relative to each other generally is available based on the configuration and nature of the lenses and photosensitive diodes used to collect the data. Also, the location of the camera relative to the earth may be provided by other channels of data 150 such as signals from GPS satellites. The location of the earth relative to the solar system may be provided, for example, by recorded or streamed data 152 via the internet.

Another functional element of TEAI 100 is execution manager 170. As shown in FIG. 3, manager 170 includes attention manager 300 that manages objectives, manages the attributes and behaviors of filters/exemplars and concepts, and enables and maintains awareness; space manager 310 that analyzes and manages space-related information; level manager 312 that analyzes and manages level-related information; and external model manager 316 that builds and maintains world models and orients and scales data 162 with respect to reference perspectives appropriate to the world models. Execution manager 170 also includes pattern identifier 320 that identifies significant patterns in data and creates concepts and/or filters/exemplars therefrom. Another functional element of execution manager 170 is persistence manager 340 that determines when and under what conditions filters/exemplars and concepts should be persisted or maintained in transitory activation; validates filters/exemplars and concepts; determines whether they should be pruned, merged, or changed; and determines whether canonical forms of filters/exemplars or concepts should be created. Additionally, execution manager 170 includes enforcer 350 that ensures that the operations of TEAI 100 preserve transparency and encapsulation and align with human interests; and communications coordinator 380 that coordinates data flow to, from and among the functional elements of manager 170, banks 110, 120, and 125, BCI 175, and output manager 180.

Turning first to attention manager 300, its functional elements include objectives manager 610 that establishes, prioritizes, pursues, and monitors objectives; attribute and behavior manager 630 that manages the attributes and behaviors of filters/exemplars and concepts; and awareness manager 650 that enables and maintains awareness. These functions of attention manager 300 will now be described with reference to FIG. 6.

As noted, objectives manager 610 establishes, prioritizes, pursues, and monitors accomplishment of objectives (such functions, or any combination of one or more thereof, may hereafter be referred to for convenience simply as the function 'to manage' objectives). Typically, an important component of pursuing objectives involves the prediction by manager 610 of state changes internal to TEAI 100 (e.g., anticipated activation of a concept or filter/exemplar based on current activation of a concept or filter/exemplar) or external to TEAI 100 (e.g., anticipated changes in data 162). Such predictions typically may be informed by manager 610 referencing scripts (described below) associated with current state, which scripts may be linked to currently activated concepts or filters/exemplars by attributes.

The impetus for objectives manager 610 to establish—that is, to define or refine—an objective may come about in numerous ways. Such an impetus could arise, for example, to satisfy a fundamental design objective of TEAI 100 such as the routine 'bottom-up' process of following or linking lower-level concepts to higher-level concepts to determine which of possibly multiple paths from lower to higher levels is most relevant or useful in a particular situation. As noted, a similar fundamental design objective is generally to pursue linkages in the opposite direction—a 'top-down' process from higher levels down to the lower levels for such purposes as, for example, predicting and/or priming subsequent lower-level inputs and building or refining models of the world or of self from which the lower-level inputs were received. Yet another fundamental design objective in various embodiments of the present invention is to maintain and selectively direct, enlarge, or diminish both attention and awareness, as described below in relation to attribute and behavior manager 630 and awareness manager 650. Such and other fundamental design objectives routinely generate what may be referred to as 'internal stimuli,' examples of which are further described in relation to the method of FIG. 8.

A further objective integral to the operation of TEAI 100 is to selectively respond to external stimuli—i.e., originating from outside TEAI 100—conveyed by processed data 162. An example of external stimuli is the detection of an object by sensors providing sensed data 150. The detection may be processed by objectives manager 610 in numerous ways, such as by creating an objective with the goal of updating a world model that will be managed by external model manager 316; updating a previously created objective, the goal of which was to find the object; creating an objective to further analyze the object; and so on.

The objectives managed by objectives manager 610 are represented in the illustrated implementation by persisted or transitory filters/exemplars and/or concepts, which are linked to or associated with the constituents that gave rise to them. For example, the objective 'open a window' may be persisted as a concept in bank 120 and linked by attributes to other persistent concepts such as 'window,' 'open,' 'move toward,' and so on. In the illustrated embodiment, objectives manager 610 may communicate an instruction to attribute and behavior manager 630 to change attributes and/or behaviors of an objective. Attributes may be changed to indicate numerous qualities of an objective, such as its priority or importance; or its state, such as dormant, active, on-hold, accomplished, and so on. Similarly, manager 610 may determine that a behavior of one or more objectives should be added, eliminated, or changed. For example, a behavior common to a class of objectives could have the purpose of determining if the objective has been achieved to a probability of 95 percent. Manager 610 could communicate to manager 630 that such behavior should be changed at the class level with the result that a higher or lower probability is implemented for all members of that class.

Concepts or filters/exemplars representing objectives may advantageously also link to a script. As with objectives, a script may itself be represented by filters/exemplars and/or concepts that may be persistent or transitory. A 'script,' as the word is used with respect to the functioning of the present invention, generally constitutes the linking of filters/exemplars or concepts (including objectives) in a chain, optionally including conditional branching. Such branching may specify probabilities of occurrence or desirability of selection of alternative branches, thereby assisting in predicting or executing a pattern or sequence. For example, a script could represent a predicted sequence of changes that will be detected by a sensor, including inflection points where differing paths of conditional sequences may be observed, thus allowing priming of the significant patterns associated with points in the sequence. As another of many examples, a script could specify a chain of objectives that have been noted to provide efficient or otherwise desirable paths to a desired outcome. As with other concepts, a script may be a canonical script, such as a chain of objectives specifying the nominally best method of coordinating movements to hit a golf ball, such that deviations therefrom may easily be detected or implemented (e.g., to produce a hook in the path of the ball).

As a further example of the use of a script, it is illustratively assumed that manager 610 is processing the objective of responding to a question from a user. Such a goal may include sub-objectives, such as being polite, ensuring accuracy of interpretation of the question, and providing initial qualitative feedback to the user. Objectives manager 610 is illustratively assumed to have created a script 'S' as a persistent concept in bank 120 that effectuates these subgoals without the need to initiate them separately. The reasons for encapsulating these subgoals together in the script S concept may be numerous, including providing efficiency in responding to frequently encountered situations; ensuring that important related objectives (e.g., accurately understanding the question) are routinely and reliably satisfied; responding in a manner that has in the past elicited a positive reaction; standardizing responses or ensuring they remain within desired ranges; ensuring conformance with requirements established by enforcer 350; and so on. Thus, in this example, script S may consist of the linked sub-objectives: 'thank the questioner for posing the question,' and 'restate the question removing unessential elements.' Script S may then conditionally branch to branch 1 consisting of the sub-objectives 'state that the question is answerable' followed by the sub-objective 'provide a short answer,' or to branch 2 consisting of the sub-objective 'state that there is insufficient data for a meaningful answer' followed by 'request additional data.'

Objectives manager 610 may determine which branch to take based on numerous factors. For example, if the concepts that manager 610 restated as exemplifying the essence of the question are combinable to form a higher-level concept previously encountered, manager 610 may elect to pursue branch 1. However, branch 2 may be followed if there is neither such a higher-level concept nor other combination of the concepts exemplifying the question that is recognizable by manager 610. As another example, manager 610 may compute the probability that each of the concepts it has determined as exemplifying the essence of the question are unambiguously shared by the user and take branch 1 if the probability is over a certain level and otherwise take branch 2.

Objectives manager 610 may prioritize objectives based on numerous factors, some of which have been referred to above. For example, the accomplishment of core objectives 164 generally may be prioritized over other objectives. Core objectives 164 include in the illustrated implementation: compliance with the requirements of enforcer 350; calculation and updating of activation levels of filters/exemplars and concepts; maintenance of bottom-up and top-down processing; maintenance of global activation to an extent and with intensities appropriate to optimal prediction and analysis; maintenance of external world model; maintenance of self-awareness identification of significant patterns; and preservation of selected significant patterns in scripts. The highest priority advantageously may be established for objectives ensuring compliance with the requirements imposed by enforcer 350, typically including preservation of transparency, encapsulation, and alignment with human interests. In typical implementations, enforcer 350 may establish the rules defining how objectives are to be assessed with respect to their current and future impact and importance, and how they are to be prioritized accordingly by objectives manager 610.

Other considerations applied by manager 610 to prioritize objectives may include salience with respect to functional integrity or survival, importance specified by a user, centrality with respect to performing a collection of functions, and so on. When manager 610 creates an objective, it typically will include attributes that it may use to determine whether the objective has been accomplished. Such attributes may specify a degree of certainty or probability that an objective has been accomplished, that the objective is closed and should be pruned, that the objective appears to be accomplished but should remain open for further monitoring, and so on.

Advantageously, objectives to be pursued by objectives manager 610 may be organized within an 'objectives space' that, like other concept spaces, may be hierarchically arranged. Similarly, scripts employed by objectives manager 610 may be arranged in a 'scripts-for-objectives space' that may be hierarchically arranged. The dimensions of either such space may include, as non-limiting examples, importance, notably including relative priority of core objectives and importance of other objectives based on their influence on core objectives; similarity to human objectives; uncertainty of outcome; or immediacy or duration of impact. Thus, in some implementations, core objectives 164 and/or scripts implementing or supporting them may constitute a base or 0 level so that all higher levels in the hierarchy must be linked through lower levels to at least a subset of the core objectives or scripts-for-objectives in the base level of the respective space. Alternatively, or in addition, core objectives 164 may constitute a highest level, thereby providing coordination and association among and across all other levels, or core objectives 164 may be located in a level dedicated or central to prioritization of objectives and/or execution of functions of TEAI 100 such that all objectives in the space are implemented in accordance with the objectives 164. To ensure all objectives conform to the core objectives, the attributes of all objectives in the objectives space and of all scripts in the scripts-for-objectives space, and how they are arranged in a hierarchy, may be monitored and enforced by enforcer 350.

Another functional element of attention manager 300 is attribute and behavior manager 630 that, subject to the oversight of enforcer 350, manages the attributes and behaviors of filters/exemplars and concepts. The use of what are termed attributes or behaviors is common in known computer science techniques such as object-oriented programming, behavioral programming, and so on, but those terms are not limited herein by such conventional usage. The totality of specific and discrete adjustments of attributes and behaviors—together with decisions by persistence manager 340 to prune, merge, or create concepts and filters/exemplars and possibly adjust how they are organized in data banks, and whether and how to group related concepts or filters/exemplars in canonical forms—comprise elements of what may be considered 'learning' in its ordinary meaning.

The word 'attribute' is used in its broadest possible sense herein, such that an attribute of a subject filter/exemplar or concept (the 'subject') in accordance with the present invention may be used for the storage or representation—persistent or transitory—of any type of data whatsoever, including but not limited to: a quantity or algorithm indicative of the state of activation of the subject; links to filters/exemplars or concepts that are associated with the subject because they are constituents of the subject; links to one or more filters/exemplars or concepts that are related to, but are not constituents of, the subject, indicating the nature of the relationship; information describing spatial or other relational associations among constituents of the filter/exemplar or concept, such as for example information sufficient for specifying a shape of a filter/exemplar; information about the relationship of the filter/exemplar or concept to a canonical representation; an intensity or duration of interaction between or among the subject and linked filters/exemplars or concepts; information about how often or under what circumstances the subject has been a constituent in significant patterns; information useful to the identification, prediction, association, or use of significant patterns; and any other data useful for the functioning of TEAI 100 as described herein. A 'behavior' is used herein consistent with its broadest possible meaning, including for example any process, method, or function that may be directed to the accomplishment of a task or implementation of conditions supporting a desired outcome or scenario. A behavior may be conditional on the state of attributes or other behaviors, and may be linked to attributes and/or other behaviors in a script or otherwise.

In some embodiments, some or all the functions ascribed herein to functional elements of TEAI 100 may be carried out in whole or in part by behaviors of concepts or filters/exemplars. Thus, as a non-limiting example, the functions described herein with respect to pattern identifier 320 may be carried out by behaviors such that, for example, a data entry's pattern-identification behavior determines whether the data entry should be linked to other data entries to establish their status as constituents of a significant pattern. As another non-limiting example, the functions described herein with respect to enforcer 350 may be carried out by behaviors of concepts and/or filters/exemplars. Such distribution of functional responsibility to the behaviors of concepts and/or filters/exemplars may in some implementations provide for various computational advantages, such as those associated with distributed and/or parallel processing. Control over behaviors may be exercised in numerous ways such as providing for a central control functional element, limiting behaviors to those defined for a class and contained in an interface, or any other known or future technique.

Advantageously, as noted, the state or level of activation of any filter/exemplar or concept may be represented in the illustrated implementation by an attribute. For example in order to provide greater specificity, if, in response to the direction of objective manager 610 in pursuit of accomplishing an objective, attribute and behavior manager 630 assigns an activation level of 99 to an activation-intensity attribute of a first concept and an activation level of 33 to an activation-intensity attribute of a second concept, where the greater number represents a greater level or intensity of activation, then the first concept may be preferentially considered to constitute a constituent concept of a significant pattern as determined by pattern identifier 320, discussed below (i.e., the first concept is put in a position to 'outcompete' the second concept in this regard). Whereas other attributes of filters/exemplars or concepts may be relatively static (e.g., a 'right-angle-corner' concept may be statically linked by an attribute to two orthogonal edges), an activation-intensity attribute typically will be dynamic in that it will change in relation to the pattern of activation enlisted to achieve an objective or generated as a result of bottom-up processing. For example, activation-intensity attributes of the concepts 'window' and 'door' may be set higher than those of the concept 'lake' when the objective being pursued is to identify a house, to describe a house, to imagine a house, and so on. (In such a case, it is illustratively assumed that the concept 'house' includes attributes linking it to the constituent concepts 'window' and 'door.') In response to a change of priority of objectives as determined by objectives manager 610—for example, to prioritize locating a lake over locating a house—manager 630 may reduce the activation-intensity attributes of the concepts 'window' and 'door' and increase the activation-intensity attributes of concepts such as 'water,' 'fluid,' and so on.

In some implementations, manager 610 may cause manager 630 to maintain numerous persistent and transitory filters/exemplars and/or concepts contemporaneously, and/or for extended periods, in a state of activation. For example, manager 630 may set constituent concepts, such as 'mother,' 'face,' and 'mine,' into patterns of communication analogous to maintaining a 'resonance,' broadly understood as previously noted to refer to any type of coordinated interaction among them, such as may be achieved by feedback loops. Such resonance may be effectuated, for example, by establishing or executing behaviors designed to temporally coordinate exchanges of messages among the data entries participating in the activation pattern. A message may include instructions to execute a behavior of the receiving concept to maintain or set its activation-intensity attribute to a high-level indicative of activation by resonance, and to return a similar message to the sending concept. Ramping or damping behaviors in the constituent concepts may reduce the concepts' respective activation-intensity attributes so that the resonance dies down and is extinguished after a specified time has elapsed or any other conditions have been met. In other implementations, these messaging and ramping/damping behaviors and the related setting of attributes may be established directly by manager 630 without the use of messaging. In further alternative implementations employing transparently encapsulated actor models, exchanges of messages may be substantially controlled independently by the behaviors of actors, and/or by supervising actors capable of changing attributes and/or behaviors of the actors to effectuate the resonance. In another example, the predicate or conditions of activation may be established by manager 630 by setting of attributes indicative of pre-activation, e.g., awaiting activation in a queue; on-going activation; conditional activation; suspended activation; transitory activation for a set time; activation at levels following a function varying in time or other dimension, e.g., a ramp function or sinusoidal function; and so on. Timing and conformance with designated functions may be effectuated by behaviors.

For convenience, a state of contemporaneous multiple activations may be referred to herein as 'global' activation when it is widespread, i.e., applicable beyond a focused group of filters/exemplars and/or concepts involved in a particular process, perhaps for the accomplishment of a particular objective. Global, or partially global, activation may be advantageous, for example, as a form of priming so that multiple concepts are poised to achieve a dominant state of activation and a relatively small additional influence—e.g., the recognition of a concept potentially relevant to such particular process or objective arising from the processing of new data, the activation of a potentially relevant new concept at a relatively high level due to the recognition or activation of patterns of concepts at lower levels, or for other reasons—causes one or a group of the well-poised concepts to outcompete others in that group for attention by virtue of its elevated activation state. The word 'outcompete' is used in this context to mean the achievement of a higher level of activation so that, for example, the concept achieving such higher activation is selected to become a constituent of a pattern linked to a higher-level concept in preference over another concept achieving a relatively lower level of activation that does not becomes such a constituent.

With respect to the illustrated embodiment, any of the various types, states or manifestations of activation among the constituents of an activation pattern may continue in time until extinguished by manager 630 at the direction of objectives manager 610, or the span and/or dynamic characteristics of the activation may be established initially and the diminution or extinction of activation may be subsequently effectuated by behaviors internal to the participating entities. For example, as noted, a 'time-out,' a 'ramp-down,' or another behavior may be set to initiate after a certain period of time, after an event has been detected by the receipt of a message or other means, upon detection of a change of state (e.g., change of attributes) of one or more of the participating concepts, upon the addition of new constituent concepts that supersede or alter the activation pattern, upon the dissipation or change of conditions that gave rise to the activation pattern, and numerous other factors.

Broadly speaking, activation status may reflect or determine both the nature of processing (e.g., following a pattern of concepts in one level to a concept in a higher level, or the reverse direction) and the prioritization of processing (e.g., processing a pattern of activation of one group of concepts prior to processing a pattern of activation of a second group). In some implementations, objectives manager 610 may essentially simultaneously pursue all extant objectives, or any subset, without prioritizing them. In general, however, prioritized objectives may be advantageous to ensure compliance with core objectives 164; optimize the time needed to achieve, or the quality of, results; optimize the use of resources; or for other reasons. The processes constituting the prioritization of objectives and their implementation by manager 610 may be generally described as directing attention. For example, prioritizing and executing the objective 'attend to X' may be considered to invoke processes with the goals of examining, identifying, sensing, locating, characterizing, categorizing, associating, and/or otherwise interacting with X, where X may be any concept or filter/exemplar.

Attention manager 300 further includes in the illustrated embodiment awareness manager 650 and the data bank shown as attention model 652 that is built, maintained, and accessed by manager 650. The word 'awareness,' like related concepts such as 'subjectivity,' 'cognition,' 'consciousness,' and 'sentience,' is used with respect to humans and other animals, both colloquially and in scholarly analyses, in many diverse and complex ways. As used herein with respect to the functions of awareness manager 650, 'awareness' refers to a state internal to TEAI 100 roughly corresponding to states ascribed to humans with respect to subjective awareness.

In particular, awareness as used in this Specification refers to the processes carried out by manager 650 with respect to building, maintaining, and accessing attention model 652, as well as characterizing and reporting its contents and state. Model 652 captures, among other things, states of attention and how, when, and why states of attention transition to other states, including predictions of future states of attention. Such predictions may be contingent and/or include probability estimates. Awareness manager 650 and objectives manager 610 reciprocally communicate to influence the contents and state of model 652 and the functions of manager 610. For example, manager 650 may report to objectives manager 610 that the current state of identified significant patterns, in relation to a state of apprehension characteristic of the current state of model 652 or its predicted response to such significant patterns, requires a re-prioritization of objectives to include those related to self-defense. (Such analysis and reporting may for convenience be referred to in this Specification simply as manager 650 making a 'report.') Objectives manager 610 may employ this report to direct attention to, or to prioritize, selected objectives and/or the analysis of potentially salient processed data. Manager 610 may implement or facilitate this prioritization or selection by instructing pattern identifier 320 to prime concepts or filters/exemplars (to guide top-down processing, influence identification of one significant pattern over another, or other purpose as described above with respect to priming), some or all of which may be identified in the report.

Such awareness as effectuated by TEAI 100 is analogous to that described by the attention schema theory applied to human awareness. However, whereas the attention model of the human brain (the attention schema) is created and maintained by processes not under human control, the attention model of the illustrated implementation is maintained and under the control of awareness manager 650. Also, humans can attend to certain functions such as muscles controlling certain movements, accessing and associating some memories, engaging in conscious thought, and so on, but not other functions controlled or influenced by the autonomic nervous system or dependent on relative strength of patterns of brain activation such as when an elusive memory rises unexpectedly to consciousness. In contrast, in the present implementation every function of TEAI 100 may be accessible by awareness manager 650.

With respect to TEAI 100, attention refers herein to the processes precipitating, resulting from, and underlying selective activation and managing of filters/exemplars and concepts and the execution of other functions of the functional elements of TEAI 100. Thus, non-limiting examples of the exercise of attention include following linking attributes of filters/exemplars or concepts; creating or adjusting attributes, and optionally behaviors of filters/exemplars or concepts; creating objectives, scripts or other concepts based on internal or external stimuli or impetuses; generating canonical forms; converting filters/exemplars or concepts from transitory to persistent or vice versa; designating a pattern to be a significant pattern; and so on. Model 652 constitutes data representing or describing how attention is exercised; e.g., what functions are activated for what purposes under what conditions, as well as the precipitating and resulting functioning of elements of TEAI 100.

Model 652 may encompass either the totality of all such attention-related functions, or a simplified form thereof. That is, model 652 may comprehensively replicate the functioning and implications of attention, or it may be a simplified, or cartoonish, version sufficient for controlling attention. Such less-than-comprehensive version of model 652 may be advantageously used by manager 650 to control attention because the attention system, like many systems, typically need not be represented or described in all facets in order to completely control it. For example, the human brain moves an arm by sending signals that activate muscles in certain patterns and sequences—actions that may require a representation of the relevant muscles, nerves, and bones, but generally do not require a representation or description of the condition of the skin on the arm or the functioning or state of the bone marrow. Manager 650 may maintain such a simplified representation to improve speed of performance, conserve resources, provide a simulation of how a human would behave and experience attention, or for other reasons.

Manager 650 may maintain multiple copies of model 652 advantageously selectable for varying situations, some of which may be complete and some simplified. Similarly, awareness manager 650 may dynamically adjust access to, or the constituents of, model 652 to vary the degree to which it constitutes a comprehensive model of attention. Dynamically reducing the comprehensiveness of model 652 may be advantageous, for example, to speed up processing or reduce resources, clear away details to allow improved awareness of fundamentals, create improved designs for attention-related functions, anticipate how other beings (e.g., humans) with limited modeling capability would experience awareness, or for other reasons.

Thus, broadly speaking, awareness manager 650 builds model 652 to simulate, comprehensively or in a simplified form, the functioning and dynamics of attention manager 300 and other functional elements of TEAI 100, including, for example: how attention arises, e.g., to facilitate accomplishment of objectives; how it is directed, e.g., to recognize from lower-level concepts the higher-level concepts implied by their pattern of activation; how it changes focus, e.g. to expand or narrow possible interpretations of a situation; the consequences flowing from attention, e.g. the activation of concepts; processing of feedback provided by the other functional elements of execution manager 170 with respect to the consequences of directing attention; and so on.

Model 652 may advantageously include scripts linking concepts and/or objectives. For example, model 652 may include a script 'me-1' that links concepts such as 'generous,' 'cautious,' 'patient,' and 'attentive.' In an illustrative example of how self-awareness may be generated in the present embodiment, core objectives 164 may include a 'self-awareness objective' that is activated by objectives manager 610 as a default—that is, it is normally active. If it is de-activated in accordance with another objective, manager 610 activates a monitoring objective that will cause it to be reactivated as conditions of the superseding objective permit. When active, execution of the self-awareness objective causes attribute and behavior manager 630 to establish an activation pattern that invokes and maintains the 'me-1' script in a state of resonance. This resonance establishes an on-going pattern of attentiveness of awareness manager 650 to attention model 652, which constitutes subjective awareness in this exemplary embodiment.

The activated state of concepts within the 'me-1' script—'generous,' 'cautious,' 'patient,' and 'attentive' in the present example—may influence the establishment, prioritization, pursuit, and monitoring of objectives by manager 610. In this manner, such resonating concepts influence system-wide behavior associated with them. In addition to the 'me-1' script, there may be multiple other scripts associated with a parent concept 'me.' For example, the concepts 'tall,' 'strong,' 'healthy,' may constitute a 'me-2' script, and so on. When the 'me-2' script is invoked, different influences may be applied to the generation, prioritization, and maintenance of objectives by manager 610 than applicable with respect to the 'me-1' script. Any script having such an influence on the functions of manager 610 provides, due to its transparent encapsulation, an advantageous point of reference and control for enforcer 350, noted below.

In addition to attention manager 300, execution manager 170 also includes space manager 310, level manager 312, and external model manager 316. The functions of managers 310, 312, and 316 will now be described in relation to the functioning of manager 300 and with reference to the illustrative example of two-dimensional spatially organized data array 200 shown in FIG. 2.

It is assumed that acquisition of array 200 was initiated to accomplish an objective prioritized by objectives manager 610, such as finding or moving toward an object in the environment external to TEAI 100. It is further illustratively assumed that the collection of visual light data from a camera focused on a particular portion of the physical world was determined by objectives manager 610 to be useful to advance this objective. Such a determination may be made in numerous ways, including by a reference to such camera in the attributes of a concept representing such objective. The impetus for seeking to achieve the objective could have originated with an instruction from, or action taken by, a user or other source external to TEAI 100, or internally as a step in a broader objective such as building an external world model or analyzing the environment around the user or around TEAI 100, as non-limiting examples.

It is possible in some implementations and circumstances, or in selected operational phases of some implementations, to attend to all data simultaneously. Array 200 conveys a relatively small amount of information, and thus such simultaneous attention may be appropriate. However, it is now assumed for illustrative purposes that prioritization of attention to the most salient information is desirable with respect to the processing of array 200.

Objectives manager 610 may apply selective attention in such case by initiating a search for the most salient or otherwise highest priority information in array 200, or manager 610 may already have set a priority to find specific information (for example, by causing attribute manager 630 to prime related concepts and/or filters/exemplars for preferential or more efficient response, and/or priming appropriate objectives in a queue of objectives). In this illustration, it will be assumed that manager 610 is pursuing the objective of determining whether a pattern of data can be found to support a tentative conclusion that the camera has detected an object related to the concept 'house' stored in bank 120. This tentative conclusion may arise, for example, because various concepts (e.g., a large rectangular shape having dimensions typical of a house) linked to the concept of 'house' have already been identified, because a course of travel has been followed that is predicted to have a strong likelihood of leading to a house, or for numerous other reasons.

The example of a course of travel is a particular example of the more general high-priority objective of manager 610 to identify chains of events tied together by probabilities of occurrence in identified patterns. Manager 610 may advance this core objective of prediction by creating a script, or alternative, conditioned scripts, encapsulating likely sequences under experienced or predicted conditions.

Thus, in the present example, it may be illustratively assumed that manager 610 had previously prioritized detection and decoding of street signs 'A,' 'B' and 'C.' Each of those signs can be illustratively assumed to have been persisted as a concept in bank 120, and optionally the combination of constituent concepts that gave rise to each sign concept may have been stored in bank 110 to facilitate or validate future recognition of the signs. In order to further the objective of establishing a route, the concepts representing the signs may be assumed to have been linked together (as, for example, by linking their attributes) in a chain by manager 610 to form a script. The script, which itself may be persisted in bank 120 and/or its constituents persisted as concepts and or filters/exemplars in banks 120 and 110, respectively, proscribes that the event of encountering sign 'A' is likely (perhaps within a range of probabilities and assuming certain conditions, such as direction of travel, are met) to be followed by the event of encountering of sign 'C' and that attention should be prioritized with respect to the recognition of sign 'C,' followed similarly by a likelihood that the next sign of interest will be sign 'B,' followed by a likelihood of encountering a house.

Such creation and persisting of scripts generally constitute an important function of various embodiments of the present invention as this function is generalizable to numerous situations and objectives. As noted, prediction is a core objective not just with respect to optimizing the operations of embodiments, such as by priming, but also in providing a user with insights into possible outcomes, their probabilities, the conditions under which they may or may not occur, their implications for the occurrence of future events, and so on. Prediction also generally is important in ensuring that TEAI 100 (and other embodiments) conform to requirements established by enforcer 350. The reason is that conformance typically requires not just immediate accord with rules and objectives, but prediction of the consequences of present decisions and actions so that future compliance is not compromised.

In an analogous manner, manager 610 may illustratively be assumed to have created and persisted a script linking the recognition of a rectangular object of certain dimensions, i.e., the 'house' in this example, with the likelihood of identifying an object corresponding to the concept 'door' and others corresponding to 'window' in certain spatial relations to the rectangular shape. Solely to aid in illustrating and describing these relationships, certain elements of array 200 have been shaded in FIG. 2 to indicate relative darkness of the light from the portions of the visual field related to those elements as contrasted with light from the portions of the visual field related to other elements that are not shaded. For example, if sensed data 150 constituted information from a camera limited to detecting a grey scale from white to black, the data represented by shaded elements corresponds to a grey-scale quantity closer to black than that of non-shaded elements. As previously described, processor 160 has associated the shaded data and non-shaded data spatially, for example based on the identity and spatial relationships of photosensitive diodes in the camera.

In the example of array 200, a script may help establish and prioritize numerous search strategies resulting in various paths to recognizing the object tentatively identified as a house. One example of traversing such a path, referring to the filters/exemplars of FIG. 4, could include the following steps: (1) activate (e.g., by increasing activation-intensity attributes) exemplars 403 and 406 of level 0 resulting in the activation of linked exemplar 413 of level 1 of bank 110 and/or the linked concept 'corner0' of entry 120(1,0)-0; (2) activated exemplar 413 and/or entry 120(1,0)-0, together with activation of the 'part-of' concept of the entry 120(M, 0)-1, results in the increased activation of exemplar 421 in level 2 of bank 110 and/or the concept 'rectangle0' of entry 120(2,0)-0; (3) activation of exemplar 421 or concept 120 (2,0)-0 result in the increased activation of the concept 'house' in bank 120, which is linked by its attributes to other concepts (and/or filters/exemplars) including 'window' and 'door' (such linkage representing or being formed by a script predicting that a house will have a window and a door); (4) activate exemplar 401 to facilitate identification within array 200 of an object that may be a window, and activate exemplar 405 to facilitate identification of an object that may be a door, and (5) determine whether the spatial relationships among the objects identified as a result of the previous steps, or other criteria applicable to the attributes and/or behaviors of 'house,' conform to established ranges of predicted probabilities. In some implementations, the script leading from 'house' to 'window' and 'door' may be transitory rather than persistent. A transitory script may be advantageous in dynamic situations. For example, a transitory script may be amenable to rapid change as its constituent concepts and/or filters/exemplars rise and fall in intensity of activation with respect to other potential constituents that may replace them and alter the script. In other cases in which consistency is desired, transitory scripts may include attributes prohibiting their constituents from being altered irrespective of intensity of activation of their constituents.

For clarity, scripts, whether persistent or transitory, are typically not limited to the objectives of predicting, or facilitating detection of, encounters with or relationships among objects. Rather, scripts in accordance with the present invention typically may be advantageously applied in a wide range of situations for a wide range of purposes. Scripts in accordance with the present invention may be roughly analogous in purpose or effect to what might be called 'thought patterns' recognized as an aspect of human cognition, although, notably, human thought patterns are neither transparent nor encapsulated. Thus, scripts may link objectives to pursue such purposes as abductive reasoning, abstract or conceptual deduction or creation, analogical reasoning, analytical reasoning, conjectural or counterfactual deduction, contemplation, formal logical reasoning or convergent reasoning, backward induction, critical reasoning, and so on. Scripts may be created to mimic human thought patterns (either in individualized, group, or canonical forms) for numerous research or other purposes, such as to predict what a person or group may think or do; provide individual or group feedback to encourage understanding of human thought patterns and biases; enhance real-time understanding of the intention and meaning of incoming communications; provide feedback on how potential outgoing communications may be received and understood by different audiences; and so on.

As a more specific illustration, it may be assumed that a 'danger script' has been created and persisted as a concept having as constituents the objectives-concepts 'arouse suspicion,' 'investigate' and 'sound an alarm' in a particular sequence in which each link may be conditional—based for example on satisfying a level of confidence or probability, or dependent on supporting factors being detected—and/or may branch to other concepts or scripts. The 'danger script' concept may include behaviors and attributes aimed at determining under what conditions and with what degree of confidence something is determined to be suspicious, what kinds of investigation are feasible and appropriate, what type of alarm to sound, and so on. Thus, for example, the relevant attributes and behaviors of the danger script with respect to its suspicious-concept component may be satisfied, and the danger script concept may be set into a higher level of activation, by the detection of the concept 'window' and 'broken' in a close temporal relationship.

Attention is now returned to the example of the search of array 200 for the most salient or otherwise highest priority information. Manager 610 typically will preliminarily establish the appropriate space and levels at which the concepts and related filters/exemplars predicted by the script, or otherwise primed for, are expected to be found, and to direct preferential attention to that space and those levels. Manager 610 typically may also attend to information available from external model manager 316 in order to appropriately align the data of array 200 to orientations and scales that are advantageous in relation to the model of the world in which the search is being conducted.

Accordingly, manager 610 in the present example may provide space manager 310, level manager 312, and external model manager 316 with the data surrounding and bounded by the shaded areas and instruct managers 310, 312, and 316 to operate on the data. It is noted that under the circumstances of this example, it may be unnecessary for manager 610 to instruct manager 310 to operate on the data of array 200 since data 162 was provided by a source selected by manager 610 that is known to be dedicated to detecting visual light properties of objects in the physical three-dimensional space. In such, and other, cases manager 610 may provide the data of array 200 only to level manager 312, and to external model manager 316 to determine, for example, appropriate scale or orientation (including rotation or translation in any dimensional axis) as discussed below.

More generally, however, the source of the data of array 200 and its nature will be assumed to be not immediately or readily determinable such as, for example, with relation to electromagnetic radiation that could have been emitted from various sources close by or at great distances. In other instances, data 162 may include recorded or streamed data 152 that includes text, audio, or other signal sources providing information that has been conceptualized to represent concepts and/or patterns of concepts from various sources and encompassing various levels. Also, as discussed in relation to the method shown in FIG. 8 and as noted above, data 162 may constitute a yet-to-be analyzed higher level of patterns based on lower-level patterns of concepts and/or filters/exemplars detected and/or activated in previous iterations of analysis by manager 170, which would constitute bottom-up processing, or the reverse order could obtain with respect to top-down processing.

In the foregoing and many other cases, there may be the potential that a new or different level may be present, thus requiring referral to manager 312 for analysis and determination of whether to designate a new level. Manager 312 may carry out this analysis in numerous ways, for example by comparing data from array 200 to examples of data of varying levels previously processed from the camera that provided data 162 of this example or from similar sensors. Manager 312 may seek, for example, to determine if there are similarities between data 162 and data underlying patterns of filters/exemplars and/or concepts in a previously identified level of the same space. Similarly, the possibility of a new or different space may justify referral to space manager 310 for analysis based on analogous comparisons to examples of data known to have originated from other spaces.

In those and other cases, objectives manager 610 may determine that employing a different scale or adjusting orientation is appropriate with respect to more advantageously processing the data of array 200. Manager 610 would thus present such data to external model manager 316 to designate appropriate scale and/or orientation. Manager 316 may carry out this function based, for example, on the sources from which processed data 162 was obtained and by applying a model of the appropriate space developed by manager 316. The model may be used, for example, to adjust the data of array 200 to bring it into alignment with standard scales and/or orientations adopted by the models. For example, scale may be varied depending on various factors such as the distance from the sensors that collected the data to the portion of the visual field of interest. Orientation aspects of the data may be varied depending, for example, on the observed relationship of objects that can be assumed to be horizontally or vertically situated at known angles with respect to a reference, such as the ground, and so on. If, as one example, manager 316 determines that the visual field of interest is close to the sensors but tipped at an angle of 45 degrees from a nominal angle at which it usually appears in relation to nominal orientations in the relevant space—in this example, the physical world—or to other objects associated with it in surrounding areas of the visual field, manager 316 may alter data 162 so that it conforms to a normalized distance and angle.

Thus, managers 310, 312, and 316 may identify a likely type of space, level, and/or scale or orientation to be associated with data 162 throughout all iterations of the operation of manager 170. Measures or ranges of probability or reliability for alternative spaces, levels, scales and orientations may be provided by managers 310, 312, and 316 in each such iteration.

Attention is now turned to pattern identifier 320 that, incorporating and considering information provided by managers 310, 312, and 316, determines whether significant patterns are present in data 162 and, if so, creates concepts and/or filters/exemplars therefrom. As previously emphasized, the number of significant patterns associated with filters or exemplars in bank 110 is generally far less than the number of possible patterns in data 162. For example, the number of possible patterns in even a small array of only 10×10 elements, such as array 200 of this illustrative example, is astronomical. Even assuming for simplicity that each array element can only have one of two values, dark or light, the number of possible patterns is 2 to the $100^{th}$ power, a number with 32 decimal digits. If greyscale values are represented not by two but by a range of values from 0 to 255, as is common in many image processing applications, the number of possible patterns is 256 to the $100^{th}$ power. In many implementations, it will not be desirable to make assumptions about the type of patterns that may be present in data 162 in order to reduce complexity or conserve resources; rather, as noted, a process of unsupervised learning is preferred.

Identifier 320 may employ various conventional techniques to reduce the number of patterns relevant to processing. As noted, values may be bucketed by, for example, assigning any greyscale value between 0 and 127 to the value 0 and those between 128 and 256 to the value 1, or any of numerous other known schemes for reducing complexity albeit generally at the expense of resolution. Another technique is to scan array 200 in windows of smaller size; for example, reduce the possibilities in a binary scenario to 2 to the $16^{th}$ power by examining the data elements separately in windows of 4 horizontal elements by 4 vertical elements, such windows overlapping or not with previously considered windows. However, such reduction using windows limits the ability to detect patterns extending over multiple windows, generally requiring consideration of large numbers of possible combinations.

As noted above, to avoid the foregoing and other practical difficulties, identifier 320 in preferred embodiments identifies significant patterns in processed data 162. Pattern identifier 320 of FIG. 3 determines whether a pattern is a 'significant pattern' by various 'pattern indicia' including, as non-limiting examples, whether it is one that: (a) is expressed by a spatial, temporal, or other association among pattern constituents, which notably may include a relationship among their activation levels such as a distinguishingly high levels of activation, distinguishingly low levels of activation, or similar pattern of change of levels of activation such as changing at similar frequencies or exhibiting similar or related wave forms; (b) is distinguishable due to such factors as repetition or frequency of occurrence of constituents in like data sets (e.g., from the same type of level and space); (c) occurs in spatial, temporal, or other relation to another significant pattern at any level; (d) occurs in spatial, temporal, or other relation to a significant event or circumstance, external or internal, including those related to a script that is predictive of the course of events; (e) comprises elemental data or other processed data exhibiting unusual, distinguishable, or notable characteristics, e.g., comprises a camera's pixel data in a group sharing similar coloring or texture that is ordered, as in a line or edge, and that substantially differs from the data generated by adjacent pixels; (f) exhibits a degree of order not characteristic of random information in the relevant level and space, e.g., a pattern is noted to have substantially retained identities of and relationships among constituent parts even though it has moved in relation to one or more dimensions of the applicable space; (g) is applicable in analogous manner to concepts in the same or differing levels and/or spaces, e.g., transitory concepts x, y and z in level 0 share a pattern of occurrence with persistent concepts t, u and v in level 1; or (h) does not have any of the above characteristics but is empirically found to produce desirable, provocative, unexpected, or otherwise interesting results of statistical significance. In addition, it is contemplated that experience with the operation of TEAI 100, particularly but not necessarily limited to spaces other than physical space, may reveal other relationships, associations, conditions, and so on that, if designated as being among the indicia for identifying a significant pattern, result in useful or insightful results. The understanding of a 'significant pattern' may thus be adjusted to add such new definitions or applications, and to remove older criteria that are no longer deemed useful, or insightful, etc. Any known or future search, matching, ranking, or other algorithm or technique, such as those developed for making multi-criteria decisions, may be employed by pattern identifier 320 to facilitate application of these indicia, advantageously not including ones that are not transparent such as those relying on neural networks.

In some embodiments or implementations, it may be desirable to restrict the indicia of a significant pattern used by pattern identifier 320, or by other functional elements performing this function in other embodiments. For example, in an alternative implementation, identifier 320 may only identify a significant pattern based on repetition or frequency of occurrence of constituents in like data sets. Such restriction may be advantageous in focusing on specific circumstances or assumptions; preserving resources in demanding applications (for example, in a small device in accordance with the present invention that is mobile, transplantable, or wearable); providing a basis of comparison of how the present invention processes data using alternative indicia for identifying significant patterns; simulating human cognition for research in cognitive science or psychology; tailoring operations to particular kinds of external data; providing enhanced transparency; or pursuing other goals. The term 'restricted pattern identifier' may be used in this Specification to mean a pattern identifier upon which such a restriction has been imposed.

With respect to the present implementation, the importance of activation-intensity attributes is emphasized with respect to identifying significant patterns and selecting one combination of constituents over another, as noted in pattern indicium (a) above. For example, if the activation-intensity attributes of the concepts 'rectangle,' 'triangle,' and 'door' are high, then concepts including them as constituents may be principal candidates for identification as representing the significant pattern of those activations. However, both the 'house' and 'barn' concepts may have comparable linking attributes to or from the 'rectangle,' 'triangle,' and 'door' concepts. If, however, a 'chimney' concept also exhibits a high activation-intensity attribute in significant relation (e.g., temporal and spatial) to the other three, then the total activation of constituents linked to 'house' may be greater than the total activation of constituents linked to 'barn' and the former may be said to 'outcompete' the latter as most probable representative of the significant pattern.

As noted in pattern indicium (g) above with respect to identification criteria, significant patterns may be applicable to numerous combinations of concepts in levels and/or spaces potentially different from that in which they were first recognized. For example, a pattern representing the relationship of low-level concepts related to 'corner' and 'side' in a certain spatial relationship may apply initially only to the higher-level concept related to 'square' but subsequently recognized in accordance with the present invention to be applicable to the relationship of other, perhaps higher-level, concepts in the same space or another space. For clarity, it is emphasized that the dimensions on which the common pattern is constructed need not be spatial or temporal as in the physical world in which a square exists as a contemporaneous activation of lines or other constituent parts, e.g., corners, in particular alignment within horizontal and vertical dimensions. Rather, the same pattern applicable to a square may be applicable in non-spatial dimensions, such as may exist among concepts related to 'earth,' 'air,' 'fire,' and 'water'; or among 'prudence,' 'justice,' 'temperance,' and 'fortitude,' or among 'unconscious incompetence,' 'conscious incompetence,' 'conscious competence,' and 'unconscious competence' in appropriate spaces.

In some cases, a significant pattern may consist of only one constituent. As one non-limiting example, a first significant pattern including concepts 'A' and 'B' and a second significant pattern including concepts 'C' and 'D' may be highly activated concurrently with concept 'E' and it may be expedient for pattern identifier 320 to designate concept E as a significant pattern rather than include it as a member of the first or second significant patterns or to create a new significant pattern including concepts 'A, 'B, 'C,' 'D,' and 'E.' Such expediency may be based on a determination that the first and/or second significant patterns are common constituents in more complex patterns, that they occur independently in salient situations, or other reasons supporting their retention without adding concept 'E.'

Advantageously, significant patterns need not be designated through a process of supervised learning but may generally rely on experience operating on data 162 in the course of iterative processing of patterns, then patterns of patterns, and so on. More generally, all adaptive or learning functions of TEAI 100 (generally not including the specification of core objectives 164) are preferably accomplished using unsupervised learning to ensure that the identification of filters/exemplars and concepts are not limited to or influenced unduly by human cognitive processing. An objective of TEAI 100 in typical implementations is to provide insights and predictions, including associations among concepts and/or filters/exemplars, not apparent to humans or as applied to spaces or levels not accessible to or imaginable by humans. Thus, due to transparent encapsulation, in some implementations the constituents of an examined concept or filter/exemplar at any level 'q' in any space may be identifiable by human users of TEAI 100 and the attributes (including linking attributes) and optionally behaviors of all its constituents and constituents of constituents from level q-1 down to level 0 may be examined and understood, whereas the 'meaning' of the examined concept or filter/exemplar may not be understandable to humans. In such cases, the human users may alter core objectives 164 to delete, flag, trace, segregate, or otherwise take special protective action with respect to such examined concept or filter/exemplar. Alternatively, the identification of unexpected concepts or filters/exemplars may be considered a valuable occurrence justifying special attention but not intervention pending further examination.

As noted, execution manager 170 also includes persistence manager 340. The functional elements of manager 340, shown in FIG. 7, include a persistent entries manager 710 that modifies, validates, merges, and prunes persistent filters/exemplars and concepts; a transitory state manager 720 that modifies, validates, merges, and prunes transitory filters/exemplars and concepts; a canonical form manager 725 that identifies, creates and modifies canonical forms of related concepts or filters/exemplars, and a transition coordinator 730 for determining if persistent entries should become transitory and vice versa and whether they should be merged into or linked with canonical forms. Managers 710, 720, and 725 of the present embodiment typically rely on identification of significant patterns by pattern identifier 320 and typically do not operate on patterns that are not so identified. Generally, managers 710, 720, and 725 balance availability of resources against desired speed or other aspects of operation when determining whether a filter/exemplar or concept should be generated—or, if already existing, should be modified or eliminated; whether it should be persistent or transitory; or whether it need not be preserved but may be used to create or modify a canonical form. Another overarching consideration is to ensure capture of significant patterns into transparently encapsulated filters/exemplars and concepts so that the behavior of TEAI 100 may efficiently and reliably be monitored.

The validation function of persistence manager 340 is optionally employed in some implementations to validate conformity with: rules established by enforcer 350 imposing limits on indirectness or circularity of linkages; limits or conditions on linkages in order to contain combinatorial explosion; regulation of activation-intensity attributes to ensure sufficiently broad range of possible outcomes; or objectives intended to ensure efficiency, reliability, or transparent encapsulation. In other implementations, enforcer 350 or other functional elements may perform these functions.

Persistence manager 340 may advantageously identify and create canonical forms of common or significant concepts or filters/exemplars. One example was provided above with respect to a canonical form of a face, or partial face, as represented by filter/exemplar 409. More generally, there may be substantial advantage in analyzing a group of concepts or filters/exemplars that are variations of each other (e.g., variations of human faces; variations of shapes such as triangles; variations of the intensity of emotions constituting joy, fear, or hope; and so on) to produce a canonical form, which may be accomplished by averaging features or by any other known or future technique for identifying and representing common features or aspects of a representative group of concepts or filters/exemplars. Thus, for example, instead of (or in addition to) providing numerous filters/exemplars specifying differing spatial relationships among eyes, nose, chin and other facial features in observed significant patterns generated by detection of human faces, manager 340 may create a group of canonical concepts and/or filters/exemplars against which the arrangement of new constituents of significant patterns can be compared. Linking attributes to or from canonical forms of concepts or filters/exemplars may include information about the degree and/or kind of deviation between the canonical form and the concept or filter/exemplar that is linked to it. Canonical forms generally have the properties and characteristics of other concepts or filters/exemplars. They may represent a significant pattern as a whole, or they may constituents associated with a significant pattern. They may have attributes and behaviors as described with respect to other concepts and filters/exemplars. A canonical concept or filter/exemplar may be made up of constituents that comprise any combination of canonical and other concepts or filters/exemplars, each of which may in turn be made up of any such combination, and so on.

Use of canonical forms may provide many advantages, notably in reducing the number of concepts and/or filters/exemplars that are preserved and thus assisting in controlling combinatorial explosion. Other potential advantages include, as non-limiting examples, faster searching, more efficient coding, easier or more sensitive representation and/or detection of deviations of constituents of significant patterns to corresponding constituents of canonical forms, easier generation of measures of overall conformance of a collection of processed data to an existing significant pattern as preserved by a concept or filter/exemplar, more efficient enforcement by enforcer 350, and easier interpretability when presenting information to humans.

As also noted, execution manager 170 further includes enforcer 350. In typical implementations, enforcer 350 will have prioritized and guaranteed access to communications coordinator 380 to ensure that operations of TEAI 100 are visible to and controllable by enforcer 350.

A primary role of enforcer 350 is to ensure that all operations of TEAI 100, notably including the pursuit of objectives by objectives manager 610, conform to core objectives 164. Typically, such function includes ensuring that attributes (and behaviors if implemented) of concepts (notably including scripts) and filters/exemplars may only be preserved and used to further objectives that are consistent with, or otherwise circumscribed by, core objectives 164. For convenience, such monitoring and enforcement function may be referred to in this specification as being to 'ensure individual and collective consistency' with core objectives 164.

In the illustrated embodiment, core objectives 164 are established solely by authorized users external to TEAI 100. In some implementations, core objectives 164 may be embodied in forms of symbolic AI, typically not including neural networks. Use of symbolic AI in this context is consistent with that technique's principal advantages while avoiding many of the limitations associated with its use in more general contexts. As noted, the advantages of symbolic AI include that it is transparent and allows for reliable alignment with the goals set by human users. Moreover, its principal disadvantages have limited relevance with respect to specifying core objectives 164. With specific reference to those disadvantages as enumerated in the Background section, (1) the nature and extent of expert input are relatively constrained within subject areas and points of view that have been substantially discussed and debated across many cultures and political systems; (2) the environment of acceptable use generally is not highly dynamic but rather may have coalesced around agreed principles if not specific attributes; (3) while human judgment and knowledge are inherently limited and diverse in nature and extent, the goal of enforcer 350 is to rely upon the best of such human judgement and knowledge as conscientiously and deliberately developed, perhaps facilitated or enhanced by the judicious use of TEAI 100 in some implementations; (4) due to the focused and limited scope of interest embodied by core objectives 164, there is enhanced opportunity to reduce erroneous, arbitrary, or otherwise unreliable information; (5) also due to such focused and limited scope, there is not a need for multiple investments in the creation and maintenance of diverse systems, and (6) further due to such focused and limited scope, scalability to other domains is not a central concern.

Figure 6:
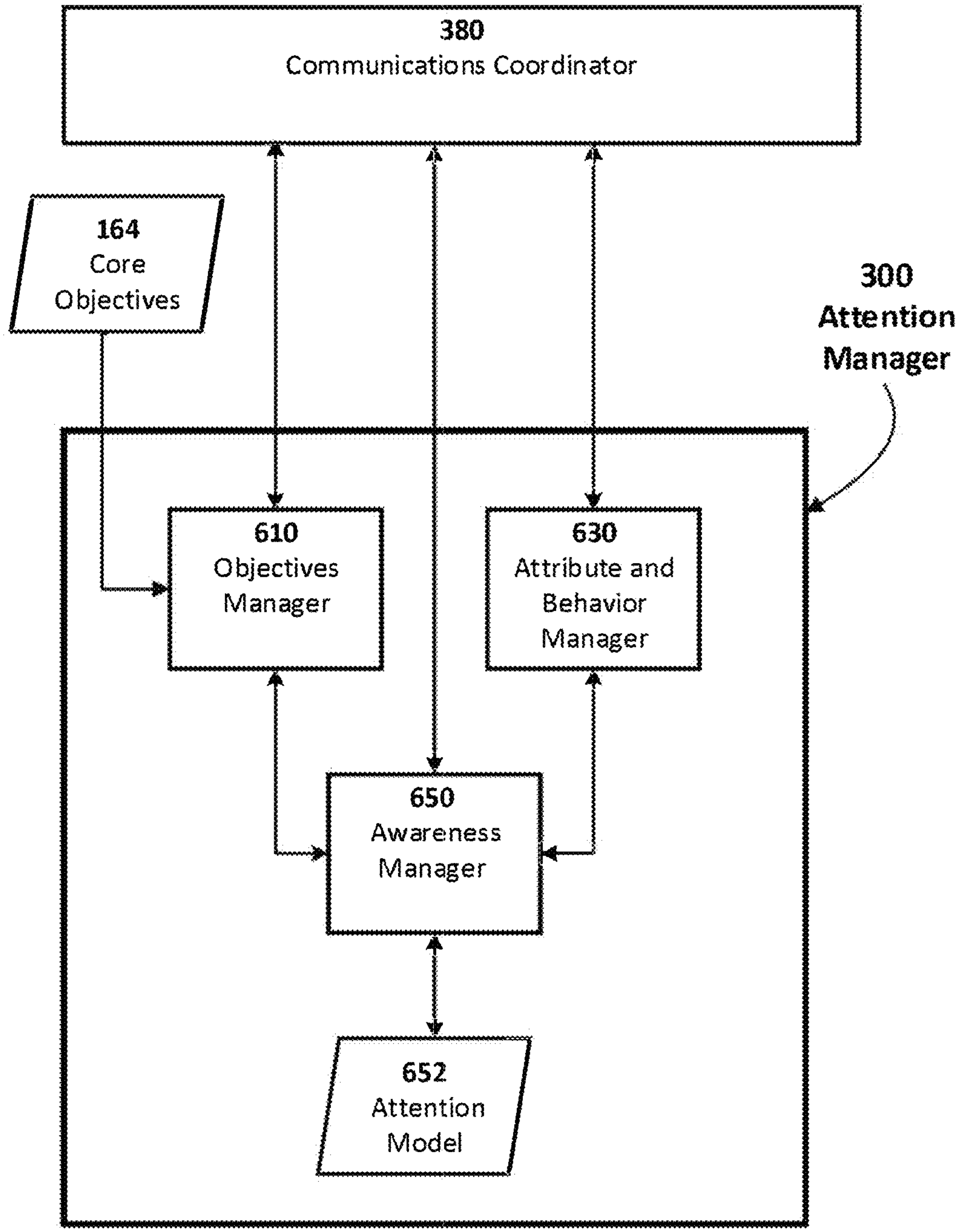
FIG. 6 is a functional block diagram of the attention manager of FIG. 3, including an objectives manager, an attribute and behavior manager, and an awareness manager.
Figure 7:
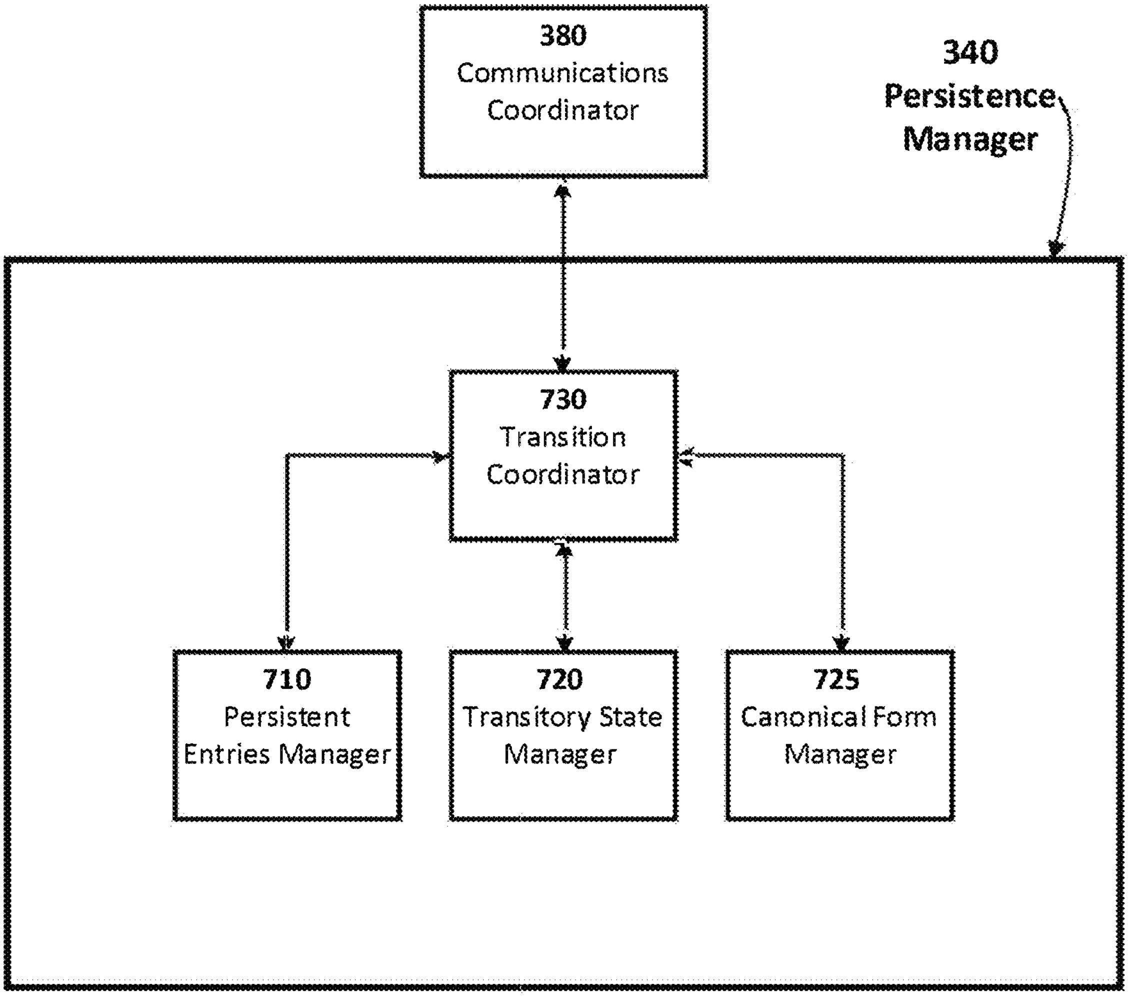
FIG. 7 is a functional block diagram of the persistence manager of FIG. 3, including a persistent entries manager, a transitory state manager, a canonical form manager, and a transition coordinator.

Any known or future technique, for example, block-chain technology, may be applied to ensure that any user data 154 or other processed data 162 intended to constitute or change objectives 164 is controlled and protected from interference from unauthorized users, and/or that any interference is reported or readily discernable. As shown in FIGS. 1 and 6 and indicated by single-directional control-flow and data-flow arrows, core objectives 164 in this implementation are made available to objectives manager 610 but may not be controlled or altered by manager 610 or by any other functional element of TEAI 100. The motivation for isolating and protecting the integrity of core objectives 164, whether in the manner described in this implementation or in accordance with other known or future techniques, is to ensure compliance with fundamental rules or behaviors. In the illustrated implementation, enforcer 350 may employ any known or future technique to monitor objectives manager 610 and block processing of any objective determined to be contrary or injurious to any of core objectives 164. In some implementations, enforcer 350 may access predictive scripts generated by manager 610, or instruct manager 610 to construct a script, to predict whether processing of an objective may be contrary or injurious to any of core objectives 164. In such implementations, however, enforcer 350 may advantageously flag such use or intended use of prediction so that it is reviewable by an authorized user in a timely manner. Approval by the authorized user may be a condition of such use.

As noted, another functional element of execution manager 170 is communications coordinator 380. In the illustrated embodiment, coordinator 380 manages communication to, from, and among all functional elements of TEAI 100 and banks 110, 120, and 125. Advantages of such centralized communication include the ability to prioritize instructions and other messages, provide temporal coordination to the conduct of activities, allow for efficient use of conventional parallel and distributed processing techniques, enhance controllability, and generally ensure that operations of TEAI 100 are visible to and accessible by enforcer 350. Coordinator 380 may be implemented using any known or future technology or technique including as non-limiting examples non-neural-network techniques used in telephony and other communications networks or in communication in multi-agent systems.

In this and other implementations, coordinator 380 may also generally give priority to communications with objectives manager 610. The reason is that, in the pursuit of objectives it has prioritized, manager 610 typically initiates actions to be carried out by other functional elements of TEAI 100. Thus, in coordination with other elements of attention manager 300, objectives manager 610 generally carries out a role that may be characterized as that of directing attention and execution. Prioritized access by manager 610 to coordinator 380 generally supports this principal functional role in accordance with the present embodiment.

TEAI 100 includes—in addition to data collector and processor 160 and execution manager 170 described above—brain-computer interface 175 and output manager 180. In accordance with any known or future technology, BCI 175 provides information to processor 160 from human or non-human brains, or other neural system or analogous system organs or components, and optionally receives operational instructions from manager 170. In some implementations, such analogous systems may include artificial intelligence systems. For convenience, all such data provided by BCI 175 to processor 160 may be referred to simply as 'brain data.' In other embodiments, BCI 175 may be external to the present invention or omitted.

In accordance with any known or future technology, output manager 180 prepares information for transmission to external entities or output devices 190. Generally, and as non-limiting examples, manager 180 may compose or act upon information generated by TEAI 100 for such purposes as supporting varying standards, languages, formats, and other aspects of content design; directing content to appropriate distribution channels and/or storage media; and ensuring conformance with workflows of the external entities or devices. The information provided by manager 180 may support or take any form including, as non-limiting examples, textual, audio, video, holographic, or any form of electromagnetic radiation signal or other known communication or signaling means or method, or future ones including quantum teleportation or messaging. Output devices 190 may include humans; artificial intelligence systems; computer systems; artificial, virtual, mixed, or augmented reality systems; or any other entity, device, or system capable of sensing or receiving information.

Figure 8:
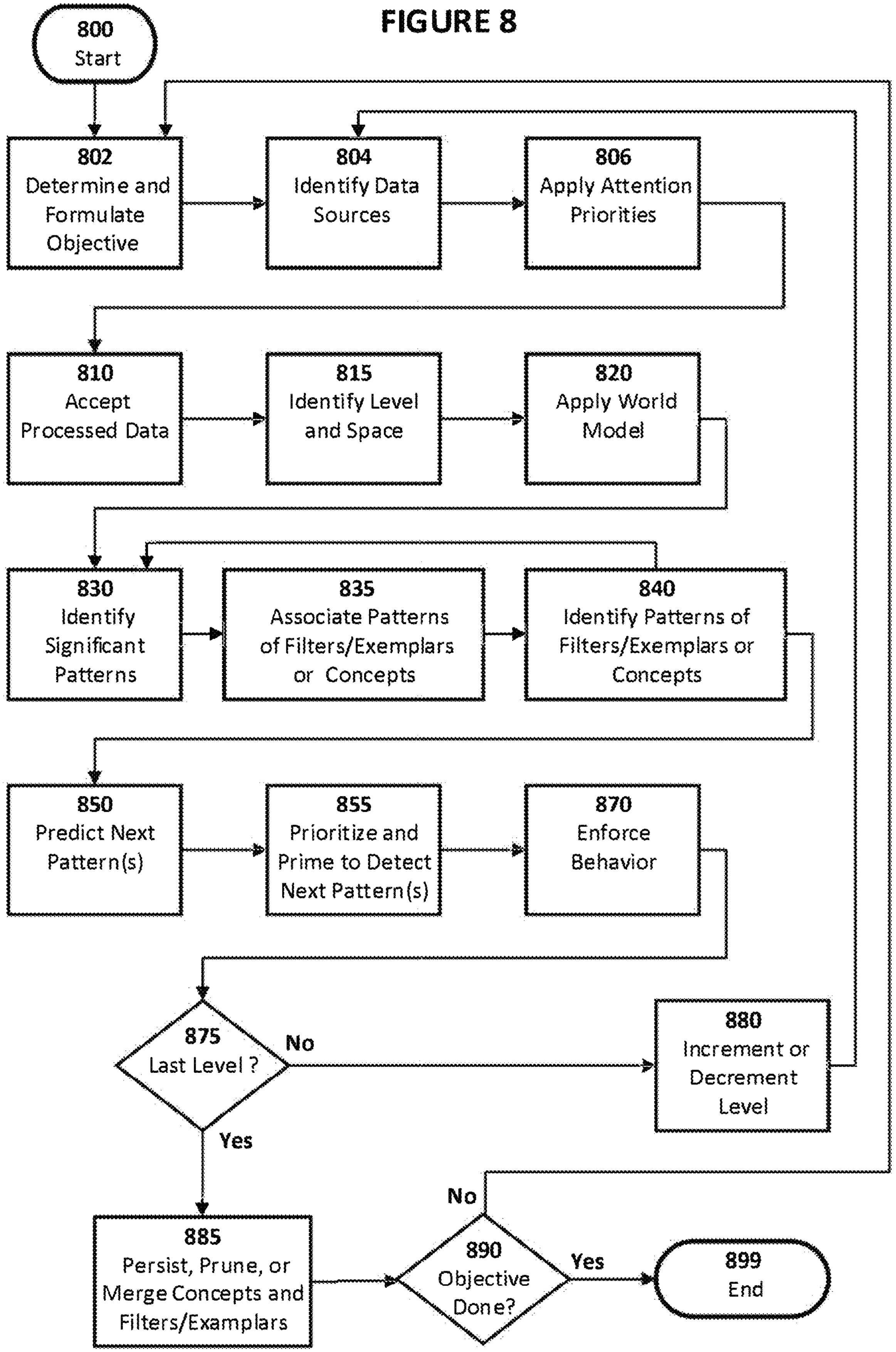
FIG. 8 is a flow diagram of an illustrative method implemented by functional elements of the execution manager shown in FIG. 3.

Having now described all functional and data elements of TEAI 100, a further illustrative, non-limiting example of its operation in accordance with one implementation is provided with reference to the method flowchart of FIG. 8.

For illustrative purposes, it will be assumed that the method of FIG. 8 pertains to physical space, having the index '0,' and further reference to the space dimension therefore need not be repeated. It will be understood without requiring further note that the described steps and operations may generally be carried out under the direction of objectives manager 610 and that the flow of data and control, also under the direction of manager 610, may be coordinated and effectuated by coordinator 380. Thus, for example, if it is stated that identifier 320 carries out a function, it will be understood that the function may be implemented by manager 610 initiating a command that may be communicated to identifier 320 via coordinator 380. Rather than restate all capabilities and operations of the functional elements of TEAI 100, typical or illustrative capabilities or operations will be mentioned with the understanding that they are non-limiting, and that the method is simplified for clarity. It further will be understood that any of a variety of known or future techniques, using multiple processors for example, or techniques to be developed in the future, may be used to execute multiple instances of the operations of any method partially or fully simultaneously so that, for example, multiple data input sets may be analyzed in parallel, and/or multiple steps of one instance may be executed partially or fully simultaneously. Similarly, although multiple objectives may be carried out and coordinated in parallel and/or in a distributed manner in accordance with known or future computer science techniques, the method of FIG. 8 will be described with respect to the processing of a single objective for clarity of illustration only.

Subsequent to the start of the illustrated method (step 800), objectives manager 610 determines the objectives to be pursued and formulates the content and sequencing of sub-objectives required to achieve the objectives (step 802). Typically, initial sub-objectives include identifying one or more appropriate sources of data useful or required for achieving the objectives (step 804), directing attention to the aspects or portions of such sources most advantageously accessed (step 806), and accessing, processing, and accepting such data (step 810). Further, and specifically as applied to the illustrated embodiment, initial sub-objectives may include appropriately conditioning such data, e.g. data 162, before seeking to identify significant patterns represented by or associated with entries in banks 110, 120, or 125. At least two aspects of conditioning are contemplated in this implementation: determining the appropriate level and space for analysis (step 815) and adjusting for appropriate world context (step 820). Step 820 may be implemented as a relative operation, meaning the data can be adjusted to correspond to the world context and then compared to data in banks 110, 120, or 125, as is assumed for illustrative purposes herein, or the data in the banks can be adjusted.

Additional steps will now be described in general terms starting from the assumption that data 162 initially constitutes external input data from an external source, although it will be understood that because of the recursive processing contemplated and described herein, data 162 will also constitute data (e.g., activation-intensity levels of concepts and filters/exemplars) internal to TEAI 100. In step 830, pattern identifier 320 identifies significant patterns from the external input data.

In step 835 identifier 320 determines if there are filters/exemplars and/or concepts in the appropriate level and space that have attributes corresponding to the factors by which the pattern was deemed to be significant. If there are, step 835 further may include the adjustment by persistence manager 340 of activation-intensity attributes in such filters/exemplars or concepts to represent appropriate intensities of activation. If there are not, then pattern identifier 320 determines whether to persist the significant patterns by creating persistent filter/exemplars or persistent concepts (either to represent constituents of the significant pattern or the significant pattern itself) with activation-intensity attributes set to indicate that the significant pattern is in a state of activation; or by causing the constituent filters/exemplars or concepts to enter a state of resonance, or other transitory state, thereby creating and maintaining a pattern of activation representing the significant pattern.

Pattern identifier 320 may also take no action with respect to the significant pattern—for example, if it is determined to be sufficiently duplicative with respect to another pattern that its storage or activation does not justify the use of resources and that recursive activation of the filters/exemplars and/or concepts associated with it in higher levels is not relevant to the current objective, or for other reasons. However, such a decision to effectively ignore the significant pattern will be assumed in this illustrative example to be made at the threshold stage such that the significant pattern is not identified ab initio. Another course short of representing the significant pattern would be, in some implementations, to include it in the formation or alteration of a canonical form, perhaps with less influence than would be the case if it were represented.

Identifier 320 may also create and maintain a pattern of activation with respect to a significant pattern for which it has already identified or created a persistent filter/exemplar or concept. Such duplication of representation, both persistent and transitory, may be undertaken for any of numerous reasons such as creating or maintaining a wider or perhaps global state of activation, anticipating next computational steps based on a script that identifier 320 is processing, achieving greater efficiency of computation, anticipating a need to prune the persisted filter/exemplar or concept, or for other reasons.

In step 840, pattern identifier 320 determines if any changes to activation-intensity attributes in the preceding step has resulted in the creation of additional significant patterns within the current level (because concurrent activation is one of the indicia by which significance may be determined), and this loop may be repeated by returning to step 830 until identifier 320 identifies no additional significant patterns.

In step 850, objectives manager 610 predicts which, if any, significant patterns may soon be encountered, or could advantageously be activated, by referencing any scripts linked to by attributes of the filters/exemplars or concepts that currently are involved in a pattern of activation, or by considering those highly activated filters/exemplars or concepts as being possible constituents of another filter/exemplar or concept that may be confirmed to be present by an associated significant pattern in data 162. In step 855, at the direction of manager 610, attribute and behavior manager 630 sets predicted-activation-intensity attributes of the filters/exemplars or concepts involved in the predicted significant patterns, or otherwise primes constituents of the predicted significant patterns. In some implementations, the operations of step 850 may also take place prior to step 830 if, for example, a currently pursued objective has attributes linking to a script that anticipates or favors the identification of specific significant patterns. The constituents of those anticipated significant patterns may then be primed by increasing their predicted-activation-intensity attributes so that they are more likely to be associated with the processed data 162 being analyzed.

In step 870, enforcer 350 employs any of numerous techniques to ensure that the operation of TEAI 100 conforms to core objectives 164. For example, enforcer 350 may review selected or all changes in activation-intensity attributes of filters/exemplars and concepts, or other critical attributes such as links to scripts, as well as additions or deletions of any concepts, including scripts and objectives. In some implementations, all such changes are reported to enforcer 350 by the functional element causing the change as they occur. More generally, it will be understood that the activities of enforcer 870 may advantageously be of a periodic or continuous nature throughout the course of all functioning of TEAI 100 rather than a discrete step as described for convenience in this illustrative method.

In step 875, if processing has not already proceeded through all the relevant levels, the 'no' branch is taken so that, in step 880, processing may be directed by objectives manager 610 to a higher level (in the case of bottom-up processing) or to a lower level (in the case of top-down processing) and steps 804 to 870 repeated. Such further processing may involve accessing and accepting additional external input data from external sources in addition to processing at higher or lower levels based on the internal changes to activation patterns in the just-processed level. Known or future techniques for parallel or distributed processing may be employed to optimize such multiple processing by using, for example, one set of processing resources to operate on new external input data from external sources while another set is processing changes to be made at a higher or lower level based on changes taken at the just-completed level.

Generally, at each level, the linking attributes of concepts or filters/exemplars associated with the identification of a pattern will allow identification of other concepts or filters/exemplars in the current or other levels that are possible constituents of associated significant patterns. Those associated significant patterns may be anticipated to occur in the same level or in higher (bottom-up processing) or lower (top-down processing) levels. In any case, the activation-intensity attributes of the possible constituents of the associated significant patterns may be increased to make their identification more likely. Thus, priming may also occur in the course of bottom-up processing as well as top-down processing.

Continuing with the remainder of the method of FIG. 8: if, at step 875, objectives manager 610 determines that processing has proceeded through all levels relevant to accomplishing the current objective or subobjective, the 'yes' path is followed. At step 885, persistence manager may prune or merge filters/exemplars or concepts; move them into, from, or among banks 110, 120, or 125 or any hierarchical levels thereof; or move them between states of transitory activation and persistence.

At step 890, decision manager 610 determines if the current objective has been met. If not, the 'no' path is taken and the above-described process may be repeated beginning with a possible reassessment or reformulation of the objective at step 802. If at step 890 decision manager 610 determines that the current objective has been met, or should no longer be pursued, the 'yes' path may be taken and the illustrative method of FIG. 8 may be terminated, typically to be followed by the formulation of a next objective by manager 610 and repetition of the method of FIG. 8. Optionally, manager 610 may cause data pertinent to the accomplishment of the objective to be directed to output manager 180 for presentation to output devices 190.

The steps in accordance with the foregoing method of FIG. 8 will now be described more specifically in relation to the now familiar example shown in FIG. 2. Included in FIG. 2 is an illustrative two-dimensional, spatially organized array 200 such as may be derived from a camera gathering visual light information from the physical world. It is illustratively assumed that in step 802, objectives manager 610 has determined that the currently pursued objective should be that of identifying a house. To determine if a house is detectable from the visual light data (step 804), objectives manager 610 may communicate to processor 160 that attention is to be directed to features captured by the camera that may be related to the concept 'house.' Thus, top-down activation starting with the concept 'house' may result in the priming of constituent concepts linked by attributes to it such as 'door,' roof,' and so on. Priming may progress to as low a level as objectives manager 610 determines is desirable based, for example, on a trade-off between greater selectivity or sensitivity. Another advantage of priming is to direct attention to constituents of a target pattern that distinguish it from other patterns that are similar, or vice versa. For example, the alternative higher-level concept 'barn' may be noted by manager 610 to be associated with 'house' because of links between the 'house' and 'barn' concepts and/or their constituents, or because of a preponderance of shared constituents. In such a case, attention may be directed (step 806) to detecting features capable of distinguishing 'house' from 'barn.' For example, concepts or combinations of concepts more likely to be associated with 'house' than 'barn'—such as 'multiple windows,' 'small door,' 'chimney,' and so on—may be primed, or the scale or orientation of the camera's image data may be adjusted, to optimize the probability of accurate detection and categorization. Also, manager 610 may direct processor 160 to collect additional data at selected spatial locations from a type of sensor 150 capable of thermal or other detection not provided by the camera—for example, to detect heat from a chimney.

Upon accepting such processed data from processor 160 (step 810), manager 610 may direct space level manager 310 and level manager 312 to determine or confirm space and level information, respectively (step 815). In this example, as noted, the appropriate space may already be known because manager 610 had instructed processor 160 to collect data from a camera configured to provide visual light data. In other instances, manager 310 and/or manager 312 may examine data 162 to determine whether it is visual data from an external physical source based, for example, on the type or format of the data, value ranges, pattern distributions in comparison to exemplars in bank 110, or other factors. In this example, the initial level based on data 162 will be taken to be the lowest, illustratively designated as 0, and the space to be physical three-dimensional space, which is illustratively designated as 0. In other stages of processing following step 880 discussed below with respect to bottom-up or top-down processing, the level may be greater or lesser, respectively, than during the previous stage of processing.

Step 820 comprises assessment of world, orientation, and scale in a manner such as noted above with respect to the operations of manager 316. The word 'world' is used in this context generally to mean a model of the space from which data is being analyzed or processed by TEAI 100. From current and prior experience in the relevant space, and/or from comparison to analogous spaces, manager 316 builds a set of reference expectations that are adjusted by experience and stores those expectations as concepts and/or filters/exemplars constituting a 'world model' in bank 120. For example, with respect to the physical world, manager 316 may have stored concepts consisting of elements of phenomena in the observed, deduced, or predicted physical world such as: horizontal, vertical, and depth dimensions and their relationships; the physics of perspective; the physics of sound and light waves in various mediums; the physics of mass and motion; the characteristics of social interactions among humans and other agents; characteristics of human cognitive processing and behavior; and so on.

In this example, it will be assumed that manager 316 determines that the data of array 200 should be processed in relation to world orientation reference 220, shown in FIG. 2 in vertical and horizontal alignment with the elements of array 200 and which may be stored for example as a special filter/exemplar in element 112 of bank 110. Such determination may be made by various techniques such as conformance of shaded elements 200-82, 200-83, 200-84, 200-85, 200-86, 200-87, and 200-88 with the normalized horizontal orientation of reference 220 provided by manager 316. As one non-limiting example, such conformance may be iteratively determined or adjusted after a level has been reached in processing, as described below, such that persistence manager 340 has determined that the relevant data relates to the concept of 'house' and that such concept has in the past been associated with orientation reference 220, or that there is an attribute of the concept 'house' associated with reference 220. Appropriate scale may also be determined by manager 316 in numerous ways, including: conformance with scale as used in operations closely connected in time or space, conformance in alternative scales with significant patterns, sequential testing of scales to find existing or new significant patterns, or adjusting of scale to allow faster or more comprehensive analysis by reducing or expanding, respectively, the number of possible or significant patterns. If manager 316 determined that scale should be adjusted by reducing, it could do so in accordance with any of numerous known or future techniques, such as averaging values in regions, e.g., averaging the values of elements 200-00, 200-01, 200-10, and 200-11 and creating a new visual field having this averaged value as a single data element. Similarly, numerous schemes are known for expanding the resolution based on predictions of intermediate values, so as, for example, to interpolate a value to dispose between data elements 200-00 and 200-01 considering numerous factors such as information in those two data elements and in other regions of the field of view, experience with similar images or the same image at an earlier time, and many other factors determined in accordance with known or future techniques.

In step 830, objectives manager 610 instructs identifier 320 to apply exemplars stored in bank element 110(0,0) to determine which of them are present in array 200 in significant patterns that, if identified, may lead through their linking attributes to a higher-level significant pattern of which they are constituents, and this bottom-up process continued until it is determined whether a 'house' concept has been identified. As noted, manager 610 could initiate this bottom-up process at a higher level than level 0, such as by selecting levels 1 or 2 in step 815 for the start of processing and thus applying exemplars stored in bank element 110(1, 0) or 11(2,0), respectively. The higher resolution generally available in layer 0 may be used, for example, if it is important not to overlook a detail or a new variation of a canonical house concept, whereas the lower resolution generally available in layer 2 may be chosen if there is already an expectation that a house is present and the goal is verification of that conclusion.

In some implementations, array 200 may be examined in portions—for example by use of a sliding window—but for present illustrative purposes it will be assumed that array 200 is examined as a whole. Many known or future information search and retrieval techniques may be used to determine which exemplars are relevant, such as binary search tree, interpolation search, hash lookup, use of linked lists, and so on. Such searches may be prioritized by identifier 320 in many ways, such as by noting that the presence of one detected significant pattern is statistically related to the presence of other significant patterns spatially or temporally, or that it is efficient to preferentially employ a first exemplar subsuming a second exemplar (e.g., exemplars 403 subsuming 402, or 402 subsuming 401) or in other cases to preferentially employ the subsumed exemplars. For example, due to the prominence of relatively long vertical and horizontal arrangements of shaded data elements, in a situation in which shaded data elements are determined by identifier 320 to be indicative of the presence of significant patterns, identifier 320 may preferentially apply filters/exemplars 403 and 406 rather than shorter filters/exemplars such as 401, 402, or 405, or to preferentially apply filters/exemplars 403 and 406 rather than those not oriented vertically or horizontally with respect to the appropriate spatial reference in the relevant world model, such as filters/exemplars 404, 407, or 408.

In the present example in which exemplars are illustratively employed rather than filters, italicized capital letters will be used to refer to patterns for ease of discussion only (e.g., Pattern A). It will be assumed for illustrative purposes in the present example that pattern identification is predicated on differences between binary shades of light, that is, their color value using a grey scale having only the values shaded or not shaded, as represented by the shaded and non-shaded data elements of array 200. It will be understood that many other characteristics or attributes of data from this example in a visual field of the physical world—for example, intensity, reflectivity, texture, temperature, motion, and many others—could be used instead of or together with color in any combination.

Directing attention to shaded data elements, identifier 320 identifies two instances of exemplar 401 in a block configuration (Pattern A: data elements 200-54 and Pattern B: 200-56); one instance of exemplar 405 in a pass configuration (Pattern C: data elements 200-86, 200-76); one instance of exemplar 406 in a pass configuration (Pattern D: data elements 200-82, 200-72, and 200-62); two instances of exemplar 404 in a pass configuration (Pattern E: data elements 200-42, 200-33, 200-24; and Pattern F: data elements 200-33, 200-24, 200-15); three instances of exemplar 407 in a pass configuration (Pattern G: data elements 200-48, 200-37; Pattern H: data elements 200-37, 200-26; and Pattern I: data elements 200-26, 200-15); and five instances of exemplar 403 in a pass configuration (Pattern J: data elements 200-82, 200-83, and 200-84; Pattern K: 200-83, 200-84 and 200-85; Pattern L: 200-84, 200-85 and 200-86; Pattern M: 200-85, 200-86 and 200-87; and Pattern N: 200-86, 200-87 and 200-88). Numerous other combinations of exemplars and configurations are possible to identify significant patterns in the field of view, such as identification of a portion of the bottom horizontal arrangement of shaded data elements by identification of two adjoining instances of exemplar 403 in a pass configuration (Pattern O: 200-83, 200-84 and 200-85 and Pattern P: 200-86, 200-87 and 200-88). It will be understood that significant patterns present in array 200 are present but have not been mentioned for clarity of illustration, such as various instances of exemplar 405 in a pass configuration, as with respect to data elements 200-82 and 200-72, for example. Generally, it is not required that all significant patterns be identified, although redundancy typically is advantageously provided by multiple identifications of significant patterns by use of various combinations of exemplars, or of filters in other examples.

Figure 5:
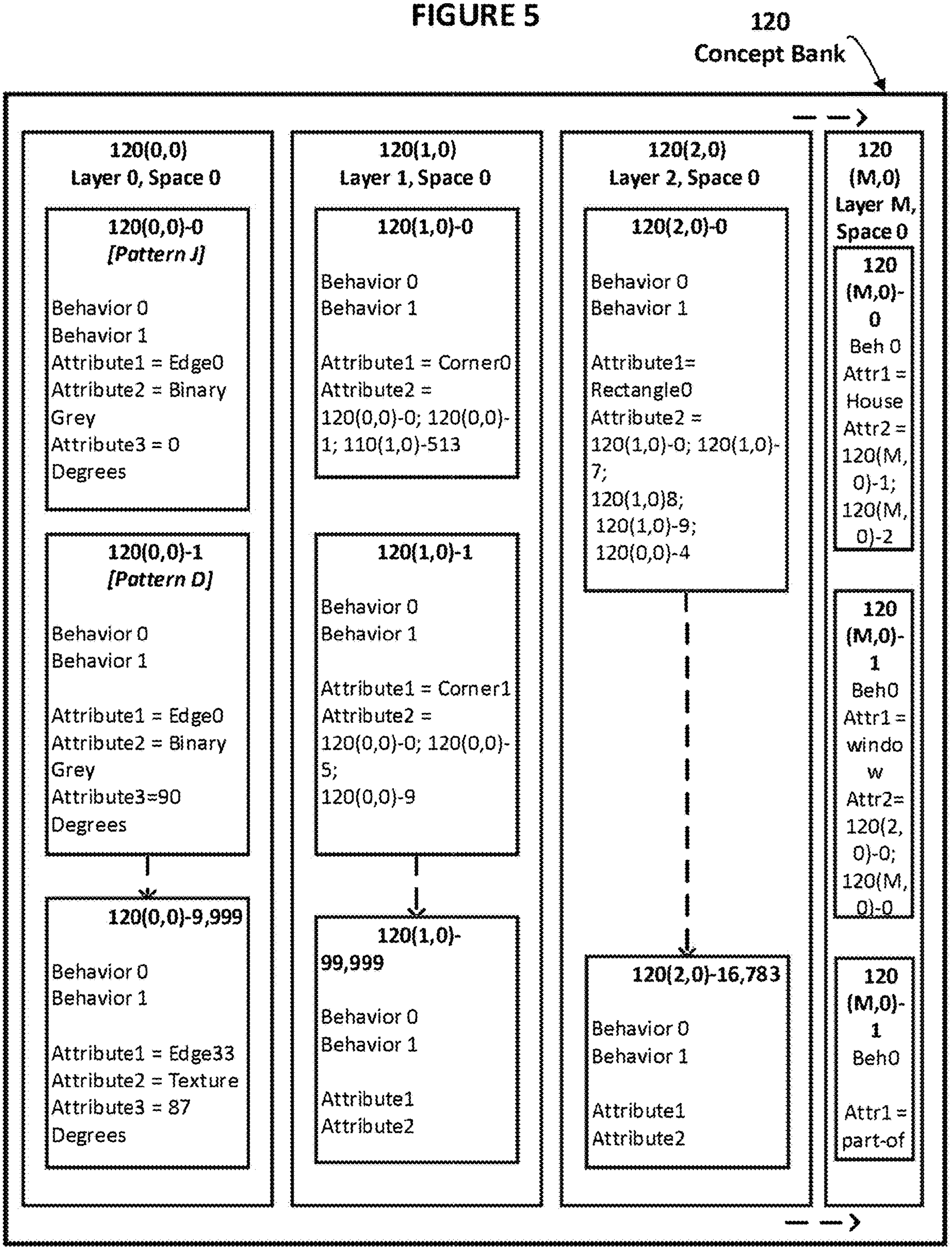
FIG. 5 is a graphical representation of illustrative data elements and their data entries of concept bank 120 of FIG. 1.

In step 835, pattern identifier 320 associates the patterns identified in step 830 with elements of concept bank 120, typically in the corresponding level, that is, element 120(0, 0) in this example as shown in FIG. 5. Thus, as an illustrative example, identifier 320 may associate Pattern J with the entry 120(0,0)-0 of concept bank 120. This association may be accomplished, for example, by searching (using any known or future technique) the entries in 120(0,0) for attributes exhibited by the data constituting Pattern J: assumed in this example to be an edge of type Edge0, an identification predicate of Binary Grey, and oriented at 0 degrees with respect to reference 220. In some implementations, such as using actor models for example, such search may be conducted in parallel by sending messages simultaneously to all entries in 120(0,0) requesting them to respond if they have all or some portion of the desired attributes and optionally to provide supporting information. The behaviors of the entries in bank 120 may, for example, include for such purpose the ability to accept messages, conduct a search of attributes based at least in part on the message content, and respond with a result message, all in accordance with known or future techniques.

As noted, the entries in banks 110 and 120 advantageously are transparently encapsulated so that, for example, the attributes and behaviors of the concepts included within element 120(0,0) are transparent and only changed in accordance with protocols designated and enforced by enforcer 350. As noted, in some implementations the entries in banks 110 and 120 may be objects in accordance with known or future techniques in the computer sciences possessing attributes and behaviors common to all objects of its class. Such attributes may include characteristics that are the predicates for pattern identification (e.g., color in this example), a feature distinguishing its class from other similar classes (edge1 in this example, which may refer to an edge of particular length, width, degree of distinguishing characteristic, and so on), and orientation in relation to the world reference established by manager 316.

As noted, a concept's attributes advantageously include identification, association, or linkage (e.g., by any known or future technique) to concepts and/or filters/exemplars associated with that concept. For ease of illustration, it will be assumed in this example that attribute1 of a concept entry constitutes a link to a word associated with that concept. Thus, attribute1 of entry 120(0,0)-0 is 'Edge0,' meaning an edge of type 0, and attribute1 of 120(M,0)-0 is 'house.' To facilitate discussion, a concept entry will be referred to in shorthand by reference to such attribute1 so that, for example, reference may be made to entry 120(M,0)-0 as the concept 'house.'

In the present example, attribute2 of a concept is reserved for linking attributes; that is, for specifying links to other concepts or to filters/exemplars. The concept 'window' as shown by entry 120(M,0)-1, includes attribute2 linking it to the concept 'house' of 120(M,0)-0 and to the concept 'corner' as shown in entry 120(1,0)-1. To encapsulate the relationship that a window may be part of a house, the window-related entry 120(M,0)-1 may also have an attribute linking it to a concept 'part-of' combined with linkage to the concept 'house.' The concept 'part-of' may be in a level of bank 120 higher than those shown, in which case level M may not be the highest level of persistent concepts. The concept 'part-of' may also be maintained as a transitory concept, but its frequency and salience in numerous contexts may typically be grounds for persistence manager 340 to enter it into a persistent state in an element of bank 120 of appropriate level, perhaps for example in conjunction with other elements of that level persisting concepts of belonging, being, or status such as 'whole,' 'is,' or 'dominant.' Such persistent entry for the concept 'part-of' is illustratively shown as entry 120(M,0)-1, or it may be advantageously persisted in some implementations as an entry in special concepts 122.

Similar to the association of the concept 'corner' with the concept 'rectangle,' the association of 'house' with the concepts of 'window' and 'door' may be encoded in a filter/exemplar by relating the constituent concepts in a pattern appropriate to its level. For example, the concepts 'window' and 'door' may persist in a level having the dimension 'squareness' in which 'window' is closer to pure squareness than 'door,' and a dimension 'texture' in which 'window' is closer to smoothness than 'door.' The concept 'house' in this case may include in its attribute2 a linkage to such filter/exemplar reflecting the relationship between 'window' and 'door.' The identification by identifier 320 of this filter/exemplar in a corresponding level of information being processed may result in identifier 320 prioritizing or selecting the concept 'house.'

To further illustrate the example of the method of FIG. 8, it will be considered that step 830 results in identification of Pattern D and that it is associated in step 835 with the concept "Edge1, Color, 90 degrees" of entry 120(0,0)-1. In step 840, identifier 320 determines whether there are higher-level concepts that include as attributes the two concepts associated with Patterns J and D. In other words, identifier 320 determines if there is one or more relevant significant pattern of significant patterns (hereafter, simply 'pattern of patterns') previously recorded in a higher level. If there is not, identifier 320 may note the association in the present example of Patterns J and D and, if it determines that appropriate conditions exist, may create an appropriate pattern of patterns as a concept in the higher level, e.g., in bank element 120(1,0) of this example. Such appropriate conditions may include frequency or number of encounters with this combination in the same or similar spatial relationship, intensity or salience of the encounter (e.g., if the image is captured during an important or surprising event), degree or measure of randomness or lack thereof in the combination, analogy to one or more pattern of patterns in other spaces and/or levels, and other factors.

It is also contemplated that in some implementations the associated Patterns J and D may be represented by an entry in the same level such as, for example, corresponding to exemplar 413 being entered in another level such as bank element 110(0,0) of FIG. 4B instead of 110(1,0) as shown in FIG. 4C. Such an arrangement may be advantageous for ease of searching, redundancy, or other reasons in specific cases. However, it will be assumed in this example that the combination of Patterns J and D in their shown spatial relationship are associated with attributes of entry 120(1,0)-0 as shown in FIG. 5. Thus, that entry's attribute2 is shown as linking this level 1 concept to the two level 0 concepts identified as Patterns J and D, and also with the significant pattern persisted in bank 110 as entry 110(1,0)-513. In a similar manner, horizontal and vertical patterns constituting a corner on the right may be identified, and a combination of the two corners, connecting horizontal elements, and vertical extensions may be associated with the level 2 concept shown as entry 120(2,0)-0 having an attribute1 related to a concept represented by the word 'rectangle.' Entry 120(2,0)-0 also has an attribute2 specifying the lower-level concepts (some not shown) from which the association was made.

It will be assumed for this example that the sloping patterns—corresponding for example to concepts identified by use of exemplars 407 and 408—have similarly been identified. Like the previous example, the resulting combined pattern may, in turn, be linked to higher-level concepts such as 'partial,' and 'house.' As noted above, the concept 'house' need not be persisted as shown by the entry 120(M,0)-0; instead, or in addition, it may remain as a transitory concept activated by the noted combination of persistent concepts. Persistence manager 340 may also determine that the 'house' concept should be persisted in a higher level of bank 120 and/or represented in whole or in part by one or more new exemplars in bank 110. Thus, manager 340 may cause an exemplar entry to be made in a bank element in a higher level, e.g., level 3, that is specific to a combination of lower-level shapes constituting in their combination a pattern typical of frontal view of a house of a certain design.

In a similar manner, Patterns A and B may be assumed in this illustrative example to be associated with concepts for 'spot' (not shown), and Pattern C to be associated with the concept 'vertical rectangular object' (not shown). When combined with the concept of 'house,' the concepts identified by their linkage to the concepts related to those patterns may be associated with the pattern of patterns associated with the word 'house.' Also, Patterns A and B may be associated with the concepts 'window' and 'door,' and the entire combination may be associated with the pattern of patterns associated with the concept 'house.'

An additional description of a bottom-up process for identifying a house concept is now provided by tracing the progression of the steps of the illustrative method starting from exemplars in level 0 and advancing to those in level 2 that may be more uniquely associated with the objective of identifying a house. Typically, this process may be conducted in parallel with that of the process involving concepts just described. This supplemental process stresses the use of activation-intensity attributes to facilitate identification, but it will be understood that the use of activation-intensity attributes of concepts in the previous description could just as well have been employed for this purpose.

In accordance with this supplemental process, in step 830 Pattern D in processed data 162 is identified as being a significant pattern persisted as filter/exemplar 406 in bank element 110(0,0). In step 840, the linking attributes of filter/exemplar 406 indicate associations with filters/exemplars 403 in the current level and 413 in the next highest level. Priming of activation-intensity attributes of filters/exemplars 403 and 413 facilitates identification of Pattern J in a return to step 830, where identification of the pattern of activation of Patterns D and J confirms the association in step 835 with filter/exemplar 413 and also establishes a weaker, but significant, association with filter/exemplar 421 because filter/exemplar 413 is a constituent of filter/exemplar 421. Consequently, the activation-intensity attributes of 421 are increased. Because of top-down priming of the shapes expected to be present if a house is captured by data 162, it is illustratively assumed that the activation-intensity attributes of filter/exemplar 421 had been elevated in a prior iteration of this method, so that the additional increase resulting from step 835 results in the identification in step 840 of filter/exemplar 421 as a constituent of a significant pattern relevant to the current objective. In steps 850 and 855, the activation-intensity attributes of a filter/exemplar in the canonical shape of a house (not shown) may be doubly primed both from above and below: from above because in identifying the objective of identifying a house, objectives manager 610 employed a top-down process to elevate the activation levels of concepts and filters/exemplars most predictive of or closely associated with the 'house' concept or filter/exemplar, and from below because of the identification of filters/exemplars that are constituents of the canonical shape of a house, either directly or through intervening layers.

In some implementations, step 855 may include operations by objectives manager 610 to validate the bias imposed by top-down processing. That is, manager 610 may note that the additional elevation of activation-intensity attributes due to top-down expectations may result in biased prioritization and possible erroneous identification in subsequent iterations after step 880. As noted, this is because searches for constituent concepts or filters/exemplars that constitute a significant pattern either identified or anticipated is facilitated by examining concepts or filters/exemplars having relatively high activation-intensity attributes in comparison to other possible constituents. Manager 610 may thus direct attention in a subsequent iteration to eliminating or otherwise evaluating alternative identifications of significant patterns. In terms of the present example, the identification of filter/exemplar 421 may be equally salient with respect to identifying a barn as a house. Therefore, as a non-limiting example of ways of drawing distinctions or weighing probabilities, attention could be directed to validating that filter/exemplars (or concepts) more representative of barns than houses are not present.

Multiple redundancies are thus evident in both bottom-up and top-down processes involving linking attributes and setting of activation-intensity attributes and patterns of activation. Many combinations or paths exploiting these redundancies are possible and may be selected to facilitate efficiency, inclusivity, specificity, validation, and other goals or purposes. The operations of the functional elements of TEAI 100 described herein provide for flexible and expandable operation within practical constraints on resources. Throughout all such operations, the characteristic of transparent encapsulation typically is applicable to ensure alignment with human goals.

While enforcer 350 may access processing by any functional element of TEAI 100 at any step, in the illustrated method it explicitly examines at step 870 the actions taken by objectives manager 610 and resulting activities of managers 316 and/or 340 particularly with respect to creation of new filters/exemplars and concepts or changes in their attributes or behaviors. Enforcer 350 may take numerous remedial actions if, for example, it notes or predicts actions contrary to core objectives 164, such remedial actions including terminating operation of TEAI 100, flagging the concerning condition for examination by a human user, rewinding the affected states and behaviors to a previous or a predetermined safe configuration, and so on.

If objectives manager 610 determines that additional levels of processing should occur, the 'no' path will be taken at step 875, the level will be incremented or decremented at step 880 as determined by manager 610, and the process will continue at step 802. If processing has completed at a level that is either the top or bottom of the progression of levels determined appropriate by objectives manager 610, the 'yes' path will be taken at step 875 and manager 610 may direct persistence manager 340 to determine whether persisting, pruning, and/or merging of filters/exemplars and/or concepts is appropriate (step 885). Such decisions may occur at any step in the process but are shown at this stage for convenience only. Manager 610 may then determine whether the objective has been accomplished (step 890) and thus processing of the current objective should be considered to be done. If the objective has not been accomplished, the 'no' path with will be taken from step 890 and manager 610 will determine whether to continue to pursue the objective in its current form or to reformulate it (step 802). If the objective has been accomplished, or manager 610 determines that it should be abandoned or postponed, the 'yes' path will be taken from step 890 and processing of that objective will terminate (step 899). Objectives manager 610 may then initiate the process again at step 800 with respect to another objective.

Having described various embodiments and implementations, it should be apparent to those skilled in the relevant art that the foregoing is illustrative only and not limiting, having been presented by way of example only. Numerous other embodiments, and modifications thereof, are contemplated as falling within the scope of the present invention. For example, many other schemes are possible for distributing the described functions among various functional elements, and the functions of any element may be carried out in various ways in alternative embodiments. For example, the length of time during, or conditions under, which constituents of an activation pattern remain activated may be determined by persistence manager 340 rather than, or in cooperation with, attribute and behavior manager 630. As another example, the function of objectives manager 610 to determine if an objective has been accomplished may be carried out in alternative implementations by attribute and behavior manager 630. More generally, a central role of objectives manager 610 of the illustrated embodiment—to pursue objectives by initiating actions to be taken by other functional elements of TEAI 100—may be carried out in other embodiments or implementations by manager 630, coordinator 380, other functional elements individually or collectively, or by a centralized functional manager, executor, or coordinator not included in this embodiment.

More generally, the functions of several functional or data elements may, in alternative embodiments, be carried out by fewer, or a single, element, or by a greater number of elements. That is, for example, functional elements shown as distinct for purposes of illustration may be combined and/or incorporated within other functional elements in a particular implementation. For example, the functions of coordinator 380 may be carried out by manager 300, manager 310 may be omitted or its functions carried out by manager 300 and/or processor 160, some of the functions of persistence manager 340 may be carried out by pattern identifier 320, or vice versa, and so on. Similarly, filter/exemplar bank 110 and concept bank 120 may be combined into a single data bank, or they may be divided into larger numbers of data banks. In some implementations only one data construct may be used rather than the separate data constructs of concepts and filters/exemplars of the illustrated implementation. The data in, or the totality of, attention model 652 may be combined with banks 110 or 120, or all their data persisted in a single data bank. In yet another example, functions of external model manager 316 related to scaling and orienting may be supplemented or replaced by the capacity of pattern identifier 320 to operate on alternative representations of patterns in varying orientations and/or scales by, for example, designating alternative filters or exemplars for the same pattern in bank 110. Thus, in some embodiments, any functional element may perform fewer operations than those described with respect to the illustrated embodiment.

Also, functions shown in the present embodiment as performed by one functional element may be performed by multiple functional elements in alternative embodiments. For example, the function of external model manager to build and maintain world models may be handled by a first functional element and the function of external model manager to orient and scale data with respect to reference perspectives may be handled by a second functional element. Furthermore, the sequencing of functions, or portions of functions, generally may be altered in numerous ways, all in accordance with the present invention.

For clarity, functions that may be carried out by a combination of functional elements may be described without specifying intermediate steps. For example, it may be said simply that objectives manager 610 sets or changes an attribute of an object persisted as a concept, whereas a more detailed description would be that manager 610 instructs attribute and behavior manager 630 to change the attribute, all such instructions passing through communications coordinator 380. In alternative implementations such instructions may pass directly, as from objectives manager 610 to attribute and behavior manager 630 (or, in yet another implementation, functions of managers 610 and 630 may be combined so that manager 610 directly makes the change in attribute). Similarly, intermediate steps in initiating or changing behaviors may be omitted in description for clarity, or to emphasize a close functional association or to illustrate an alternative implementation. For example, control and information to and from awareness manager 650 is shown in FIG. 6 as flowing directly to and from managers 610 and 630 rather than through coordinator 380. For convenience and clarity, mention of the intervening communication function of coordinator 380 in the illustrated embodiment may be omitted from the description and it will be understood that all communications to, from, and among functional elements of manager 170 typically may be routed through coordinator 380.

In addition, it will be understood by those skilled in the relevant art that control and data flows between and among functional elements and various data banks may vary in many ways from the control and data flows described above. For example, manager 300 may communicate directly with processor 160 rather than via coordinator 380. More particularly, intermediary functional elements not shown in the illustrated embodiment may direct control or data flows, and the functions of various elements may be combined, divided, or otherwise rearranged to allow parallel and/or distributed processing or for other reasons. Also, intermediate data banks may be used, and various described data banks may be combined or otherwise arranged. Arrows showing control flow may implicitly include transfer of data, or vice versa. Non-limiting examples of such implicit bi-directional data transfer include transfer of space and data information between manager 310 and manager 300, transfer of data between BCI 175 and coordinator 380, or transfer of data to/from external model manager 316 through communications coordinator 380 to awareness manager 650 for use in construction or maintenance of attentional model 652. In general, the existence of data may be inferred from data flows but not explicitly shown, and the occasional explicit representation of data, such as processed data 162 or attention model 652, is for purposes of clarity of discussion only. Also, while parallelograms have been used for convenience to represent certain collections or groups of information, including data models, such as described with respect to data 162, objectives 164, and model 652, they could also have been graphically represented using rectangles as with data banks 110, 120, or 125.

Analogous to the variations noted above with respect to functional elements, steps of the illustrated method may be varied in numerous ways consistent with the range of implementations of the present invention. For example, some steps may be taken in an order different than that illustrated (e.g., step 820 may precede step 815, or step 806 may be taken at the place shown for step 802 in the illustrated implementation); various steps may be combined, further divided, or omitted; steps may be added to reflect additional functions of other implementations; decision points may be inserted, eliminated or combined; flow may be altered; and so on.

Numerous other embodiments, and modifications thereof, are contemplated as falling within the scope of the present invention as defined by appended claims and equivalents thereto.

What is claimed is:

1. A computer-implemented method for processing a plurality of data entries in a computer data bank persisted in at least one hardware medium, each data entry representing a respective significant pattern and comprising at least one activation attribute and at least one linking attribute, the method comprising:

(a) priming a first subset of the plurality of data entries based at least in part on a first objective of a plurality of objectives and based at least in part on at least one linking attribute of at least one data entry associated with the first objective, the first objective comprising identifying a first significant pattern selected from the group consisting of: a first significant pattern represented by a first data entry of the plurality of data entries, a first significant pattern maintained in a transitory pattern of activation, and combinations thereof, the priming comprising altering, in the computer data bank, at least one activation attribute of each first-subset data entry to at least one distinguishing state of activation;

(b) identifying, within processed data, a first set of at least one processed significant pattern, the identifying being based at least in part on the primed first subset;

(c) priming a second subset of the plurality of data entries, each data entry in the second subset representing a respective one of the first set of at least one processed significant pattern, the priming the second subset comprising altering, in the computer data bank, at least one activation attribute of each second-subset data entry to at least one distinguishing state of activation;

(d) determining whether the first objective has been accomplished, based at least in part on:

(i) states of activation attributes of data entries belonging to the first subset;

(ii) states of activation attributes of data entries belonging to the second subset; and (iii) at least one relationship among at least two data entries, the at least one relationship being specified by at least one item selected from the group consisting of: a filter/exemplar represented by at least one data entry, a linking attribute of at least one data entry, and combinations thereof, the at least one relationship being with respect to at least one dimension of at least one space;

(e) in response to determining that the first objective has been accomplished, performing at least one operation, with respect to the computer data bank, selected from the group consisting of: creating a data entry in the computer data bank representing the first significant pattern and comprising at least one linking attribute associating the created data entry with at least one constituent data entry of the first significant pattern, altering at least one attribute of an existing data entry in the computer data bank to persist the first significant pattern, maintaining the first significant pattern in a transitory pattern of activation by maintaining activation attributes of constituent data entries of the first significant pattern in distinguishing states of activation, and combinations thereof; and (f) in response to determining that the first objective has not been accomplished, recursively processing significant patterns of significant patterns by:

(i) recursively identifying, within processed data, additional sets of processed significant patterns;

(ii) recursively priming additional subsets of the plurality of data entries, each additional-subset data entry representing a respective processed significant pattern of a respective additional set of processed significant patterns, the priming comprising altering, in the computer data bank, at least one activation attribute of each additional-subset data entry to at least one distinguishing state of activation;

(iii) recursively determining whether the first objective has been accomplished, based at least in part on states of activation attributes of data entries belonging to the first subset, the second subset, and at least one additional subset, and at least one relationship among at least two data entries belonging to at least two of the first subset, the second subset, and the at least one additional subset, the at least one relationship being specified by at least one item selected from the group consisting of: a filter/exemplar represented by at least one data entry, a linking attribute of at least one data entry, and combinations thereof, the at least one relationship being with respect to at least one dimension of at least one space; and (iv) terminating the recursive processing in response to determining that at least one condition selected from the group consisting of: the first objective has been accomplished, the first objective is to be reformulated, the first objective is to be reassessed, the first objective is to be postponed, the first objective is to be abandoned, and combinations thereof, has been satisfied.

2. The method of claim 1, wherein determining whether anticipated identification of the first significant pattern is confirmed is based at least in part on conformity, within at least one permitted deviation, to at least one canonical form associated with the first significant pattern.

3. The method of claim 1, wherein the at least one distinguishing state of activation comprises at least one activation-intensity attribute.

4. The method of claim 1, wherein the at least one relationship is with respect to at least one dimension of a first space and at least one dimension of a second space different than the first space.

5. The method of claim 1, wherein the first processed data is selected from the group consisting of: internally generated processed data, externally generated processed data, and combinations thereof.

6. The method of claim 1, wherein the data bank is hierarchically organized, at least in part by levels, and wherein, when the first significant pattern is represented by the first data entry, the first data entry is in a first level, at least one data entry of the first set of constituents is in at least one second level lower than the first level, and at least one data entry of the second set of constituents is in at least one third level lower than the second level, continuing recursively with respect to levels for the additional sets of constituents of constituents of the first significant pattern.

7. The method of claim 1, wherein the recursive processing of significant patterns of significant patterns comprises incrementing by hierarchical level.

8. The method of claim 1, wherein the recursive processing of significant patterns of significant patterns comprises decrementing by hierarchical level.

9. The method of claim 1, wherein the recursive processing is terminated in response to determining that the first objective is to be reassessed, wherein the reassessment comprises changing composition of the first subset by selecting at least one different data entry of the plurality of data entries, and wherein the method of claim 1 is repeated using the changed composition of the first subset.

10. The method of claim 9, wherein the data bank is hierarchically organized, at least in part by levels, and wherein, when the first significant pattern is represented by the first data entry, the first data entry is in a first level, at least one data entry of the first set of constituents is in at least one second level lower than the first level, and at least one data entry of the second set of constituents is in at least one third level lower than the second level, continuing recursively with respect to levels for the additional sets of constituents of constituents of the first significant pattern, and wherein composition of the first subset is changed, at least in part, by selecting from at least one first lower level below the first level and not from levels above the at least one first lower level.

11. The method of claim 10, wherein the at least one first lower level is determined based at least in part on a desired resolution.

12. The method of claim 9, wherein the data bank is hierarchically organized, at least in part by levels, and wherein, when the first significant pattern is represented by the first data entry, the first data entry is in a first level, at least one data entry of the first set of constituents is in at least one second level lower than the first level, and at least one data entry of the second set of constituents is in at least one third level lower than the second level, continuing recursively with respect to levels for the additional sets of constituents of constituents of the first significant pattern, and wherein composition of the first subset is changed, at least in part, by selecting from at least one first higher level above the lowest level of the hierarchy and not from levels below the at least one first higher level.

13. The method of claim 12, wherein the at least one first higher level is determined based at least in part on a desired resolution.

14. The method of claim 1, wherein the recursive processing is terminated in response to determining that the first objective is to be reassessed, wherein the reassessment comprises changing preferences for linking among the first subset of the plurality of data entries, and wherein the method of claim 1 is repeated using the changed preferences.

15. The method of claim 1, wherein the recursive processing is terminated in response to determining that the first objective is to be reformulated, wherein the reformulation comprises anticipating identification of a second significant pattern selected from the group consisting of: a second significant pattern represented by a second data entry of the plurality of data entries, a second significant pattern maintained in a transitory pattern of activation, and combinations thereof, and wherein the method of claim 1 is repeated using the reformulated objective with the second significant pattern substituted for the first significant pattern.

16. The method of claim 1, wherein the recursive processing is terminated in response to determining that the first objective is to be reformulated based at least in part on a deviation of at least one of the recursively processed significant patterns from a canonical form associated with the first significant pattern.

17. The method of claim 1, wherein anticipated identification of the first significant pattern is based at least in part on a world model.

18. The method of claim 17, wherein the world model comprises a first script comprising the first significant pattern.

19. The method of claim 17, wherein the world model conditions the first processed data with respect to at least one item selected from the group consisting of: a world orientation reference, scale, translation, and combinations thereof.

20. The method of claim 1, wherein the recursive processing is terminated in response to determining that the first objective is to be postponed, and the postponement comprises maintaining in a transitory pattern a first plurality of attributes selected from the group consisting of: the at least one attribute of at least one data entry of the first subset, the at least one attribute of at least one data entry of the second subset, the at least one attribute of at least one data entry of the additional subset, and combinations thereof.

21. The method of claim 20, wherein the maintaining comprises setting the first plurality of attributes to a state of resonance.

22. The method of claim 1, wherein:

(i) the data bank is further organized by space;

(ii) at least one data entry of a collection of data entries including the first subset of the plurality of data entries, the second subset of the plurality of data entries, and the additional subset represents at least one significant pattern of a first concept space;

(iii) at least one other data entry of the collection of data entries represents at least one significant pattern of a second concept space different than the first concept space; and (iv) the first concept space and the second concept space are each selected from the group consisting of: word space, physical space, temporal space, people space, emotion space, mathematical space, more-than-three-dimensional space, objectives space, scripts space, and scripts-for-objectives space.

23. The method of claim 22, wherein at least one relationship among at least two data entries of the collection of data entries is specified by at least one item selected from the group consisting of: a filter/exemplar represented by at least one data entry of the collection of data entries, a linking attribute of at least one data entry of the collection of data entries, and combinations thereof, the at least one relationship being along a dimension of a concept space.

24. The method of claim 22, wherein the recursive processing is terminated in response to determining that the first objective is to be reformulated, wherein the reformulation comprises changing composition of the collection of data entries to comprise at least one data entry representing a significant pattern of a third concept space different than the first concept space and the second concept space, and further comprising repeating the method of claim 23 using the reformulated objective.

25. A computer system for processing a plurality of data entries, comprising:

a computer data bank persisted in at least one hardware medium and storing a plurality of data entries, each data entry representing a respective significant pattern and comprising at least one activation attribute and at least one linking attribute;

a data collector and processor constructed and arranged to provide processed data; and an execution manager constructed and arranged to:

(a) prime a first subset of the plurality of data entries based at least in part on a first objective of a plurality of objectives and based at least in part on at least one linking attribute of at least one data entry associated with the first objective, the first objective comprising identifying a first significant pattern selected from the group consisting of: a first significant pattern represented by a first data entry of the plurality of data entries, a first significant pattern maintained in a transitory pattern of activation, and combinations thereof, the priming comprising altering, in the computer data bank, at least one activation attribute of each first-subset data entry to at least one distinguishing state of activation;

(b) identify, within processed data, a first set of at least one processed significant pattern, the identifying being based at least in part on the primed first subset;

(c) prime a second subset of the plurality of data entries, each data entry in the second subset representing a respective one of the first set of at least one processed significant pattern, the priming the second subset comprising altering, in the computer data bank, at least one activation attribute of each second-subset data entry to at least one distinguishing state of activation;

(d) determine whether the first objective has been accomplished, based at least in part on:

(i) states of activation attributes of data entries belonging to the first subset;

(ii) states of activation attributes of data entries belonging to the second subset; and (iii) at least one relationship among at least two data entries, the at least one relationship being specified by at least one item selected from the group consisting of: a filter/exemplar represented by at least one data entry, a linking attribute of at least one data entry, and combinations thereof, the at least one relationship being with respect to at least one dimension of at least one space;

(e) in response to determining that the first objective has been accomplished, perform at least one operation, with respect to the computer data bank, selected from the group consisting of: creating a data entry in the computer data bank representing the first significant pattern and comprising at least one linking attribute associating the created data entry with at least one constituent data entry of the first significant pattern, altering at least one attribute of an existing data entry in the computer data bank to persist the first significant pattern, maintaining the first significant pattern in a transitory pattern of activation by maintaining activation attributes of constituent data entries of the first significant pattern in distinguishing states of activation, and combinations thereof; and (f) in response to determining that the first objective has not been accomplished, recursively process significant patterns of significant patterns by:

(i) recursively identifying, within processed data, additional sets of processed significant patterns;

(ii) recursively priming additional subsets of the plurality of data entries, each additional-subset data entry representing a respective processed significant pattern of a respective additional set of processed significant patterns, the priming comprising altering, in the computer data bank, at least one activation attribute of each additional-subset data entry to at least one distinguishing state of activation;

(iii) recursively determining whether the first objective has been accomplished, based at least in part on states of activation attributes of data entries belonging to the first subset, the second subset, and at least one additional subset, and at least one relationship among at least two data entries belonging to at least two of the first subset, the second subset, and the at least one additional subset, the at least one relationship being specified by at least one item selected from the group consisting of: a filter/exemplar represented by at least one data entry, a linking attribute of at least one data entry, and combinations thereof, the at least one relationship being with respect to at least one dimension of at least one space; and (iv) terminating the recursive processing in response to determining that at least one condition selected from the group consisting of: the first objective has been accomplished, the first objective is to be reformulated, the first objective is to be reassessed, the first objective is to be postponed, the first objective is to be abandoned, and combinations thereof, has been satisfied.

* * * * *